United States Patent
Takatori et al.

(10) Patent No.: US 7,656,472 B2
(45) Date of Patent: Feb. 2, 2010

(54) LIGHT SOURCE DEVICE AND METHOD FOR MANUFACTURING THE SAME, DISPLAY DEVICE AND METHOD FOR MANUFACTURING THE SAME, AND METHOD FOR DRIVING DISPLAY DEVICE

(75) Inventors: Kenichi Takatori, Tokyo (JP); Ken Sumiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 25 days.

(21) Appl. No.: 12/050,324

(22) Filed: Mar. 18, 2008

(65) Prior Publication Data

US 2008/0304791 A1  Dec. 11, 2008

Related U.S. Application Data

(62) Division of application No. 11/521,009, filed on Sep. 14, 2006, now Pat. No. 7,369,725.

(30) Foreign Application Priority Data

Sep. 15, 2005  (JP)  ............................. 2005-268809

(51) Int. Cl.
- G02F 1/1335 (2006.01)
- G02B 6/26 (2006.01)
- F21V 7/04 (2006.01)
- G09G 3/36 (2006.01)

(52) U.S. Cl. ............................ 349/61; 349/62; 345/87; 345/88; 385/27; 385/39; 385/901

(58) Field of Classification Search ............. 349/61–62; 385/27, 39, 901; 345/87, 88; 362/551, 556
See application file for complete search history.

(56) References Cited

U.S. PATENT DOCUMENTS

| 5,548,423 A | * | 8/1996 | Natsunaga ................. 349/106 |
| 6,104,371 A |   | 8/2000 | Wang et al. |
| 6,697,036 B2 | * | 2/2004 | Yamada et al. ................ 345/87 |
| 6,714,185 B2 |   | 3/2004 | Kim et al. |

FOREIGN PATENT DOCUMENTS

| JP | 08-221005 | 8/1996 |
| JP | 3008919 | 12/1999 |
| JP | 2000-194273 | 7/2000 |

* cited by examiner

*Primary Examiner*—Frank G Font
*Assistant Examiner*—Michael P Mooney
(74) *Attorney, Agent, or Firm*—Scully, Scott, Murphy & Presser, P.C.

(57) ABSTRACT

In a light source device, a row of fibers is provided in which a plurality of optical fibers is arrayed in a single row in parallel fashion separately from each other. A light-direction controller is disposed on one side of the optical fibers, main fibers is disposed above and below the light-direction controller, and a main fiber is disposed at the other end of the row of fibers. Light sources are connected to each of the end portions of the main fibers. Three types of mirrors that mutually differ in direction are formed on the surface of the light-direction controller, light emitted from a main fiber enters the optical fibers by way of a first mirror, and light emitted from a main fiber enters the optical fibers by way of a second mirror.

6 Claims, 40 Drawing Sheets

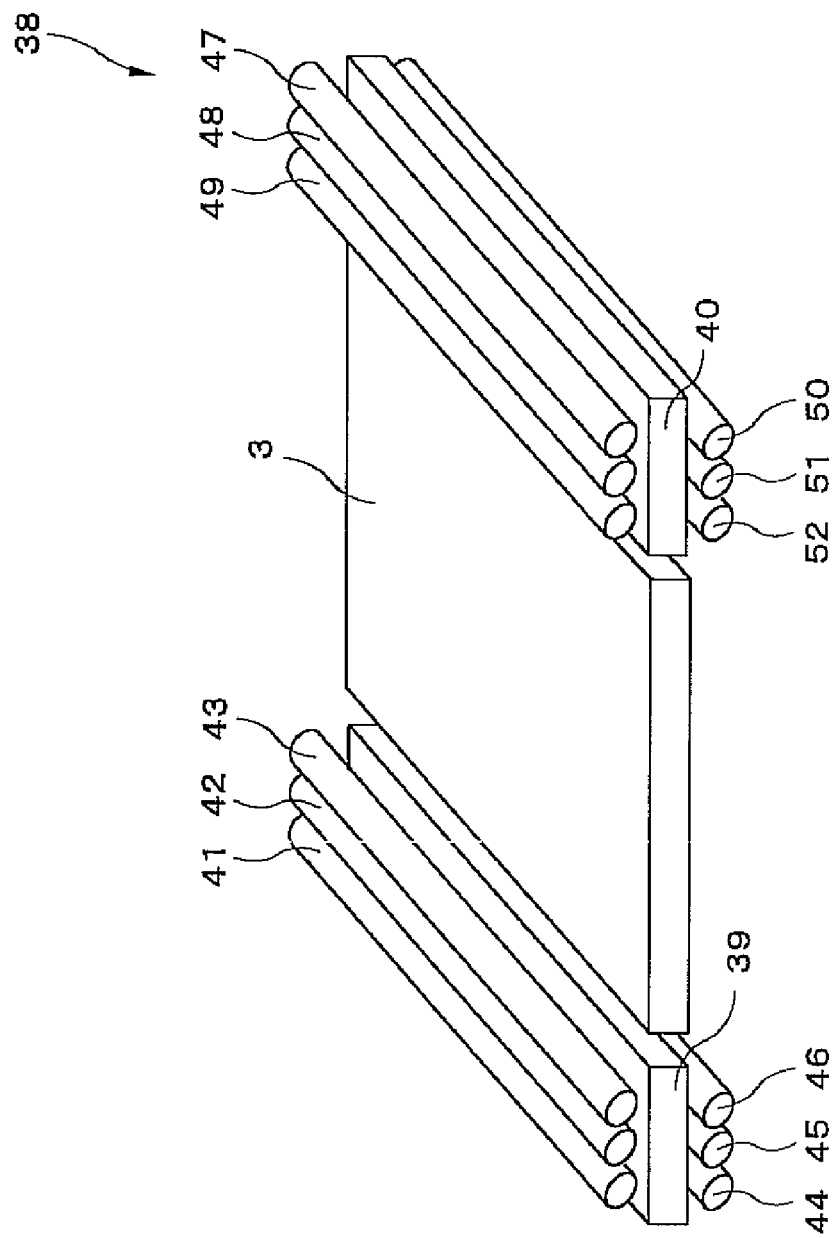

LIGHT SOURCE DEVICE AND METHOD FOR MANUFACTURING THE SAME, DISPLAY DEVICE AND METHOD FOR MANUFACTURING THE SAME, AND METHOD FOR DRIVING DISPLAY DEVICE

CROSS REFERENCE TO RELATED APPLICATION

The present application is a divisional application of U.S. patent application Ser. No. 11/521,009 dated Sep. 14, 2006, the entirety of which is incorporated herein by reference.

BACKGROUND OF THE INVENTION

1. Field of the Invention

The present invention relates to a planar light source device comprising optical fiber, a display device having the planar light source device, a method for manufacturing the light source device and display device, and a method for driving the display device.

2. Description of the Related Art

Together with the advancement of the multimedia era, liquid crystal display devices are rapidly becoming widely used in projector devices, mobile phones, and in other small devices, and in notebook computers, monitors, televisions, and other large devices. Among liquid crystal display devices, a backlight for illuminating the liquid crystal panel from the backside is ordinarily disposed in transmissive or semi-transmissive liquid crystal display devices.

Backlights include direct backlights and side-type backlights. Direct backlights have a cold-cathode fluorescent lamp or another light source disposed on the backside of a liquid crystal panel. Side-type backlights, on the other hand, have a light-guide plate disposed on the backside of the liquid crystal panel, and a cold-cathode fluorescent lamp or another light source disposed to the side of the light-guide plate. The light-guide plate is ordinarily a wedge-shaped plate comprising a transparent material, and light emitted from the light source enters the light-guide plate from the side surface of the base portion in which the plate thickness is relatively thick. In the course of light propagating toward the distal end in which the plate thickness is relatively thin, planar light is emitted from the surface thereof (see patent reference 1 (Japanese Laid-open Patent Application No. 2000-194273), for example).

Backlights that use optical fiber have also recently been developed. Backlights in which optical fiber is used have a high light utilization efficiency with minimal optical loss in comparison with backlights that use a light-guide plate, and are fundamentally advantageous in that the light-emitting state can be varied for each scan line by mutually varying the light that enters the optical fibers.

FIG. 1 is a perspective view showing the liquid crystal display device described in patent document 2 (Japanese Laid-open Patent Application No. 8-221005). A liquid crystal panel 502 is disposed in the conventional liquid crystal display device 501, and a backlight 503 is disposed on the backside of the liquid crystal panel 502, as shown in FIG. 1. Disposed in the backlight 503 are a light source 504 and a bundle 506 of optical fibers 505 optically coupled to the light source 504. The bundle 506 is an arrangement of numerous mutually parallel optical fibers 505 that are fixed in place by an adhesive to form a rectangular parallelepiped block that is diagonally cut. The section of the block forms a light-emitting surface 507 and the light-emitting surface 507 faces the reverse side of the liquid crystal panel 502.

However, there are a number of problems in the liquid crystal display device disclosed in Japanese Laid-open Patent Application No. 2000-194273. In the liquid crystal display device depicted in FIG. 1, numerous optical fibers 505 must be used to form a bundle in order to illuminate the entire display area of the liquid crystal panel 502 with light emitted from the end portions of the optical fibers 505. As a result, the thickness and the mass of the backlight increase. It is also difficult to optically couple numerous optical fibers 505 to a single light source 503, and the layout of the coupling unit is bulky and the light utilization efficiency is reduced.

In view of the above, patent document 3 (Japanese Patent No. 3008919) discloses a technique whereby notches are formed at intermediate locations in the optical fibers, and light is emitted from the notches. Optical fibers arrayed in a single row can thereby illuminate an entire display area. FIG. 2 is a diagram showing the backlight described in Japanese Patent No. 3008919. Optical fibers 512 are arrayed in a single row on the backside of a liquid crystal panel (not shown) in the conventional backlight 511, and the end portions of the optical fibers 512 are optically coupled to each of the light sources 513a, 513b, and 513c, as shown in FIG. 2. The light sources 513a, 513b, and 513c emit red (R), green (G), and blue (B) light, respectively. A plurality of notches (not shown) is formed on the side surface of the optical fibers 512. Light emitted from the light sources 513a, 513b, and 513c enters the optical fibers 512 from the end portions of the optical fibers 512, and the light is emitted from the notches in the optical fibers 512 toward the liquid crystal panel. In the backlight 511, since the optical fibers can be arranged in a single row in comparison with the backlight 503 shown in FIG. 1, the number of optical fibers can be reduced. The backlight can thereby be made lighter and thinner.

However, the above-described prior art has the following problems. It is difficult to optically couple each of the light sources 513a, 513b, and 513c to all of the optical fibers 512 in the backlight shown in FIG. 2. In other words, since the layout is bulky, the area required for the layout is greater, positioning between the light sources and the optical fibers is difficult, the precision of the positioning is poor, and the light utilization efficiency is reduced.

SUMMARY OF THE INVENTION

An object of the present invention is to provide a planar light source device in which the light sources and optical fibers are optically coupled with good precision in a small volume, and to provide a display device having the light source device, a method for manufacturing the light source device and display device, and a method for driving the display device.

The light source device according to an aspect of the present invention comprises a main fiber for emitting light that enters from a light source at a plurality of light-emitting portions disposed along a lengthwise direction thereof; a light-direction controller which is provided with a plurality of mirrors disposed in positions that face the light-emitting portions, and which causes light emitted from the light-emitting portions to be reflected by the mirrors and emits [the light] in a single direction; and rows of fibers obtained by arraying a plurality of optical fibers in which a plurality of light-emitting portions are formed in positions mutually separated along a lengthwise direction thereof. The light emitted from the light-direction controller is input to one end of at least a single optical fiber selected from the optical fibers.

In the present invention, the light sources and optical fibers can be optically coupled with good precision in a simple configuration in which the light-direction controller reflects light emitted from the light-emitting portions of the main fiber and inputs the light at one end of the optical fibers.

The light source device according to another aspect of the present invention comprises first and second light sources; a light-direction controller for emitting in a single direction light emitted from the first and second light sources; and rows of fibers obtained by arraying a plurality of optical fibers in which a plurality of light-emitting portions are formed in positions mutually separated along a lengthwise direction thereof. The light emitted from the first light source is input by the light-direction controller to one end of one or a plurality of first optical fibers selected from the plurality of optical fibers, and the light emitted from the second light source is input by the light-direction controller to one end of one or a plurality of second optical fibers selected from the plurality of optical fibers.

In the present invention, the light-direction controller causes light that has been emitted from the first light source to be input to one end of the first optical fibers, and light that has been emitted from the second light source to be input to one end of the second optical fibers. Therefore, the light sources and the optical fibers can be optically coupled with good precision in a simple configuration.

The light-direction controller preferably comprises a base; one or a plurality of first mirrors which are formed in a portion of the surface of the base, and which cause light that has entered from the first light source to be reflected toward one end of the first optical fibers; and one or a plurality of second mirrors which are formed in another portion of the surface of the base, and which cause light that has entered from the second light source to be reflected toward one end of the second optical fibers. A light-direction controller can thereby be implemented with a simple configuration.

The light source device preferably has a first main fiber into which light emitted from the first light source enters at one end thereof, and which emits the light toward the first mirrors; and a second main fiber into which light emitted from the second light source enters at one end thereof, and which emits the light toward the second mirrors. Preferably, a plurality of the first and second optical fibers are alternately disposed in the row of fibers; the light-direction controller extends in the array direction and has a plurality of the first and second mirrors formed in alternating fashion along the array direction; the first and second main fibers extend along the array direction; and a plurality of light-emitting portions are formed in the first and second main fibers in positions facing the first and second mirrors along a lengthwise direction thereof. Light emitted from the first and second light sources can thereby be efficiently introduced to the plurality of first and second fibers.

A self-written waveguide is preferably formed between the light-emitting portions of the first main fiber and the first mirrors, between the first mirrors and one end of the first optical fibers, between the second main fiber and the second mirrors, and between the second mirrors and one end of the second optical fibers. The connection between the first main fiber and the first optical fibers, and the connection between the second main fiber and the second optical fibers can be made with good precision, and the light efficiency can be improved.

The array spacing of the light-emitting portions formed in the first and second optical fibers is preferably greater in progression to the entrance side of the light that enters the first and second optical fibers. Light can thereby be uniformly emitted from the optical fibers in the lengthwise direction of the optical fibers, and light can be uniformly emitted from the row of fibers.

In relation to the light intensity that enters areas in which the light-emitting portions are formed in the first and second optical fibers, the ratio of the light intensity that leaks from the light-emitting portions to the exterior of the optical fibers is preferably less in progression toward light-emitting portions positioned on an entrance side of the light that enters the optical fibers. Light can thereby be uniformly emitted from the optical fibers in the lengthwise direction of the optical fibers, and light can be emitted in a uniform planar configuration from the row of fibers.

The light source device furthermore preferably has a third light source, wherein light emitted from the third light source is input to one end of one or a plurality of third optical fibers selected from the plurality of optical fibers constituting the row of fibers. Three light sources can thereby be connected to the row of fibers.

The light source device also preferably has third and fourth light sources, and another light-direction controller which is disposed on a side opposite from the light-direction controller as viewed from the row of fibers, and which causes light that has entered from the third and fourth light sources to be emitted in a single direction, wherein light emitted from the third light source is input by the other light-direction controller to one end of one or a plurality of third optical fibers selected from the plurality of optical fibers, and the light emitted from the fourth light source is input by the other light-direction controller to one end of one or a plurality of fourth optical fibers selected from the plurality of optical fibers. Four light sources can thereby be connected to the row of fibers.

The display device according to the present invention comprises the above-described light sources, and a transmissive display panel for displaying images by allowing light emitted from the light source to be transmitted.

A self-written waveguide is preferably formed between the light source and the transmission area of the pixels of the transmissive display panel.

The optical fibers constituting the row of fibers are preferably in a one-to-one correspondence with the scan lines of the liquid crystal panel.

The method for manufacturing a light source device according to the present invention comprises a step for arraying a plurality of optical fibers in which a plurality of light-emitting portions are formed in positions that are separated from each other along a lengthwise direction thereof to fabricate a row of fibers; a step for forming first mirrors on a portion of the surface of a base and forming second mirrors on another portion of the base to fabricate a light-direction controller; a step for arranging the row of fibers, the light-direction controller, and the first and second main fibers so that light emitted from the light-emitting portions of a first main fiber, in which light emitted from a first light source enters one end thereof, is reflected by the first mirrors and enters one end of one or a plurality of first optical fibers selected from the plurality of optical fibers, and light emitted from the light-emitting portions of a second main fiber, in which light emitted from a second light source enters one end thereof, is reflected by the second mirrors and enters one end of one or a plurality of second optical fibers selected from the plurality of optical fibers; and a step for forming a self-forming light-guide path (self-written waveguide) between the light-emitting portions of the first main fiber and the first mirrors, between the first mirrors and one end of the first optical fibers, between the second main fiber and the second mirrors, and between the second mirrors and one end of the second optical fibers.

The method for manufacturing a display device according to the present invention comprises a step for fabricating a light source device; and a step for mounting a transmissive display panel to the light-emitting side of the light source, wherein the step for fabricating the light source is carried out by the method described above.

The method for driving a display device according to the present invention comprises a step for lighting a first light source and turning off other light sources to illuminate a first row of pixels of a liquid crystal panel and to set in a prescribed direction the orientation of liquid crystal molecules in the first row of pixels; and a step for lighting a second light source and turning off other light sources to illuminate a second row of pixels of a liquid crystal panel and to set in a prescribed direction the orientation of liquid crystal molecules in the second row of pixels.

In the present invention, the light source can be lighted in synchronization with the scanning of the liquid crystal panel to scan and light up rows of pixels in sequence beginning with rows of pixels in which liquid crystal molecules have achieved a prescribed orientation. The waiting time after scanning a row of pixels until the liquid crystal molecules of the row of pixels respond does not need to be extended more than necessary.

Also possible is a configuration in which the first light source is a source that emits light of a first color, and the first row of pixels is a row of pixels for displaying an image that corresponds to the first color; and the second light source is a source that emits light of a second color that is different than the first color, and the second row of pixels is a row of pixels for displaying an image that corresponds to the second color. A color field can thereby be sequentially displayed.

Another method for driving a display device according to the present invention comprises a first image display step for allowing light to enter one end of optical fibers, emitting in a first direction the light from light-emitting portions arrayed along a lengthwise direction of the optical fibers, and displaying a first image on a liquid crystal panel illuminated by the light; and a second image display step for allowing light to enter the other end of the optical fibers, emitting in a second direction the light from the light-emitting portions, and displaying a second image on the liquid crystal panel.

In the present invention, a first image can be displayed in a first direction, and a second image can be displayed in a second direction. In other words, mutually different images can be displayed in mutually different directions.

The first image may be an image for the right eye, and the second image may be an image for the left eye. A 3D-display can thereby be display by setting a first direction to point toward the right eye of a viewer, and setting a second direction to point toward the left eye of a viewer.

In accordance with the present invention, a planar light source in which the light source device and optical fibers are optically coupled with good precision can be achieved in a small area.

BRIEF DESCRIPTION OF THE DRAWINGS

FIGS. 7A and 7B are perspective views showing the method of determining the notch position in the optical fiber shown in FIG. 4, wherein FIG. 7A shows the entire optical fiber and FIG. 7B shows a very small portion of the optical fiber;

FIG. 13 is a perspective view showing the light source device according to the sixth embodiment of the present invention;

FIGS. 29A and 29B are timing charts showing the operation of a liquid crystal panel and light source device in a liquid crystal display device, with time plotted on the horizontal axis, and rows of pixels plotted on the vertical axis, wherein FIG. 29A shows the operation of a conventional liquid crystal display device, and FIG. 29B shows the operation of the liquid crystal display device of the present embodiment;

DESCRIPTION OF THE PREFERRED EMBODIMENTS

Figure 1:
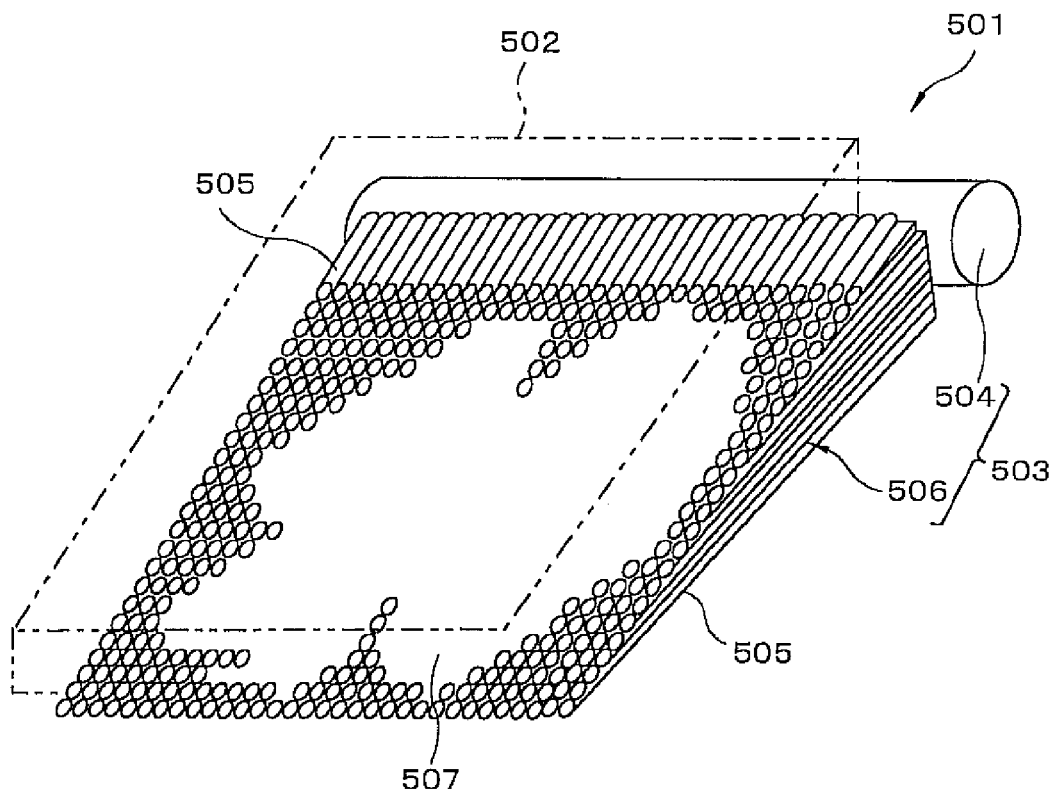
FIG. 1 is a perspective view showing the liquid crystal display device described in Japanese Laid-open Patent Application No. 8-221005.
Figure 2:
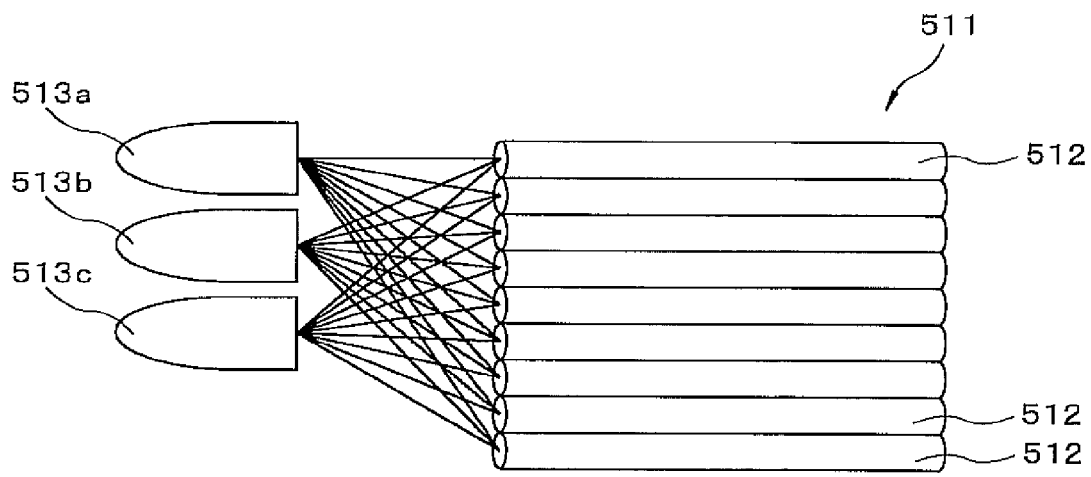
FIG. 2 is a diagram showing the backlight described in Japanese Patent No. 3008919.
Figure 3:
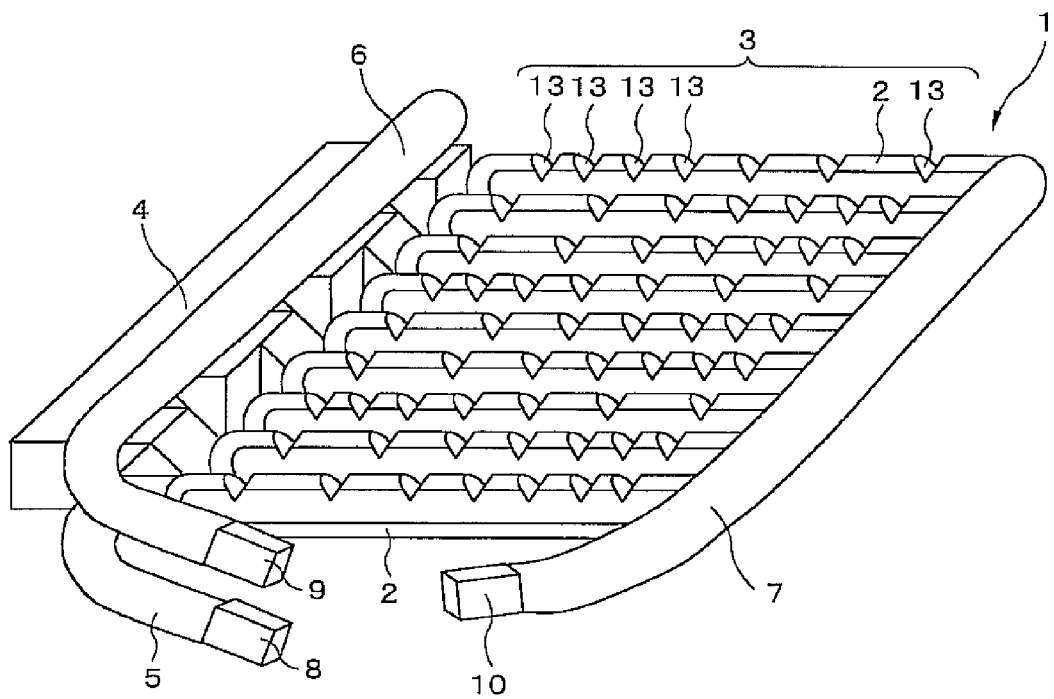
FIG. 3 is a perspective view showing the light source device according to the first embodiment of the present invention.
Figure 4:
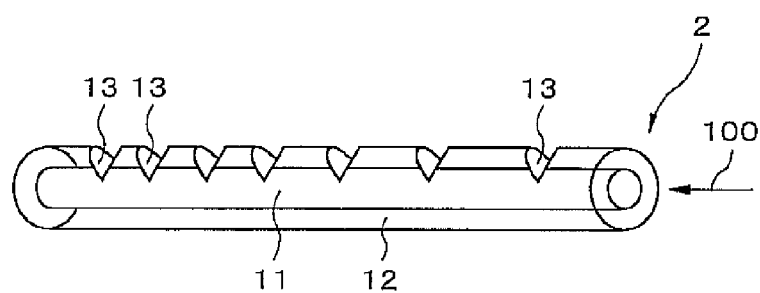
FIG. 4 is a perspective view showing the optical fiber shown FIG. 3.
Figure 5:
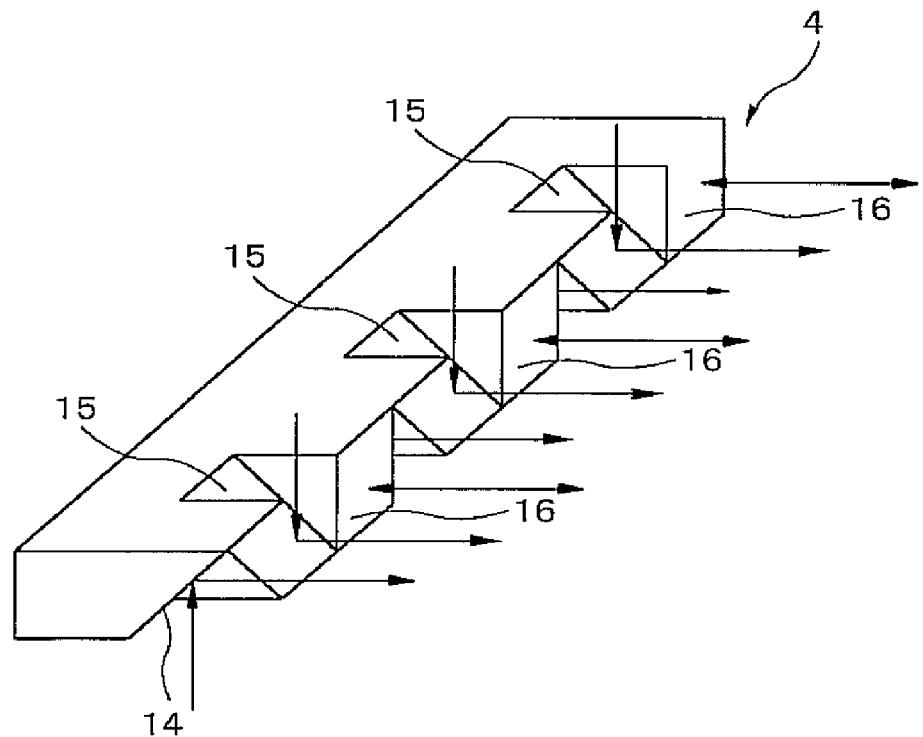
FIG. 5 is a perspective view showing the light-direction controller shown in FIG. 3.
Figure 6:
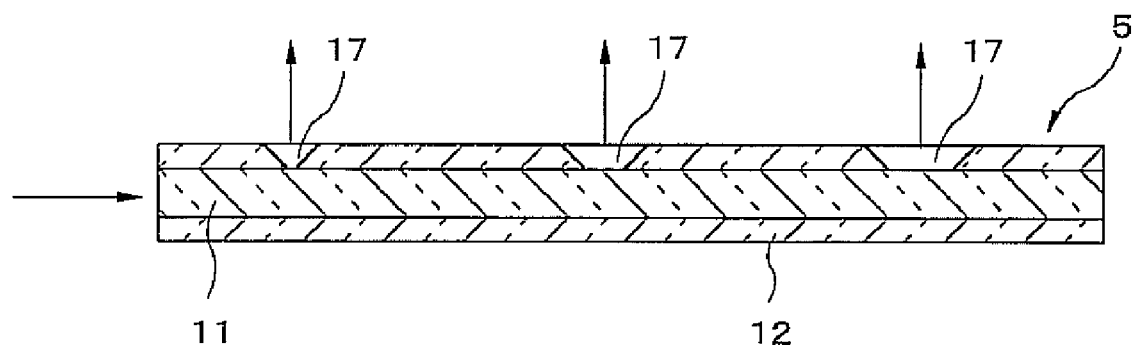
FIG. 6 is a cross-sectional view showing the main fiber shown in FIG. 3.
Figure 7A:
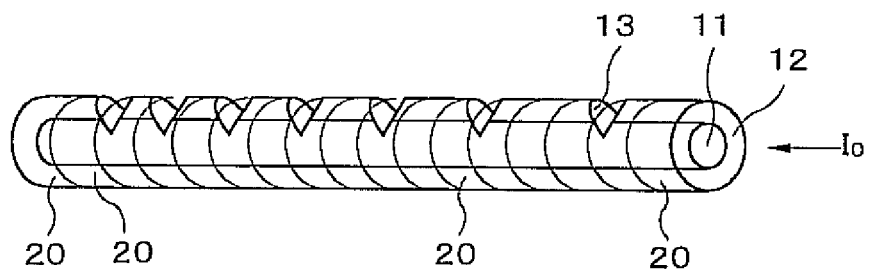
Figure 7B:
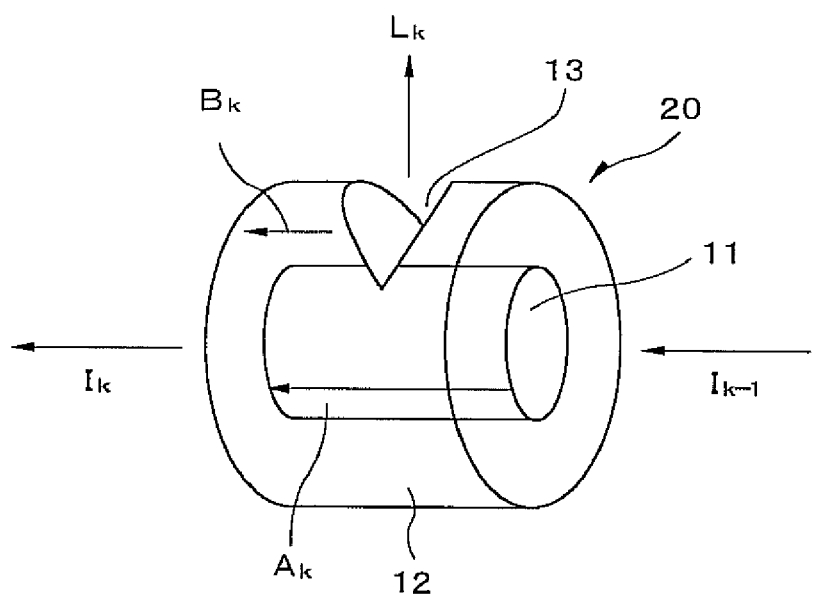

Embodiments of the present invention are described in detail below with reference to the attached diagrams. The first embodiment of the present invention is described first. FIG. 3 is a perspective view showing the light source device according to the present embodiment; FIG. 4 is a perspective view showing the optical fiber shown FIG. 3; FIG. 5 is a perspective view showing the light-direction controller shown in FIG. 3; FIG. 6 is a cross-sectional view showing the main fiber shown in FIG. 3; and FIGS. 7A and 7B are perspective views showing the method of determining notch positions in the optical fiber shown in FIG. 4, wherein FIG. 7A shows the entire optical fiber and FIG. 7B shows a very small portion [of the optical fiber].

A row of fibers 3 comprising a plurality of optical fibers 2 is disposed in the light source device 1 according to the present embodiment, as shown in FIG. 3. The optical fibers 2 are arrayed in mutually parallel rows in the row of fibers 3, and the direction in which the optical fibers 2 extend and the array direction of the optical fibers 2 are mutually orthogonal. The portions between the optical fibers 2 are filled, e.g., with transparent adhesive (not shown), and the optical fibers 2 are bonded to each other by the adhesive. The row of fibers 3 is thereby shaped in the form of a plate overall. A light-direction controller 4 extending in the array direction of the optical fibers 2 is disposed on one of the end portion sides of the optical fibers 2.

A main fiber 5 extending in the array direction of the optical fibers 2 is disposed below the light-direction controller 4, and a main fiber 6 extending in the array direction of the optical fibers 2 is disposed above the light-direction controller 4. The main fibers 5 and 6 are optical fibers. A main fiber 7 extending in the array direction of the optical fibers 2 is disposed on the other end side of the row of fibers 3. The main fiber 7 is an optical fiber. Light sources 8 to 10 are optically coupled by way of a lens (not shown), for example, to one end of the main fibers 5 to 7, respectively. The light sources 8 to 10 are LEDs (Light Emitting Diodes), for example, and the light sources are capable of emitting an entire set of light colors, i.e., red (R), green (G), and blue (B).

A core 11 and a cladding 12 that covers the periphery of the core 11 are disposed in the optical fibers 2, and a plurality of notches 13 are formed on the upper surface of the cladding 12 along the lengthwise direction of the optical fibers 2, as shown in FIG. 4. The core 11 is formed using a transparent material, and the cladding 12 is formed using a transparent material having a lower index of refraction than the material that forms the core 11. The notches 13 pass completely through the cladding 12 and reach the core 11, and a portion of the light guided through the core 11 is designed to leak from the notches 13 to the exterior of the cladding 12. Light emitted from the notches 13 is emitted in substantially parallel directions to each other. This is achieved by making the shapes of the notches 13 equal to each other as viewed from the light-incident side. Light that has leaked from the notches 13 in the present embodiment is emitted in the upward direction.

The arrangement density of the notches 13 is continuously varied along the lengthwise direction of the optical fibers 2. The density is less in approach to the upstream side (incident side) of the traveling direction 100 of the light guided through the optical fibers 2, and the density is greater in approach to the downstream side. In other words, the array interval of the notches 13 formed in the optical fibers 2 is greater in approach to the incident side of the light input to the optical fibers 2. This is due to the fact that the light intensity emitted from the optical fibers 2 is made uniform in the lengthwise direction of the optical fibers 2, and uniform planar light is emitted from the row of fibers 3 by increasing the arrangement density of the notches 13 in approach to the downstream side. This is because the light intensity that passes through the optical fibers 2 decreases in approach to the downstream side of the traveling direction 100 of the light, and the light intensity emitted from a single notch 13 is therefore reduced for notches 13 formed on the downstream side. The method of determining the arrangement density of the notches 13 in the optical fibers 2 is described hereinafter.

The light-direction controller 4 is a member that extends in the array direction of the optical fibers 2 and is formed by injection molding a resin material, as shown in FIGS. 5 and 6. A metal film is locally deposited by vapor deposition on the surface of the light-direction controller 4, and three types of mirrors 14 to 16 are formed thereby. The mirrors 14 to 16 are repeatedly arrayed in the stated order along the lengthwise direction of the light-direction controller 4 on the surface facing the row of fibers 3 in the light-direction controller 4, and a single mirror corresponds to a single optical fiber 12. The mirrors 14 to 16 are disposed at mutually different angles. The perpendicular direction to the surface of the mirrors 14 (hereinafter referred to as the "normal direction") forms an angle of 45° with respect to the lengthwise and downward directions of the optical fibers 2. The normal direction of the mirrors 15 forms an angle 45° with respect to the lengthwise and upward directions of the optical fibers 2. The normal direction of the mirrors 16 matches the lengthwise direction of the optical fibers 2.

A core 11 and a cladding 12 for covering the periphery of the core 11 are disposed in the same manner as the optical fibers 2 in the main fiber 5, as shown in FIG. 6. Also, notches 17 are formed at fixed intervals in the upper surface of the cladding 12 of the main fiber 5 along the lengthwise direction of the main fiber 5. The notches 17 are formed so as to correspond to the mirrors 14 of the light-direction controller 4 and are not formed in the area separated from the area directly under the light-direction controller 4, e.g., the area in the vicinity of the light source 8. The surface area of the exposed core 11 increases in the bottom portion of the notches 17 in progression to the downstream side in the traveling direction of the light of the main fiber 5.

Similarly, a core 11 and cladding 12 are disposed in the main fiber 6. Notches 17 of the main fiber 6 are formed in the upper surface of the main fiber 6, and are disposed in positions that correspond to the mirrors 15 of the light-direction controller 4. The surface area of the exposed core 11 increases in the bottom portion of the notches 17 in progression to the downstream side in the traveling direction of the light of the main fiber 6. Also, a core and cladding are disposed in the main fiber 7, and notches are formed in the cladding on the side facing the row of fibers 3. The notches of the main fiber 7 are formed so as to face the ends of the optical fibers 2 constituting the row of fibers 3 that correspond to the mirrors 16 of the light-direction controller 4 at the other end. The surface area of the exposed core increases in the bottom portion of the notches in progression to the downstream side in the traveling direction of the light. The depth of the notches 17 in the core may be varied in lieu of varying the exposed surface area of the core 11 in the bottom portion of the notches 17 in the lengthwise direction of the main fibers 5 to 7.

Resin (not shown) is filled between the optical fibers 2 and the light-direction controller 4, and between the light-direction controller 4 and main fibers 5 to 7; and a self-forming light-guide path is formed inside the resin.

The method for determining the arrangement of the notches 13 in the optical fibers 2 is described below, with reference to FIGS. 7A and 7B. The notches 13 will generally be referred to hereinbelow as light-emitting portions. This is because the determination method described below is not limited to providing notches in the fiber and leaking the light from the notches, but also applies to providing projections in the optical fiber and leaking light from the projections, and to other cases.

The parameters used in the discussion are described first. As shown in FIG. 7A, $I_0$ is the intensity of the light incident to one end of an optical fiber. The portions that contribute to light emission in the optical fiber are divided into n number (where n is an integer of 2 or higher) of micro-regions 20 along the lengthwise direction of the optical fiber. Also, $I_{k-1}$ is the intensity of the incident light that enters the micro-region 20 from the preceding micro-region on the upstream side in the $k^{th}$ (where k is an integer between 1 and n) micro-region 20, as shown in FIG. 7B. $L_k$ is the intensity of the light emitted from the micro-region 20 to the next micro-region on the downstream side. $A_k$ is the total of the intensity of the attenuated light produced by leaked light from the portions other than light-emitting portions, and the intensity of the attenuated light produced as the incident light is propagated through the micro-region 20, i.e., the intensity of the attenuated light caused by absorption within the micro-region 20. $L_k$ is the intensity of the light leaked in the desired direction from the light-emitting portions, i.e., the direction facing the mirrors 14 and 15 and the optical fibers 2. $B_k$ is the intensity of the light leaked from the light-emitting portions in directions other than the desired direction, i.e., the intensity of the light leaked in undesired directions due to nonuniformities in the optical path of the propagated light brought about by the presence of the light-emitting portions.

In this case, the amount of optical loss per unit length in the optical fibers 2, i.e., the attenuation coefficient, is considered to be fixed. In view of the above, α is defined to be the attenuation coefficient. With the parameters defined in this manner, Eq. 1 noted below holds true, and the optical loss $A_k$ in the micro-regions is the same in all the micro-regions.

$$A_k = \alpha \times I_{k-1} \qquad \text{[Eq. 1]}$$

The intensity $B_k$ of light that has leaked from the light-emitting portions in directions other than the desired direction is thought to have a fixed ratio in accordance with the intensity $L_k$ of light emitted from the light-emitting portions in the desired direction. Therefore, Eq. 2 holds true, where γ is the above-noted ratio.

$$B_k = \gamma \times L_{k-1} \quad [\text{Eq. 2}]$$

The light intensity $L_k$ emitted from the light-emitting portions in the desired direction is the result of multiplying the incident light intensity by a coefficient determined by the efficiency of the light-emitting portions. In the present embodiment, since the efficiency of the light-emitting portions is varied in the lengthwise direction of the optical fibers, the coefficient is defined for each of the micro-regions, and $\beta_k$ is the coefficient in the $k^{th}$ micro-region. Based on the above, Eq. 3 holds true.

$$L_k = \beta_k \times I_{k-1} \quad [\text{Eq. 3}]$$

The incident light $I_{k-1}$, attenuated light $A_k$, emitted light $I_k$, light $L_k$ leaked in the desired direction, and light $B_k$ leaked in directions other than the desired direction must satisfy Eq. 4 noted below due to the law of conservation of energy.

$$I_{k-1} = I_k + L_k + A_k + B_k \quad [\text{Eq. 4}]$$

The light $L_k$ leaked in the desired direction along the entire length of the optical fiber must be made uniform in order to substantially uniformly emit light within the plane of the row of fibers 3. For this reason, Eq. 5 preferably holds true.

$$L_n = L_{n-1} = \ldots = L_k = \ldots L_2 = L_1 \quad [\text{Eq. 5}]$$

Eq. 6 noted below holds true when the above-noted Eq. 3 is substituted into Eq. 5. Also, Eq. 7 can be derived from Eqs. 1 to 4.

$$\beta_k = \frac{I_0}{I_{k-1}} \times \beta_1 \quad [\text{Eq. 6}]$$

$$I_k = \{1 - \alpha - (1 + \gamma) \times \beta_k\} \times I_{k-1} \quad [\text{Eq. 7}]$$

Eq. 8 holds true when Eq. 6 is substituted into Eq. 7.

$$I_k = (1-\alpha) \times I_{k-1} - (1+\gamma) \times \beta_1 \times I_0 \quad [\text{Eq. 8}]$$

It is apparent from Eq. 8 that of the factors for determining the light $I_k$ emitted from the $k^{th}$ micro-region into the $(k+1)^{th}$ micro-region, the factor related to leaked light can be expressed by the coefficient $\beta_k$ of the first micro-region and the incident light $I_0$ to the micro-region, rather than the coefficient $\beta_k$ of the corresponding micro-region and the incident light $I_{k-1}$ that is incident to the micro-region. When Eq. 8 is furthermore substituted for the incident light $I_{k-1}$ in Eq. 8, Eq. 9 holds true when k is 1 or higher.

$$I_k = (1-\alpha)^k \times I_0 - \left\{\sum_{i=1}^{k}(1-\alpha)^{i-1}\right\} \times (1+\gamma) \times \beta_1 \times I_0 \quad [\text{Eq. 9}]$$

By designing the light-emitting portions so that Eq. 9 is satisfied, an optical fiber can be obtained in which a uniform light is emitted in the lengthwise direction. A row of fibers that emits uniform light within a plane can be obtained by arranging such optical fibers in a single row. In actual practice, the characteristics across the entire length of the optical fiber can be designed when the following parameters are determined: the attenuation coefficient α, the ratio γ of light leaked in directions other than the desired direction in the light-emitting portions, the coefficient $\beta_1$ of light leaked in the desired direction in the first micro-region, and the number n of divided micro-regions.

If the attenuation of light in the micro-regions can be ignored, i.e., when α=0, then Eq. 9 can be simplified as shown in Eq. 10.

$$I_k = I_0 - k \times (1+\gamma) \times \beta_1 \times I_0 \quad [\text{Eq. 10}]$$

If the light leaked in directions other than the desired direction due to the presence of the light-direction controller can be ignored, i.e., when γ=0, then Eq. 10 can be simplified as Eq. 11.

$$I_k = (1 - k \times \beta_1) \times I_0 \quad [\text{Eq. 11}]$$

The characteristics of an optical fiber can be designed by making use of any of Eqs. 9 to 11. If Eq. 11 is used, for example, the characteristics across the entire length of the optical fiber can be designed when the number n of divided micro-regions and the coefficient $\beta_1$ in the first micro-region are determined. The characteristics across the entire length can be designed when the number n of divided micro-regions and the emitted light $I_n$ emitted from the final $(n^{th})$ micro-region are determined using Eq. 11.

The density of the light-emitting portions in the micro-region is about 1.486 when the intensity $I_k$ of the incident light of the $k^{th}$ micro-region positioned in the center area in the lengthwise direction of the optical fiber is 67.3, where the intensity $I_0$ of the incident light from the upstream-most side, i.e., the side from which light enters into the first micro-region, is 100, and the density of the light-emitting portions is 1. Also, the density of the light-emitting portions in the micro-region is about 2.94 when the intensity $I_n$ of the incident light of the $n^{th}$ micro-region from the downstream-most side of the optical fiber, i.e., the side from which light enters into the first micro-region, is 34. The amount of leaked light in the first micro-region, the $k^{th}$ micro-region, and the $n^{th}$ micro-region from the light-incident side can be made to be substantially equal to each other by setting the density of the light-emitting portions in the micro-regions in the manner described above because the amount of leaked light in the micro-regions is made proportional to the quantity obtained by multiplying the intensity of the incident light and the density of the light-emitting portions.

Figure 8:
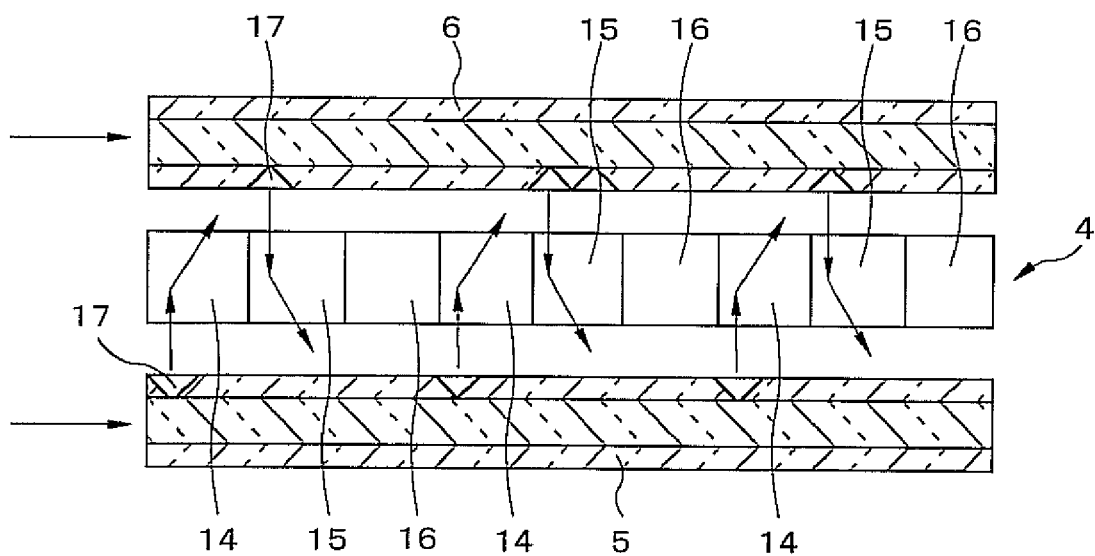
FIG. 8 is a front view showing the operation of the light-direction controller and the optical fiber in the vicinity of the controller.

Described next is the operation of the thus-configured light source device according to the present embodiment. FIG. 8 is a front view showing the operation of the light-direction controller and the optical fiber in the vicinity of the controller. Each of the light sources 8 to 10 emits light as shown in FIG. 3. Light emitted form the light source 8 enters the main fiber 5 by way of a lens (not shown), for example, and leaks from the notches 17 while traveling through the core 11 of the main fiber 5, as shown in FIG. 6. In this situation, the light intensity that is conducted within the main fiber 5 is reduced as the light progresses to the downstream side in the traveling direction of the light of the main fiber 5. Since the exposed surface area of the core 11 in the bottom portion of the notches 17 progressively increases, substantially the same amount of light leaks from all the notches 17 as a result. In this manner, the main fiber 5 not only simply guides the light emitted from the light source 8, but also functions as an optical distributor that causes light to diverge into the numerous notches 17.

Light emitted from the notches 17 of the main fiber 5 is guided through each of the self-forming light-guide paths and moves upward to become incident on the mirrors 14 of the light-direction controller 4, as shown in FIGS. 5 and 8. The normal direction of the mirrors 14 forms a 45° angle with respect to both the direction facing the optical fibers 2 and the downward direction, i.e., the direction facing the notches 17 of the main fiber 5. Therefore, the light incident on the mirrors 14 from the notches 17 of the main fiber 5 is reflected by the mirrors 14, is guided through the self-forming light-guide paths, and is made to enter the corresponding optical fiber 2.

Light that has entered the optical fibers 2 leaks from the notches 13 while traveling through the interior of the core 11 of the optical fibers 2, as shown in FIG. 4. A portion of the light guided through the interior of the optical fibers 2 leaks from the notches 13 while passing through areas in which the notches 13 are disposed, and the remainder of the light continues traveling through the optical fibers 2. For this reason, the light intensity that passes through the optical fibers 2 is reduced with each passage through an area in which notches 13 are disposed, i.e., with progression downstream in the traveling direction of light, and the amount of light that leaks from the notches 13 is reduced for notches 13 that are disposed further downstream. However, since the arrangement density of the notches 13 increases in progression to the downstream side of the optical fibers 2, the light intensity that leaks from the optical fibers 2 per unit length is substantially uniform in the lengthwise direction of the optical fibers 2.

Light emitted from the light source 9 is conducted through the interior of the core 11 of the main fiber 6 and is allowed to leak from the notches 17. In this case, since the surface area of the exposed core 11 in the bottom portion of the notches 17 increases in progression downstream from the main fiber 6 in the same manner as the main fiber 5, substantially the same amount of light leaks through all the notches 17. In other words, the main fiber 6 branches the light emitted from the light source 9 into the notches 17. The light emitted from the notches 17 of the main fiber 6 is guided through each of the self-forming light-guide paths, and travels downward to be incident on the mirrors 15 of the light-direction controller 4. The normal direction of the mirrors 15 forms a 45° angle with respect to both the direction facing the optical fibers 2 and the upward direction, i.e., the direction facing the notches 17 of the main fiber 6. Therefore, the light incident on the mirrors 15 from the notches 17 of the main fiber 6 is reflected by the mirrors 15, is guided through the self-forming light-guide paths, and is allowed to enter the corresponding optical fiber 2. In this case, the optical fibers 2 for receiving light emitted from the light source 9 are different optical fibers than the optical fibers 2 for receiving light emitted from the light source 8. Light that has entered the optical fibers 2 leaks from the notches 13 while traveling through the core 11 of the optical fibers 2. In this case, the light intensity that leaks per unit length from the optical fibers 2 is substantially uniform in the lengthwise direction of the optical fibers 2.

Light emitted from the light source 10 is conducted through the interior of the core 11 of the main fiber 7 and is allowed to leak from the notches 17. In this case, substantially the same amount of light leaks through all the notches 17 in the main fiber 7 as well, in the same manner as in the main fibers 5 and 6. The light emitted from the notches 17 of the main fiber 7 is guided through each of the self-forming light-guide paths and is allowed to enter the corresponding optical fiber 2. In this case, the optical fibers 2 for receiving light emitted from the light source 10 are different optical fibers than the optical fibers 2 for receiving light emitted from the light sources 8 and 9. Light that has entered the optical fibers 2 leaks from the notches 13 while traveling through the core 11 of the optical fibers 2. In this case, the light intensity that leaks per unit length from the optical fibers 2 is substantially uniform in the lengthwise direction of the optical fibers 2. Light that has passed through the optical fibers 2 and arrived at the end portion of the optical fibers 2 is emitted from the end portions and is incident on the mirrors 16 of the light-direction controller 4 by way of the self-forming light-guide paths. The light is then reflected by the mirrors 16, made to enter the same optical fibers 2 again by way of the self-forming light-guide paths, and emitted from the notches 13 while passing through the optical fibers 2.

In this manner, light emitted from the light sources 8 to 10 is brought to the light-direction controller 4 by way of each of the main fibers 5 to 7, the direction of the light is three-dimensionally controlled by the light-direction controller 4, and the light is made to enter mutually different optical fibers 2. Uniform planar light can thereby be emitted from the entire row of fibers 3.

The effects of the present embodiment are described next. In the present embodiment, a light-direction controller 4, in which mirrors 14 to 16 are formed in positions corresponding to the optical fibers 2, is disposed at one end of the row of fibers 3 along the array direction of the optical fibers 2. A main fiber 5 connected to a light source 8 is disposed below the light-direction controller 4. A main fiber 6 connected to a light source 9 is disposed above the light-direction controller 4. The mirrors 14 and 15 are sloped so that the light emitted from each of the main fibers 5 and 6 enters one end of each of the optical fibers 2, and a main fiber 7 connected to a light source 10 is connected to the other end of the optical fibers 2. Therefore, the light sources 8 to 10 can be optically connected to the optical fibers 2 by using a simple configuration.

The thickness of the light source device 1 is the total thickness of the main fiber 5, light-direction controller 4, and main fiber 6 even at the thickest point. In this case, the thickness of the main fibers 5 and 6 is about the same as the diameter of the optical fibers 2, e.g., about several hundred microns. The thickness of the light-direction controller 4 is about the same as the thickness of the row of fibers 3, and is therefore about the same as the diameter of the optical fibers 2. For this reason, the thickness of the entire light source device 1 is less than 1 mm, for example, and can be made very thin. When the light source device 1 is used as a backlight for a liquid crystal display device, an increase in the thickness because of the backlight can be kept to the thickness of two optical fibers 2 by disposing the main fiber 6 to the side of the liquid crystal panel. A very thin backlight can thereby be achieved.

Also, by providing a light-direction controller 4, a bulky layout is not required in order to connect the light sources 8 to 10 to the optical fibers 2, and the light source device 1 can be made light and compact.

In the main fibers 5 to 7, the surface area of the exposed core 11 in the bottom portion of the notches 17 increases in progression to the downstream side of the traveling direction of the light. Therefore, substantially the same amount of light can be leaked from all of the notches 17. Substantially the same amount of light can thereby enter all of the optical fibers 2. In the optical fibers 2, the density of the arrangement of notches 13 increases in progression to the downstream side of the traveling direction of the light. The light intensity that is leaked per unit length from the optical fibers 2 can therefore be made substantially uniform in the lengthwise direction of the optical fibers 2. As a result, a uniform planar light can be emitted from the row of fibers 3.

In the present embodiment, since optical fibers are used to guide light from the light source, the loss of light is low, and a light source device having a very high light efficiency can be obtained.

In the light source device 1 according to the present embodiment, a self-forming light-guide path provides an optical connection between the main fibers 5 and 6 and the light-direction controller 4, between the light-direction controller 4 and optical fibers 2, and between the main fiber 7 and optical fibers 2. The loss of light between these constituent elements can therefore be reduced. As a result, a light source device having a very high light efficiency can be obtained.

An example was shown in the present embodiment in which the light emitted from the notches 13 of the optical fibers 2 is mutually parallel, but the light emitted from the notches 13 is not required to be parallel as long as the light is within an angle range that allows the light to enter the object to be illuminated. Specifically, the light beams emitted from the notches 13 of the optical fibers 2 may have a certain angle in relation to each other as long as the object to be illuminated is illuminated with good efficiency, visibility is increased, and other effects are achieved. When objects to be illuminated exist in a plurality of directions, such as when, e.g., when the upward and downward direction of the row of fibers 3 must be illuminated, the angle of light emission can be freely set in accordance with the purpose of illumination.

In the present embodiment, an example is shown in which the mirrors 14 to 16 of the light-direction controller 4 are arrayed with the same period as the array period of the optical fibers 2, and the mirrors are in a one-to-one relationship with the optical fibers 2, but the present invention is not limited to this configuration, and the mirror-to-optical fiber ratio may be 1:2, 3:2, or another ratio in accordance with the needs of design or manufacturing.

Figure 9:
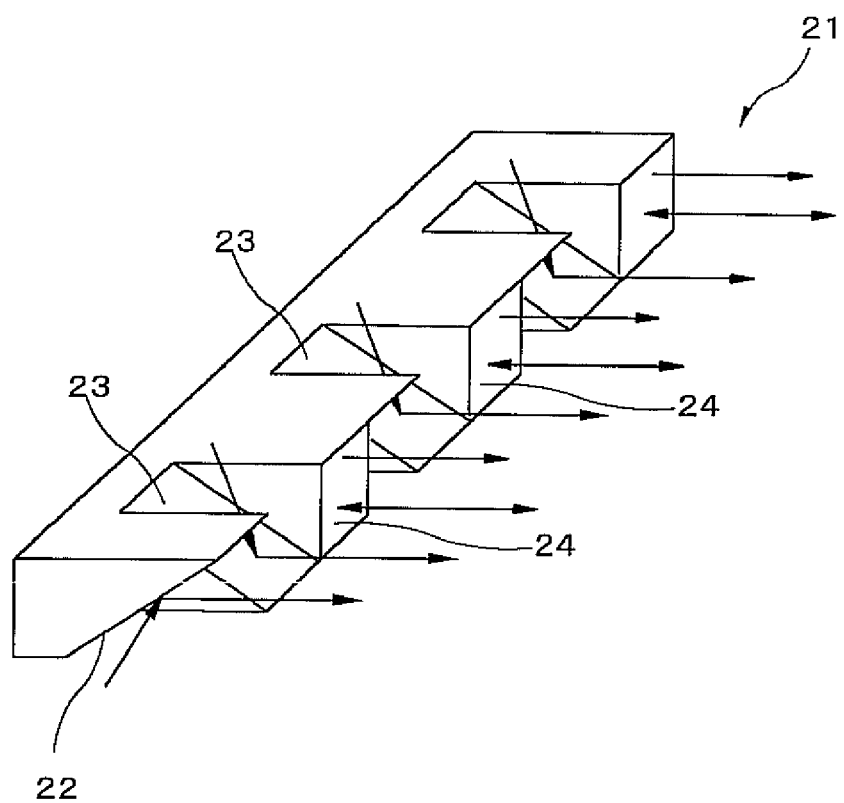
FIG. 9 is a perspective view showing the light-direction controller in the second embodiment of the present invention.

The second embodiment of the present invention is described next. FIG. 9 is a perspective view showing the light-direction controller 4 in the present embodiment. In the light source device according to the present embodiment, the shape of the light-direction controller is different in comparison with the first embodiment described above. Three types of mirrors 22 to 24 are formed on the surface of the light-direction controller 21 facing the optical fibers 2 (see FIG. 3), as shown in FIG. 9. The mirrors 22 cause light that has leaked from the notches of the main fiber 5 to be reflected toward the optical fibers 2 (see FIG. 3), and correspond to the mirrors 14 (see FIG. 5) in the first embodiment described above. However, the normal direction of the mirrors 22 is the direction inclined 30°, for example, from the downward direction toward the optical fibers 2, rather than the direction inclined 45° from the downward direction toward the optical fibers 2, as is the case of the mirrors 14.

The mirrors 23 cause light that has leaked from the notches of the main fiber 6 to be reflected toward the optical fibers 2 (see FIG. 3), and correspond to the mirrors 15 (see FIG. 5) in the first embodiment described above. However, the normal direction of the mirrors 23 is the direction inclined 30°, for example, from the upward direction toward the optical fibers 2, rather than the direction inclined 45° from the upward direction toward the optical fibers 2, as is the case of the mirrors 15. Also, the normal direction of the mirrors 24 is the direction facing the optical fibers 2, in the same manner as in the case of the mirrors 16 in the first embodiment described above.

The positions in which the main fibers 5 and 6 are disposed are areas offset in directions away from the row of fibers 3 (see FIG. 3) and further below the mirrors 22 and above the mirrors 23, rather than the areas directly below the mirrors 22 and directly above the mirrors 23, respectively. Planar light emitted from the row of fibers 3 is thereby no longer blocked by the main fiber 6. The configuration, operation, and effects other than those described above in the present embodiment are the same as those in the first embodiment described above.

In the first embodiment described above, an example was shown in which the normal direction of the inclined mirrors, e.g., the mirror 15 of the light-direction controller 4, was a direction inclined 45° relative to the direction facing the optical fibers 2, but the angle of inclination is not limited to 45° and can be freely set in accordance with the needs of design and manufacture, as shown in the present embodiment. When the diameter of the main fibers 5 to 7 is different than the diameter of the optical fibers 2, for example, the normal direction of the mirrors can be modified to reduce the size of the light source device as much as possible so that the main fibers 5 to 7 do not interfere with the emission of light from the notches 13.

Figure 10A:
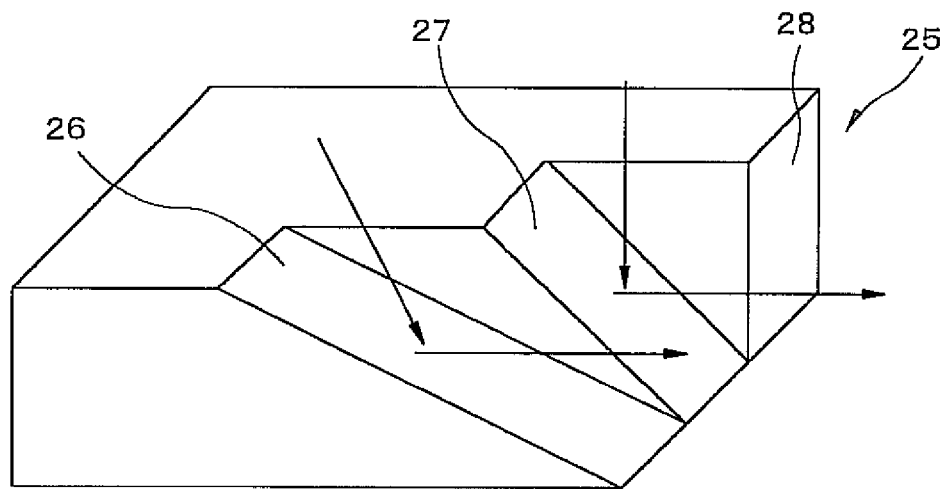
FIG. 10A is a perspective view showing the light-direction controller in the third embodiment of the present invention.
Figure 10B:
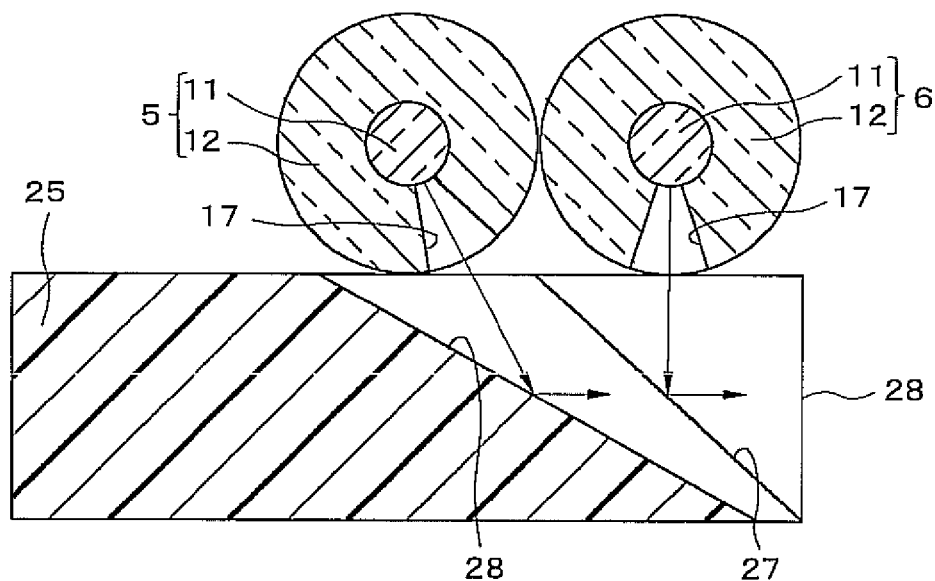
FIG. 10B is a cross-sectional side view of the light-direction controller.
Figure 10C:
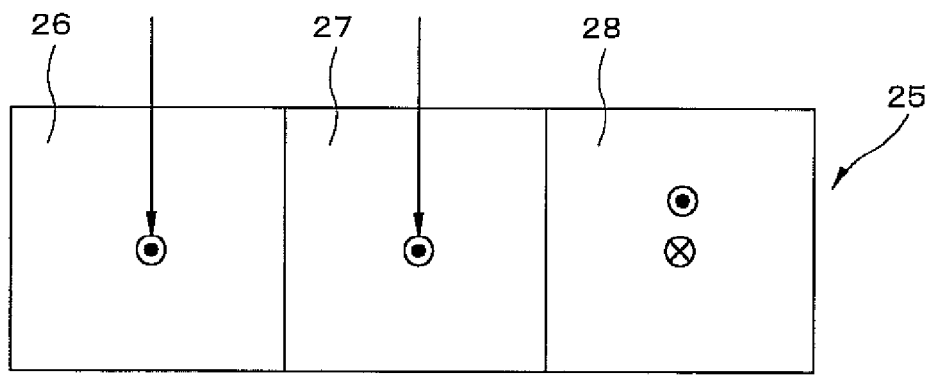
FIG. 10C is a front view of the light-direction controller.

The third embodiment of the present invention is described next. FIG. 10A is a perspective view showing the light-direction controller in the present embodiment, FIG. 10B is a cross-sectional side view of the light-direction controller, and FIG. 10C is a front view of the light-direction controller. In the light source device according to the present embodiment, the shape of the light-direction controller and the arrangement of the main fibers is different in comparison with the light source device according to the first embodiment described above, as shown in FIGS. 10A to 10C. Specifically, in the present embodiment, three types of mirrors 26 to 28 are formed in a repeating fashion in the stated order on the surface facing the optical fibers 2 (see FIG. 3) in the light-direction controller 25. The normal direction of the mirror 26 is the direction inclined 30° from the upward direction toward the optical fibers 2, the normal direction of the mirror 27 is the direction inclined 45° from the upward direction toward the optical fibers 2, and the normal direction of the mirror 28 is the direction facing the optical fibers 2. In FIGS. 10A to 10C, only one mirror selected from the mirrors 26 to 28 is shown for convenience in diagramming, but the mirrors 26 to 28 are arrayed in repeating fashion along the lengthwise direction of the light-direction controller 25.

The two main fibers 5 and 6 are disposed above the light-direction controller 25, and the main fiber 5 is disposed in a position further away from the row of fibers 3 than the main fiber 6. In the main fiber 5, notches 17 are formed in positions toward the optical fibers 2 slightly away from the lowest surface, and notches 17 are formed on the lowest surface of the main fiber 6. The light emitted from the notches 17 of the main fiber 5 is thereby reflected by the mirrors 26 of the light-direction controller 25 and is caused to enter the optical fibers 2, and the light emitted from the notches 17 of the main fiber 6 is thereby reflected by the mirrors 27 of the light-direction controller 25 and is caused to enter the optical fibers 2.

In the present embodiment, since the two main fibers 5 and 6 can be disposed above the light-direction controller 25, the light source device can be made thinner because a main fiber is not required to be disposed below the light-direction controller 25. The configuration, operation, and effects other than those described above in the present embodiment are the same as those in the first embodiment described above.

Figure 11A:
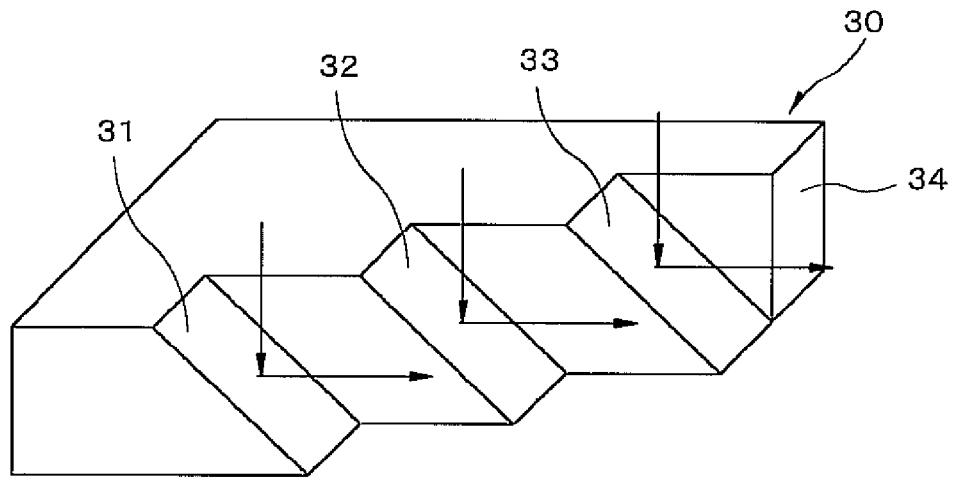
FIG. 11A is a perspective view showing the light-direction controller in the fourth embodiment of the present invention.
Figure 11B:
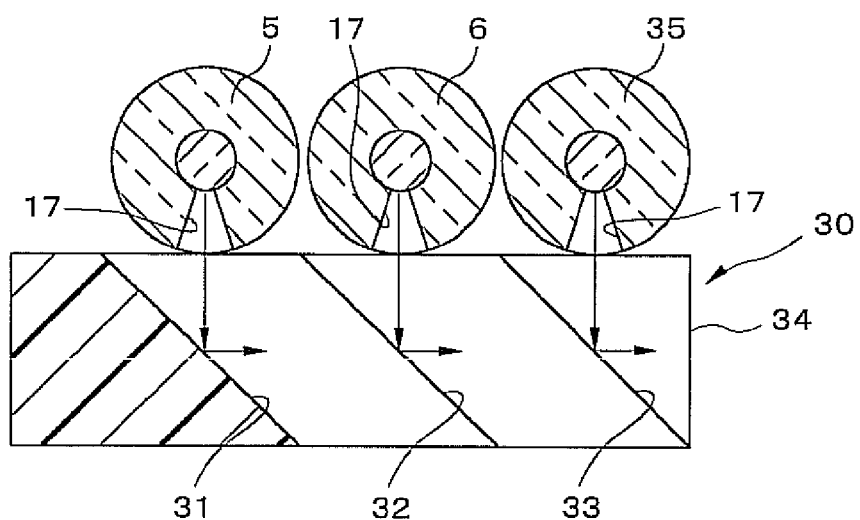
FIG. 11B is a cross-sectional side view of the light-direction controller.
Figure 11C:
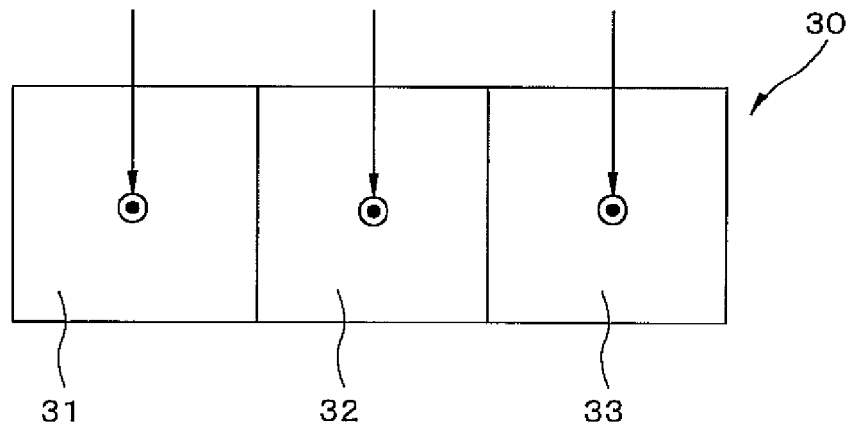
FIG. 11C is a front view of the light-direction controller.

The fourth embodiment of the present invention is described next. FIG. 11A is a perspective view showing the light-direction controller in the present embodiment, FIG. 11B is a cross-sectional side view of the light-direction controller, and FIG. 11C is a front view of the light-direction controller. In the light source device according to the present embodiment, the shape of the light-direction controller and the number of main fibers are different in comparison with light source device according to the first embodiment described above, as shown in FIGS. 11A to 11C. Specifically, in the light-direction controller 30 in the present embodiment, four types of mirrors 31 to 34 are formed on the surface facing the optical fibers 2 (see FIG. 3). The normal direction of the mirrors 31 to 33 is inclined 45° relative to both directions, i.e., the upward direction and the direction facing the optical fibers 2. The normal direction of the mirror 34 is the direction facing the optical fibers 2. The mirrors 31 to 34 are positioned at mutually different distances from the row of fibers 3. In other words, the mirror 31 is in the farthest position from the row of fibers 3, the mirror 32 is in the second farthest position, the mirror 33 is in the third farthest position, and the mirror 34 is in the nearest position. In FIGS. 11A to 11C, only one mirror selected from the mirrors 31 to 34 is shown for convenience in diagramming, but the mirrors 31 to 34 are arrayed in repeating fashion along the lengthwise direction of the light-direction controller 30.

In this light source device, a main fiber 35 is disposed in addition to the main fibers 5 to 7, and the main fibers 5, 6, and 35 are disposed in the stated order along the direction toward the row of fibers 3. The notches 17 of the main fiber 5 are disposed in positions facing the mirrors 31, the notches 17 of the main fiber 6 are disposed in positions facing the mirrors 32, and the notches 17 of the main fiber 35 are disposed facing the mirrors 33. Light that has leaked from the notches 17 of the main fibers 5, 6, and 35 is thereby reflected by the mirrors 31, 32, and 33, respectively, and is made to enter mutually different optical fibers 2. The main fiber 7 is connected to the other end of the optical fibers 2, in the same manner as in the first embodiment described above; and light that has leaked from the main fiber 7 and has been guided through the optical fibers 2 is reflected by the mirrors 34 and is made to re-enter the optical fibers 2.

In accordance with the present embodiment, three main fibers can be connected to one side of the row of fibers 3. The configuration, operation, and effects other than those described above in the present embodiment are the same as those in the first embodiment described above.

Figure 12A:
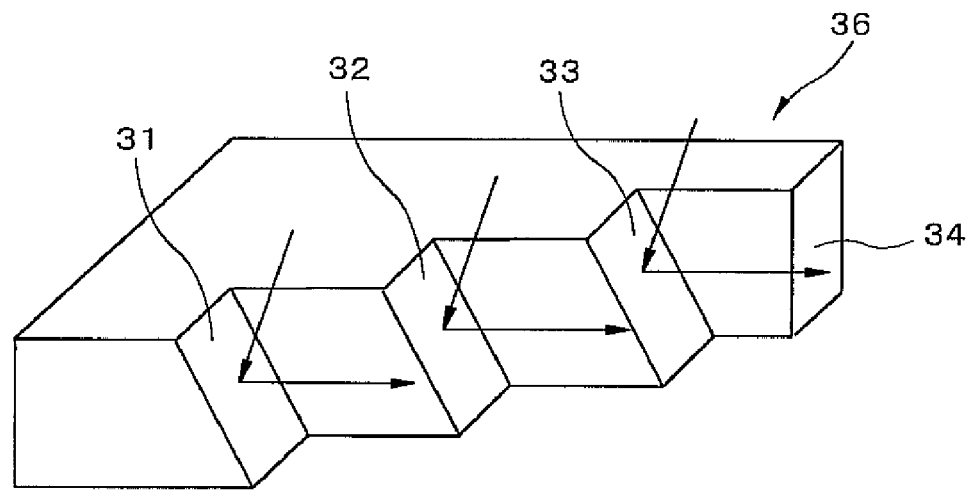
FIG. 12A is a perspective view showing the light-direction controller in the fifth embodiment of the present invention.
Figure 12B:
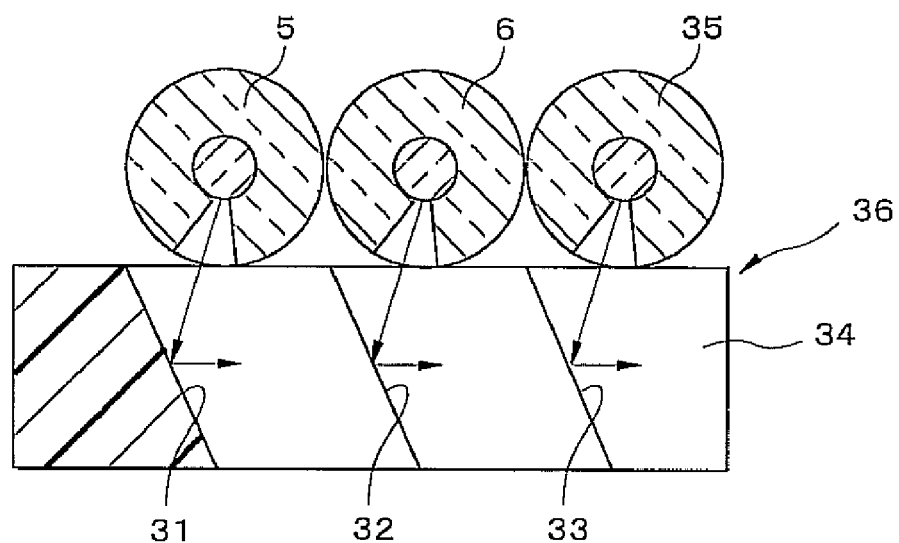
FIG. 12B is a cross-sectional side view of the light-direction controller.

The fifth embodiment of the present invention is described next. FIG. 12A is a perspective view showing the light-direction controller in the present embodiment, and FIG. 12B is a cross-sectional side view of the light-direction controller. In the present embodiment, the inclined angle of the mirrors 31 to 33 is different in comparison with the fourth embodiment described above, as shown in FIGS. 12A and 12B. Specifically, in the present embodiment, the normal direction of the mirrors 31 to 33 of the light-direction controller 36 is inclined 60° from the upward direction toward the row of fibers 3 (see FIG. 3). The arrangement positions of the main fibers 5, 6, and 35 are further offset in accordance therewith toward the row of fibers 3 than in the fourth embodiment described above. In accordance with the present embodiment, the angle of the corners of the light-direction controller 36 can be set at 60° or greater. This eliminates the need to form sharp angles of less than 60°, which facilitates the formation of a light-direction controller 36. The configuration, operation, and effects other than those described above in the present embodiment are the same as those in the fourth embodiment described above.

Figure 14:
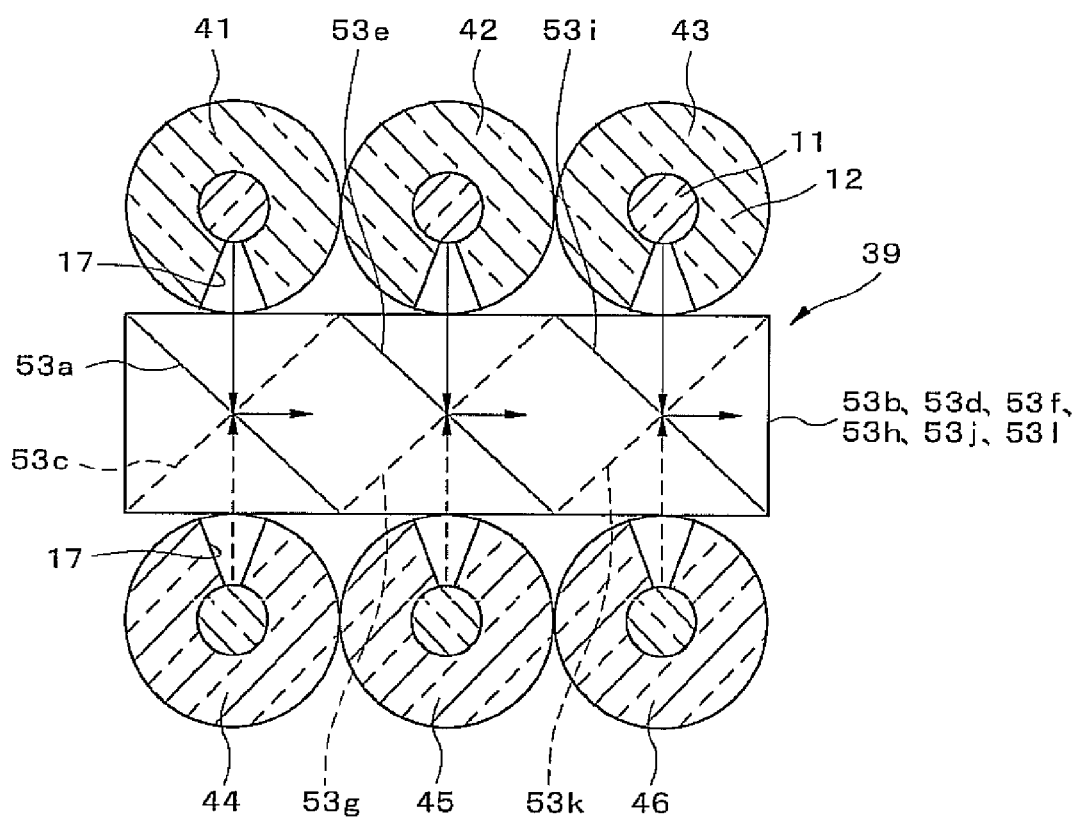
FIG. 14 is a schematic side view showing the light-direction controller in the present embodiment.
Figure 15:
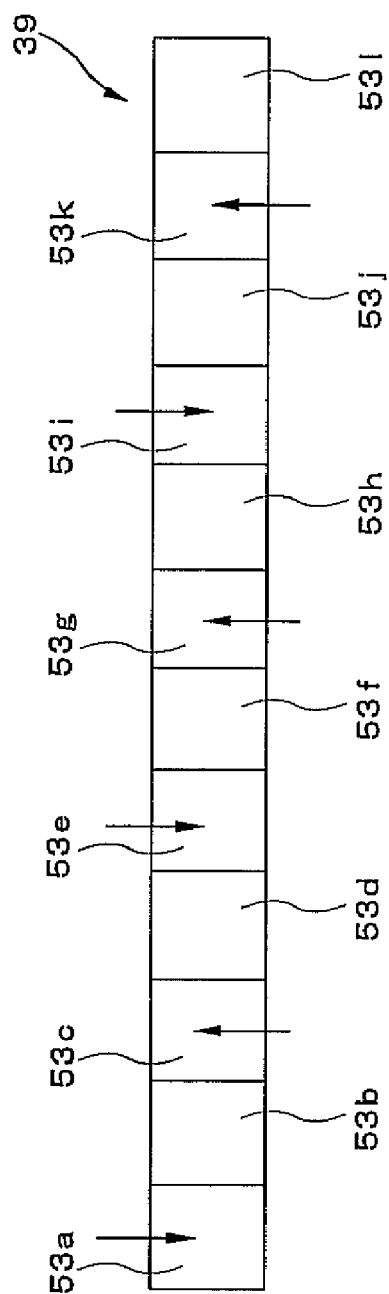
FIG. 15 is a front view showing the light-direction controller in the present embodiment.

The sixth embodiment of the present invention is described next. FIG. 13 is a perspective view showing the light source device according to the present embodiment. FIG. 14 is a schematic side view showing the light-direction controller in the present embodiment. FIG. 15 is a front view showing the light-direction controller. In the light source device 38 according to the present embodiment, a light-direction controller 39 is disposed at one end of a row of fibers 3, and a light-direction controller 40 is disposed at the other end of the row of fibers 3, as shown in FIG. 13. Main fibers 41 to 43 are disposed above the light-direction controller 39 and are arrayed in parallel to each other in the stated order beginning on the side furthest away from the row of fibers 3. Main fibers 44 to 46 are disposed below the light-direction controller 39 and are arrayed in parallel to each other in the stated order beginning on the side furthest away from the row of fibers 3. Main fibers 47 to 49 are disposed above the light-direction controller 40 and are arrayed in parallel to each other in the stated order beginning on the side furthest away from the row of fibers 3, and main fibers 50 to 52 are disposed below the light-direction controller 40 and are arrayed in parallel to each other in the stated order beginning on the side furthest away from the row of fibers 3. Notches 17 are formed at equal intervals on each of the main fibers 41 to 52, in the same manner as in the first embodiment described above, and light sources (not shown) are connected to each of the ends of the main fibers 41 to 52.

As shown in FIG. 14, 12 types of mirrors 53a to 53l are formed in a repeating fashion in the stated order on the surface of the side facing the row of fibers 3 in the light-direction controller 39. The mirrors 53a to 53l (also generically referred to hereinafter as mirrors 53) are configured so that mirrors whose normal direction is inclined 45° relative to the direction facing the row of fibers 3, and mirrors whose normal direction matches the direction facing the row of fibers 3 are arrayed in an alternating fashion. Specifically, the mirrors 53a, 53c, 53e, 53g, 53i, and 53k are mirrors whose normal direction is inclined 45° relative to the direction facing the row of fibers 3; and the mirrors 53b, 53d, 53f, 53h, 53j, and 53l are mirrors whose normal direction matches the direction facing the row of fibers 3. Among the mirrors inclined 45°, the mirrors inclined in the upward direction and the mirrors inclined in the downward direction are arrayed in an alternating fashion. Specifically, the mirrors 53a, 53e, and 53i are mirrors whose normal direction is inclined 45° from the direction facing the row of fibers 3 to the upward direction; and the mirrors 53c, 53g, and 53k are mirrors whose normal direction is inclined 45° from the direction facing the row of fibers 3 to the downward direction.

The mirrors 53a, 53e, and 53i inclined 45° in the upward direction are formed in positions offset from each other, where the mirror 53a is the furthest from the row of fibers 3, and the mirror 53i is the nearest to the row of fibers 3. The mirrors 53c, 53g, and 53k inclined 45° in the downward direction are formed in positions offset from each other, where the mirror 53c is the furthest from the row of fibers 3, and the mirror 53k is the nearest to the row of fibers 3. The mirrors 53b, 53d, 53f, 53h, 53j, and d53l, which are not inclined, are disposed at mutually equal distances from the row of fibers 3. Specifically, the mirrors are formed on the surface nearest to the row of fibers 3 in the light-direction controller 39.

The notch 17 of the main fiber 41 is formed in a position corresponding to the mirror 53a, the notch 17 of the main fiber 42 is formed in a position corresponding to the mirror 53e, and the notch 17 of the main fiber 43 is formed in a position that corresponds to the mirror 53i Also, the notch 17 of the main fiber 44 is formed in a position corresponding to the mirror 53c, the notch 17 of the main fiber 45 is formed in a position corresponding to the mirror 53g, and the notch 17 of the main fiber 46 is formed in a position that corresponds to the mirror 53k. The mirrors 53a to 53l face one end of the first to twelfth optical fibers, respectively, of the row of fibers 3. The first to twelfth optical fibers are optical fibers arrayed in a repeating fashion in the stated order in the row of fibers 3.

In a similar fashion, 12 types of mirrors are formed in a repeating fashion and are made to face the other end of the first to twelfth optical fibers of the row of fibers 3. In this case, if one end of the optical fiber is facing a mirror that is inclined 45°, the other end is facing a mirror that is not inclined, and if one end is facing a mirror that is not inclined, the other end is facing a mirror that is inclined 45°. A resin is filled between the main fibers 41 to 46 and the light-direction controller 39, between the light-direction controller 39 and the row of fibers 3, between the main fibers 47 to 52 and the light-direction controller 40, and between the light-direction controller 40 and the row of fibers 3; and self-forming light-guide paths are formed.

The light emitted from the notch 17 of the main fiber 41 is reflected by the mirror 53a of the light-direction controller 39 and is made to enter the first optical fiber. The light emitted from the notch of the main fiber 47 is reflected by the second mirror of the light-direction controller 40 and is made to enter the second optical fiber. The light emitted from the notch of the main fiber 44 is reflected by the mirror 53c of the light-direction controller 39 and is made to enter the third optical fiber. The light emitted from the notch of the main fiber 50 is reflected by the fourth mirror of the light-direction controller 40 and is made to enter the fourth optical fiber. The light emitted from the notch of the main fiber 42 is reflected by the mirror 53e of the light-direction controller 39 and is made to enter the fifth optical fiber. The light emitted from the notch of the main fiber 48 is reflected by the sixth mirror of the light-direction controller 40 and is made to enter the sixth optical fiber. The light emitted from the notch of the main fiber 45 is reflected by the mirror 53g of the light-direction controller 39 and is made to enter the seventh optical fiber. The light emitted from the notch of the main fiber 51 is reflected by the eighth mirror of the light-direction controller 40 and is made to enter the eighth optical fiber. The light emitted from the notch of the main fiber 43 is reflected by the mirror 53i of the light-direction controller 39 and is made to enter the ninth optical fiber. The light emitted from the notch of the main fiber 49 is reflected by the tenth mirror of the light-direction controller 40 and is made to enter the tenth optical fiber. The light emitted from the notch of the main fiber 46 is reflected by the mirror 53k of the light-direction controller 39 and is made to enter the eleventh optical fiber. The light emitted from the notch of the main fiber 52 is reflected by the twelfth mirror of the light-direction controller 40 and is made to enter the twelfth optical fiber. In this manner, the light that has entered the first to twelfth optical fibers from the main fibers 41 to 52 leaks from the notches while entering the optical fibers. Light that has arrived at the other end of the optical fibers is reflected by the inclined and non-inclined mirrors and is made to re-enter the optical fibers.

Thus, in accordance with the present embodiment, 12 main fibers can be optically connected to the row of fibers 3, and 12 types of light can be introduced to the row of fibers 3. A larger-scale light source device can be configured by integrating a plurality of blocks in which 12 such main fibers are connected. A light source device in the form of an array can be configured having 480 optical fibers by arranging 40 of the above-described blocks. When this light source device is used as a backlight of a display device, the optical fibers of the light source device and the scan lines of a display panel can be configured in a 1:1 relationship as long as the number of scan lines of the display panel is 480. If the number of scan lines of the display panel is 1,360, the optical fibers of the light source device and the scan lines of the display panel can be configured in a 1:3 relationship. In this case as well, the thickness of the light source device is the thickness of three optical fibers. The configuration, operation, and effects other than those described above in the present embodiment are the same as those in the first embodiment described above.

The optical distance between the row of fibers 3 and the main fibers may be varied in accordance with the display position. In the portion furthest from the light source in the main fibers, the length of the optical path between the main fibers and the end portion of the row of fibers is shortened. In the portion nearest to the light source, the length of the optical path between the main fibers and the end portions of the row of fibers is lengthened. The difference in the brightness produced by the difference in the distance from the light source can thereby be offset. Such a configuration can be achieved by varying the distance between the light-direction controller and the row of fibers in accordance with the distance from the light source, for example. In other words, the distance between the light-direction controller and the row of fibers is increased in progression away from the light source. In this case, there is no mutually parallel arrangement between the extension direction of the light-direction controller and the extension direction of the edge of the row of fibers facing the light-direction controller, and the two directions form a fixed angle. Also, the distance between the main fibers and the light-direction controller may be varied in accordance with the distance from the light source. In other words, the distance between the main fibers and the light-direction controller is increased in progression away from the light source. In this case, the portion nearest to the light source in the main fiber is disposed so as rise above the display surface.

Figure 16:
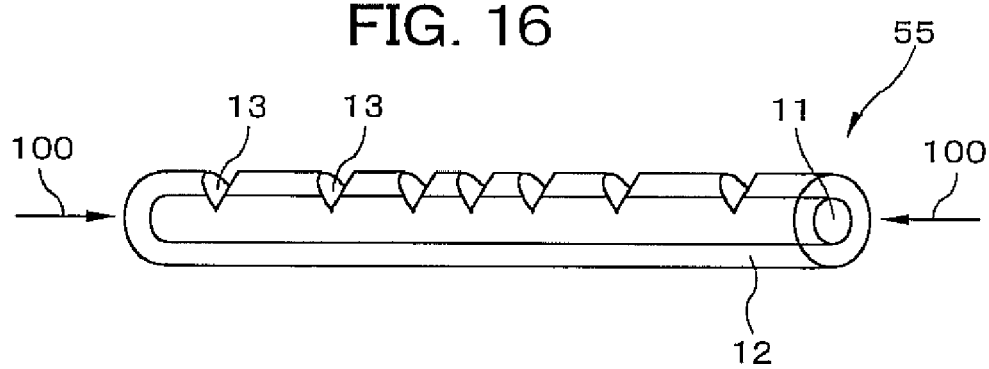
FIG. 16 is a perspective view showing the optical fiber in the seventh embodiment of the present invention.

The seventh embodiment of the present invention is described next. In the present embodiment, the configuration of the optical fibers is different in comparison with the configuration of the seventh embodiment described above. FIG. 16 is a perspective view showing the optical fiber in the present embodiment. The optical fibers 55 of the present embodiment have a core 11 and cladding 12 that covers the periphery of the core 11, and are designed to allow light to enter from both ends, as shown in FIG. 16. A plurality of notches 13 that reach the core 11 are formed in the cladding 12. The formation density of the notches 13 is highest in the center area in the lengthwise direction of the optical fibers 55 and decreases in approach to the two ends. Light can thereby be uniformly leaked in the lengthwise direction of the optical fibers 55 when light enters from the two ends of the optical fibers 55. The configuration, operation, and effects other than those described above in the present embodiment are the same as those in the first embodiment described above.

Figure 17:
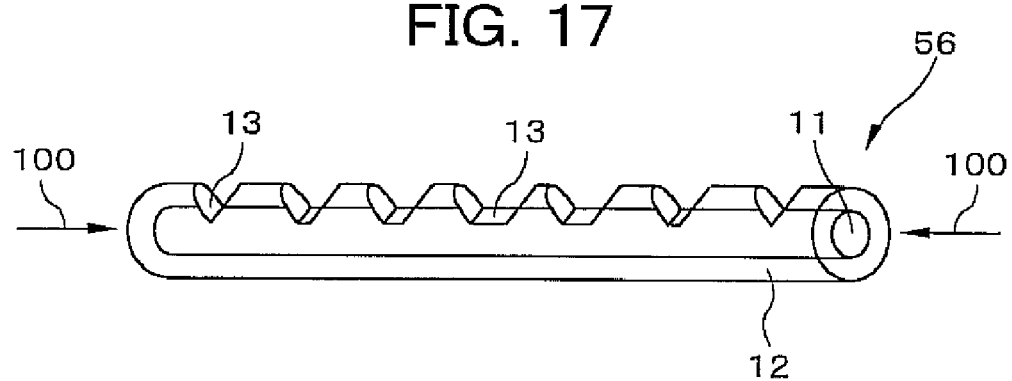
FIG. 17 is a perspective view showing the optical fiber in the eighth embodiment of the present invention.

The eighth embodiment of the present invention is described next. FIG. 17 is a perspective view showing the optical fiber in the present embodiment. In the present embodiment, the configuration of the optical fibers is different in comparison with the configuration of the seventh embodiment described above. In the optical fibers 56 of the present embodiment, notches 13 are formed at equidistant intervals in the lengthwise direction of the optical fibers 56, as shown in FIG. 17. The width of the notches 13 is greater in progression to the center area in the lengthwise direction of the optical fibers 56, and is less in approach to the two ends. The surface area of the exposed core 11 in the bottom portion of the notches 13 thereby increases in progression to the center area in the lengthwise direction of the optical fibers 56, and decreases in approach to the two ends.

As a result, the ratio of leaked light in the notches 13, i.e., the ratio between the light intensity that directly propagates through the optical fibers and the light intensity that leaks through the notches when light passes through areas in which notches are formed in the optical fibers, can be varied in the lengthwise direction of the optical fibers. As a result, the same effects can be achieved as in the case in which the formation density of the notches is varied in the lengthwise direction of the optical fibers, in the same manner as in the first embodiment described above. In other words, when light has entered from the two ends of the optical fibers 56, the light can be uniformly leaked in the lengthwise direction of the optical fibers 56. The configuration, operation, and effects other than those described above in the present embodiment are the same as those in the seventh embodiment described above.

In the present embodiment, the depth of the notches 13, i.e., the amount of penetration into the core 11, may be varied in lieu of varying the width of the notches 13 in the lengthwise direction of the optical fibers. Also, the present embodiment may be used in combination with the first embodiment described above. In other words, the formation density of the notches may be varied in the lengthwise direction of the optical fibers and the depth or width of the notches may be varied.

The ninth embodiment of the present invention is described next. In the present embodiment, the notches 13 are filled with a material having a higher index of refraction than the cladding 12. Light can thereby be reflected at the boundary surface between the inside of the notches 13 and the cladding, and the light can be sealed inside the notches in the same manner as the core. Light is thereby less liable to propagate from the notches 13 to the interior the cladding 12, and a majority of the light that has traveled from the core 11 into the notches 13 can be emitted in the desired direction. As a result, the light efficiency is increased.

In this case, the relationship between the index of refraction of the core and the index of refraction of the material filled into the notches is not particularly limited as long as the two indices of refraction are higher than the index of refraction of the cladding. Specifically, one of the two indices may be high, or the two may be the same. In the case that the two indices are the same, the notches may be filled with the same material as the material that is used to form the core.

Figure 18:
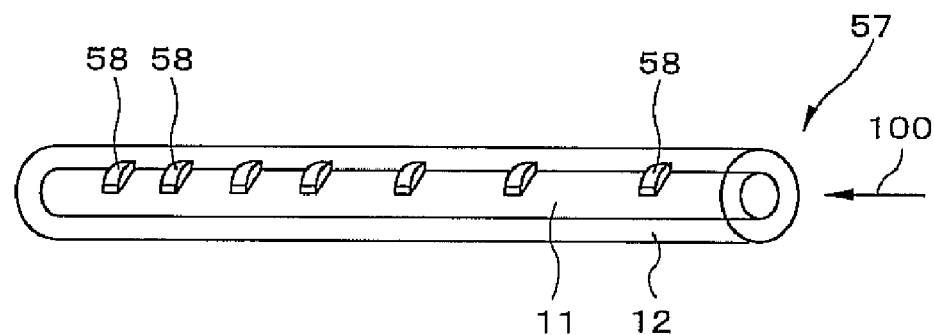
FIG. 18 is a perspective view showing the optical fiber in the tenth embodiment of the present invention.

The tenth embodiment of the present invention is described next. FIG. 18 is a perspective view showing the optical fiber in the present embodiment. In the present embodiment, the configuration of the optical fibers that forms the row of fibers is different than that of the first embodiment described above. The optical fibers 57 of the present embodiment have a core 11 and a cladding 12 that covers the core 11, and projections are formed on the upper surface of the core 11, as shown in FIG. 18. Specifically, when the optical fibers 57 are arrayed in a single row and configured to form a planar row of fibers, the projections 58 are disposed on the light-emitting side of the row of fibers. The projections 58 are formed by using a transparent material and are more densely arranged is progression away from the entrance side of the light. In other words, the arrangement density of the projections 58 is low on the upstream side of the traveling direction 100 of the light, and increases in progression toward the downstream side in the lengthwise direction of the optical fibers 57.

In other words, in the present embodiment, a portion of the light that has entered the optical fibers 57 is leaked to the exterior of the optical fibers 57 by way of the projections 58 while propagating through the core 11 along the traveling direction 100 of the light. In this case, the light intensity that is conducted through the optical fibers 57 decreases in progression to the downstream side of the traveling direction 100 of the light, but the reduction in light intensity is offset because the arrangement density of the projections 58 is higher in progression to downstream side. As a result, light is uniformly emitted along the lengthwise direction of the optical fibers 57. The configuration, operation, and effects other than those described above in the present embodiment are the same as those in the first embodiment described above.

Figure 19:
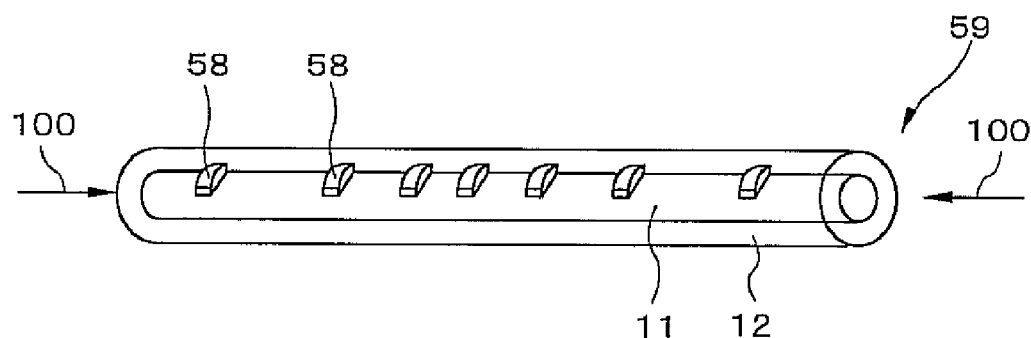
FIG. 19 is a perspective view showing the optical fiber in the eleventh embodiment of the present invention.

The eleventh embodiment of the present invention is described next. FIG. 19 is a perspective view showing the optical fiber in the present embodiment. In the present embodiment, light enters the optical fibers 59 from the two ends of the optical fibers, and the arrangement density of the projections 58 in the optical fibers 59 is high in the center area in the lengthwise direction and decreases in progression to the two ends, as shown in FIG. 19. Light can therefore be uniformly emitted in the lengthwise direction of the optical fibers 59 when the light has entered from the two ends of the optical fibers 59. The configuration, operation, and effects other than those described above in the present embodiment are the same as those in the tenth embodiment described above.

Figure 20:
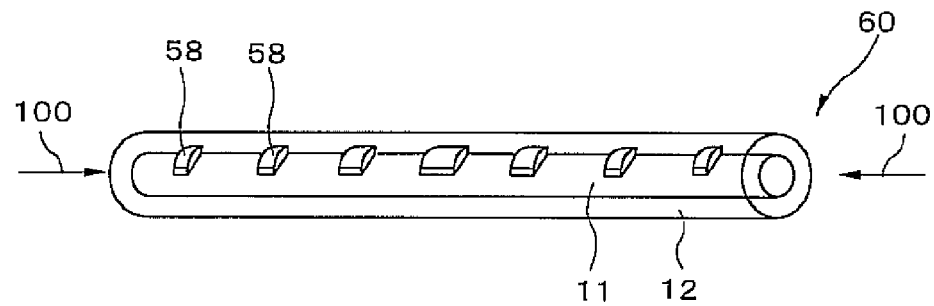
FIG. 20 is a perspective view showing the optical fiber in the twelfth embodiment of the present invention.

The twelfth embodiment of the present invention is described next. FIG. 20 is a perspective view showing the optical fiber in the present embodiment. In the present embodiment, light enters the optical fibers 60 from the two ends of the optical fibers, as shown in FIG. 20. The arrangement density of the projections 58 in the optical fibers 60 is uniform in the lengthwise direction. In other words, the projections 58 are disposed at equidistant intervals along the lengthwise direction of the optical fibers 60. However, the length of the projections 58 in the lengthwise direction of the optical fibers 60 is long in the center area in the lengthwise direction of the optical fibers 60 and decreases in progression to the two ends. The surface area of the boundary between the core 11 and the projections 58 increases in approach to the center area in the lengthwise direction of the optical fibers 60, and the ratio of the light propagated through the interior of the core 11 that enters the projections 58 increases. The surface area of the boundary decreases in approach to the two ends in the lengthwise direction, and the ratio of the light that enters the projections 58 decreases. As a result, light can be uniformly emitted in the lengthwise direction of the optical fibers 60 when the light has entered from the two ends of the optical fibers 60. The configuration, operation, and effects other than those described above in the present embodiment are the same as those in the eleventh embodiment described above.

In the present embodiment, in lieu of varying the surface area of the boundary between the projections and the core along the lengthwise direction of the optical fibers, the ratio of the light that enters the projections from the core may be varied by varying the shape of the projections. The ratio can be increased if the shape of the projections widens in progression away from the core. Also, if the height of the projections is increased to reach the external peripheral surface of the cladding, the boundary between the projections and the cladding is no longer present, and the ratio therefore increases in comparison with the case in which the boundary between the projections and the cladding is present because the projections do not reach the external peripheral surface of the cladding. This is due to the fact that light that has entered the projections from the core is no longer reflected at the boundary between the projections and the cladding.

The tenth to twelfth embodiments described above may be used in combination. In other words, the arrangement density of the projections and the length or shape of the projections may be varied together.

The thirteenth embodiment of the present invention is described next. In the present embodiment, the projections 58 are formed by using a material with a higher index of refraction than the cladding 12. Light is thereby reflected at the boundary surface between the projections 58 and the cladding, and the light inside the projections 58 can be sealed in. As a result, light is less liable to propagate from the projections 58 to the cladding 12, and a majority of the light that has progressed from the core 11 to the projections 58 can be emitted in the desired direction. As a result, the light efficiency can be increased.

In this case, the relationship between the index of refraction of the core and the index of refraction of the projections is not particularly limited as long as the two indices of refraction are higher than the index of refraction of the cladding. Specifically, one of the two indices may be high, or the two may be the same. In the case that the two indices are the same, the projections may be formed by using the same material as the material that is used to form the core.

Figure 21A:
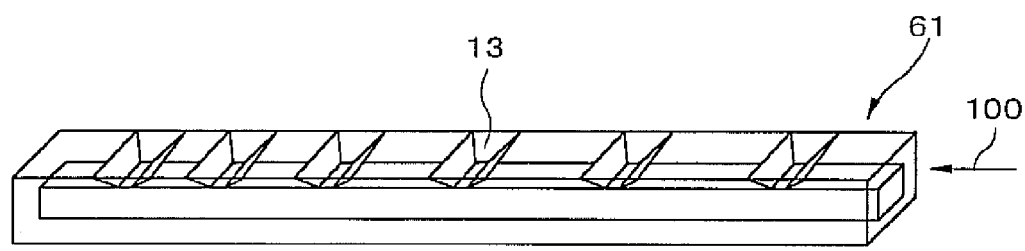
FIG. 21A is a perspective view showing the optical fiber in the fourteenth embodiment of the present invention.
Figure 21B:
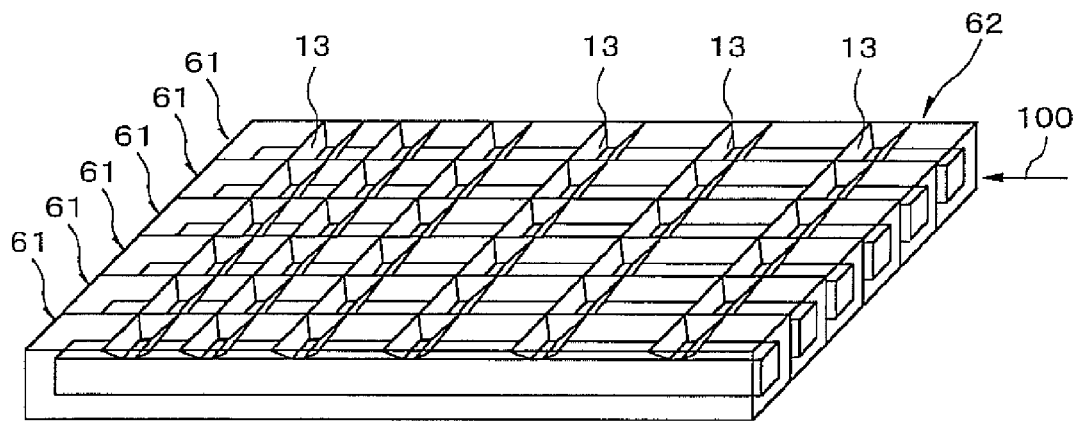
FIG. 21B is a perspective view showing rows of fibers.

The fourteenth embodiment of the present invention is described next. FIG. 21A is a perspective view showing the optical fiber in the present embodiment, and FIG. 21B is a perspective view showing rows of fibers. In the present embodiment, the shape of the optical fibers is different than the first embodiment described above. In other words, the cross section that is orthogonal to the lengthwise direction of the optical fibers 61 in the present embodiment is rectangularly shaped overall, and the shape of the core is also rectangular, as shown in FIG. 21A. Notches 13 are formed in the upper surface of the optical fibers 61. The arrangement density of the notches 13 decreases in progression to the upstream side of the traveling direction 100 of the light, and increases in progression to the downstream side. A row of fibers 62 is formed by arraying a plurality of optical fibers 61 in a single row in parallel to each other, as shown in FIG. 21B. The shape of the row of fibers 62 is that of a plate. In the present embodiment, the directions of the beams of light that enter the optical fibers 61 are mutually the same. The configuration and operation other than those described above in the present embodiment are the same as those in the first embodiment described above.

In addition to the effects of the first embodiment described above, the following described effects can be obtained in the fabrication step for a row of fibers by using a rectangular shape for the cross section that intersects the lengthwise direction of the optical fibers 61 in accordance with the present embodiment.

(1) Optical fibers can easily be disposed in the form of an array in comparison with a case in which the cross-sectional shape of the optical fibers is circular or elliptical. Also, in this case, the notches, projections, or other light-emitting portions can easily be aligned so as to face the same direction.

(2) When notches are formed after the optical fibers are aligned in the form of an array, the optical fibers do not rotate, and notches can easily be formed.

(3) The space between the optical fibers does not need to be filled with an adhesive or another medium because the optical fibers can be disposed in close contact with each other.

Figure 22:
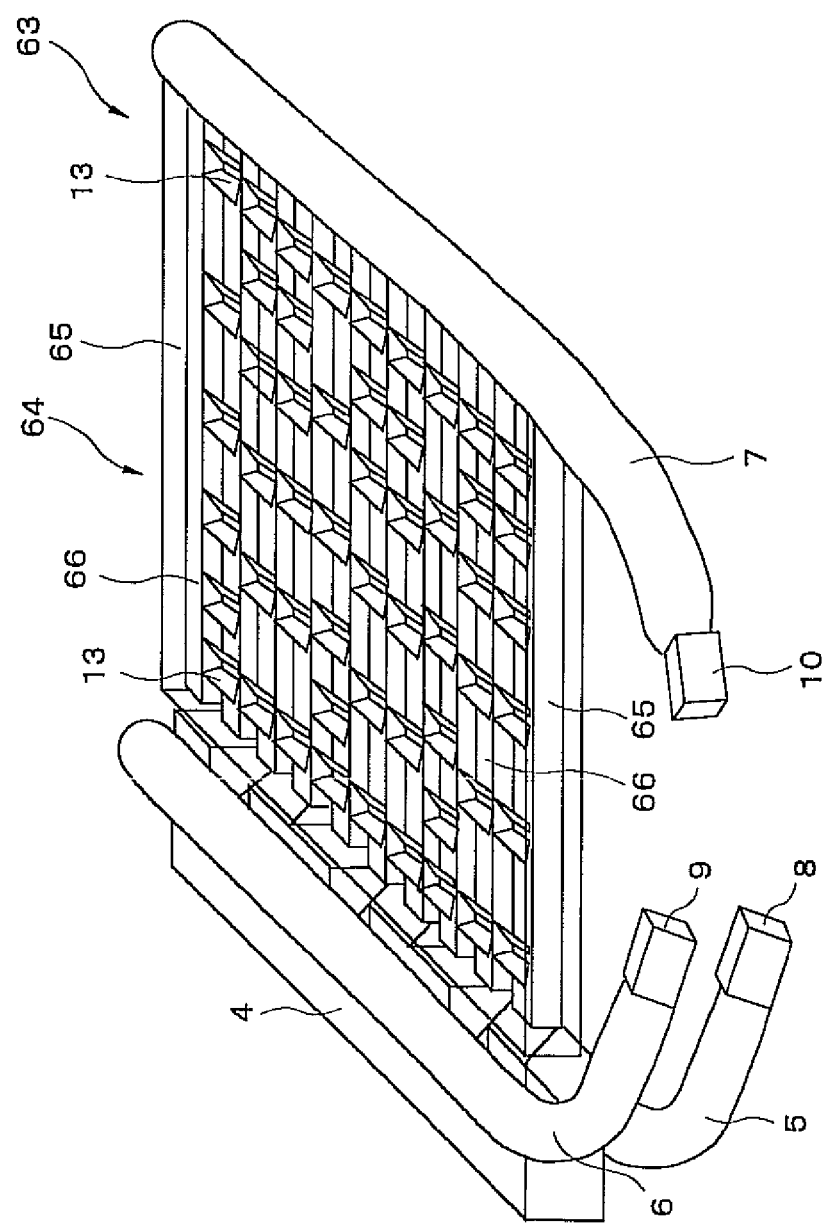
FIG. 22 is a perspective view showing the light source device according to the fifteenth embodiment of the present invention.

The fifteenth embodiment of the present invention is described next. FIG. 22 is a perspective view showing the light source device according to the present embodiment. In the light source device 63 according to the present embodiment, a light-guide plate 64 is disposed in place of the row of fibers 3 (see FIG. 3) in the first embodiment described above, as shown in FIG. 22. In the light-guide plate 64, a plurality of cores 66 are disposed in a single plate-shaped light guide 65 that comprises a cladding material. The cores are composed of a material that has a higher index of refraction than a light guide 65. The cores 66 are disposed in a single row in parallel to each other. Notches 13 are formed in the area directly above the cores 66 in the light guide 65. The configuration and operation other than those described above in the present embodiment are the same as those in the first embodiment described above.

The effects (1) and (2) in the fourteenth embodiment described above can be obtained in accordance with the present embodiment. Since an integrally formed light-guide plate 64 is disposed in place of a row of fibers, the positions among the cores 66 do not vary in the manufacturing process, and handling is facilitated. The effects other than those described above in the present embodiment are the same as those in the first embodiment described above.

The sixteenth embodiment of the present invention is described next. In the present embodiment, an optical fiber ribbon core (tape-type optical core) (not shown) in which a plurality of optical fiber filaments are arrayed in a single row are disposed in place of the row of fibers 3 (see FIG. 3) in the first embodiment described above. Examples of such optical fiber ribbon cores include an optical fiber ribbon core in which quartz optical fiber filaments are used that are formed in accordance with JIS C 6838, and an optical fiber ribbon core in which plastic optical fiber filaments are used. An optical fiber ribbon cord that is formed in accordance with JIS C 6839 may also be used in place of the row of fibers 3.

In the present embodiment, a light source device having the same functions as the above-described embodiments can easily be manufactured without additional labor to dispose the cores in a substantially parallel array by using such optical fiber ribbon cores or an optical fiber ribbon cord.

Figure 23A:
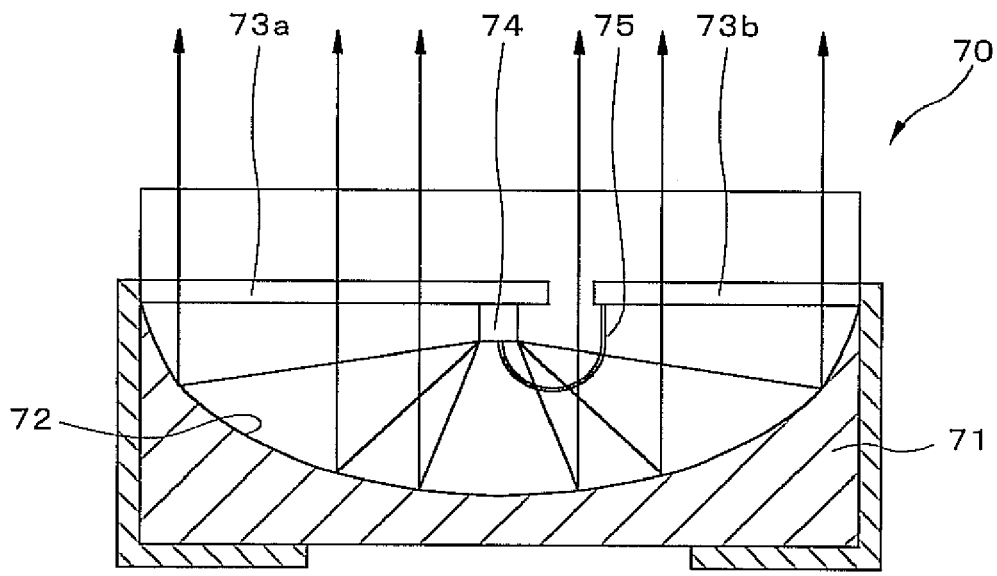
FIG. 23A is a cross-sectional view showing a reflective LED in the seventeenth embodiment of the present invention.
Figure 23B:
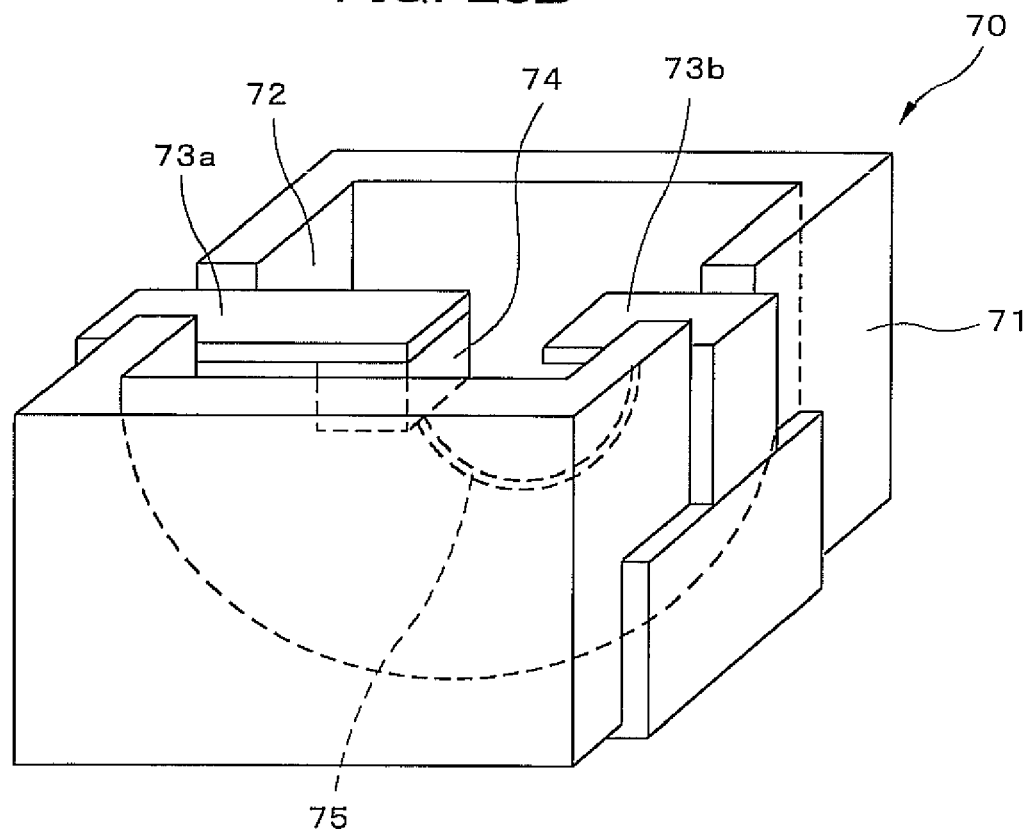
FIG. 23B is a perspective view of the reflective LED.
Figure 24:
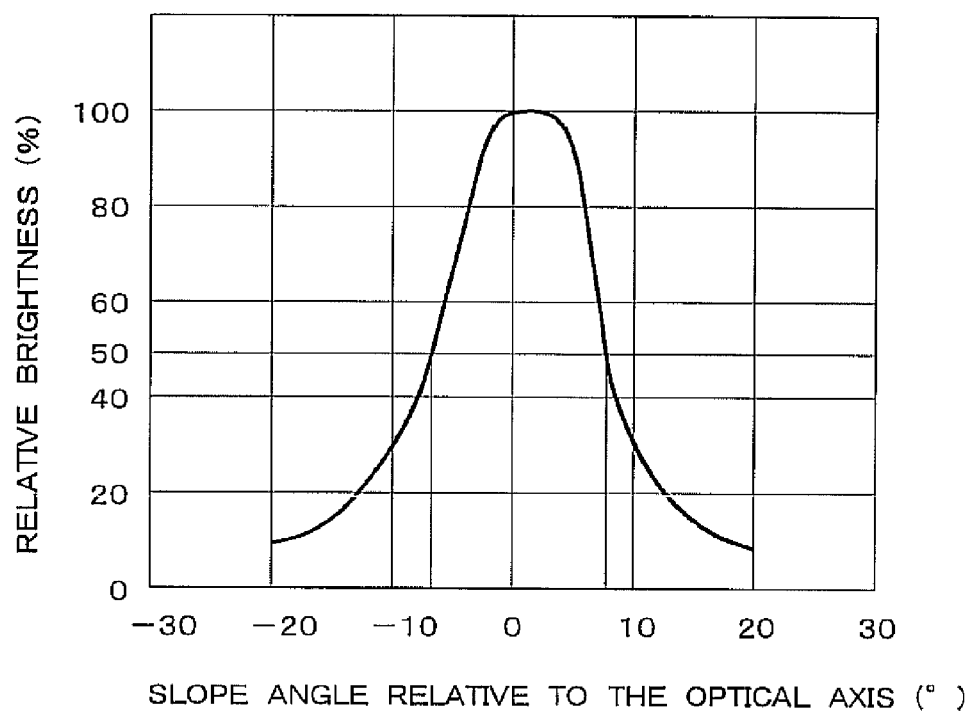
FIG. 24 is a graph showing the characteristics of the reflective LED, with the slope angle from the optical axis plotted along the horizontal axis, and the relative brightness plotted along the vertical axis.

The seventeenth embodiment of the present invention is described next. FIG. 23A is a cross-sectional view showing a reflective LED in the present embodiment, and FIG. 23B is a perspective view of the reflective LED. FIG. 24 is a graph showing the characteristics of the reflective LED, with the slope angle from the optical axis plotted along the horizontal axis, and the relative brightness plotted along the vertical axis. The present embodiment is different than the first embodiment described above in that a reflective LED is provided as a light source. In the reflective LED 70, semispherical concavities 72 are formed on one surface of a casing 71, and the internal surface of the concavities 72 is a reflective mirror, as shown in FIGS. 23A and 23B. A pair of leads 73*a* and 73*b* extends from the mutually facing portions on the edges of the concavities 72, and a light-emitting element 74 is mounted at the distal end of the lead 73*a*. The light-emitting element 74 is positioned at the focal point of the reflective mirror and is made to irradiate light toward the reflective mirror. The light-emitting element 74 is connected to the lead 73*b* by way of a metal wire 75.

An ordinary LED has the shape of dome or a shape similar thereto. Of the light emitted by the light-emitting element in the shell-shaped LED, only the light that reaches the forward resin lens directly or by way of the reflective mirror is irradiated to the exterior and used [for illumination]. For this reason, only about ⅓ of the light can be used of all the light emitted by the light-emitting element. In contrast, in the reflective LED 70, a majority of the light emitted from the light-emitting element 74 is received by the rearward reflective lens, and the light can be externally irradiated as optically-controlled light. Since the reflective LED 70 thereby makes use of substantially all of the irradiated light of the light-emitting element 74, the light efficiency is high. Also, the angle at which the brightness of the light emitted from the reflective LED 70 is half the brightness at its peak, i.e., the half-value angle, is about ±7°, as shown in FIG. 24. Thus, the light emitted from the reflective LED 70 spreads very little, and the directionality is very high. For this reason, the light emitted from the reflective LED can be conducted with good efficiency to the cores of the main fibers 5 to 7. The configuration other than that described above in the present embodiment is the same as in the first embodiment described above.

In the present embodiment, a light source device with a higher light efficiency can be achieved because a reflective LED is used as the light source. Light emitted from the light source can be introduced with good efficiency to the core of the main fiber by providing a condensing lens even when a shell-shaped LED or the like is used as the light source.

Figure 25:
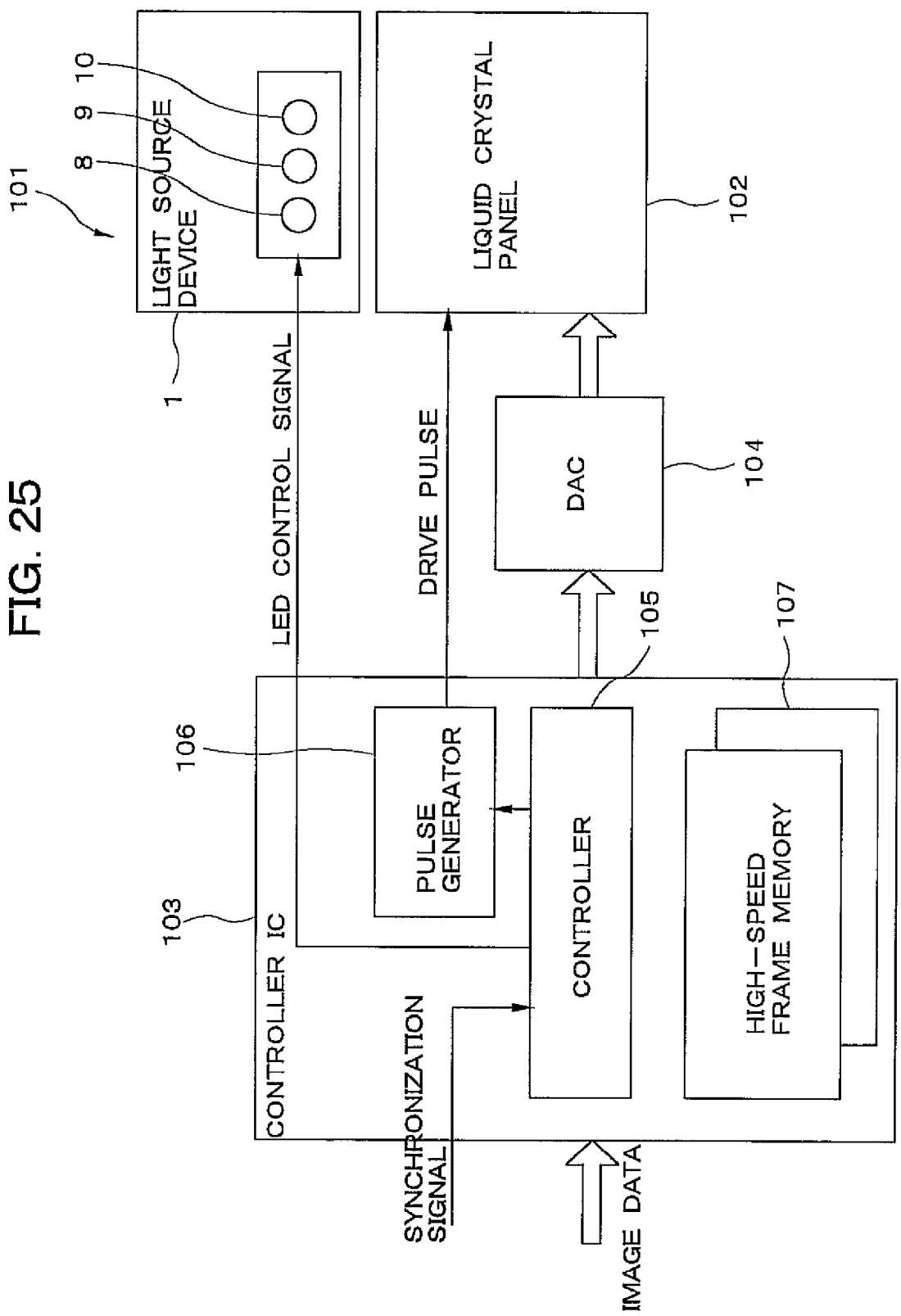
FIG. 25 is a block diagram showing the display device according to the eighteenth embodiment of the present invention.
Figure 26A:
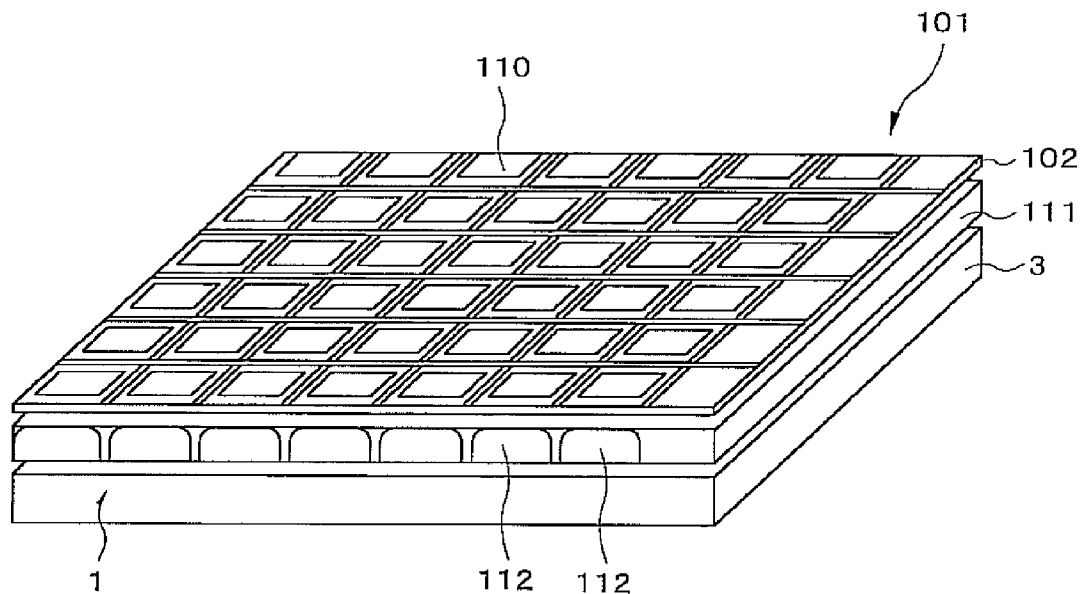
FIG. 26A is a perspective view of the display device.
Figure 26B:
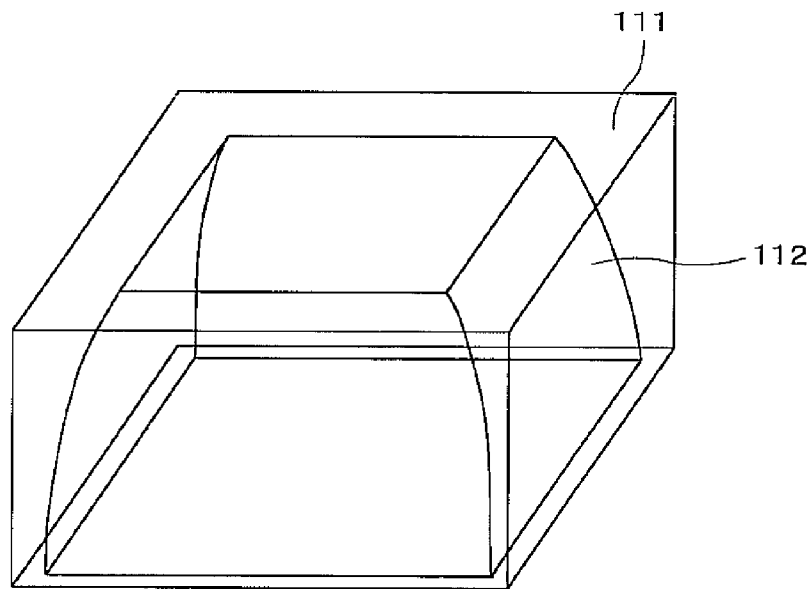
FIG. 26B is perspective view showing a single pixel of the display device.
Figure 27:
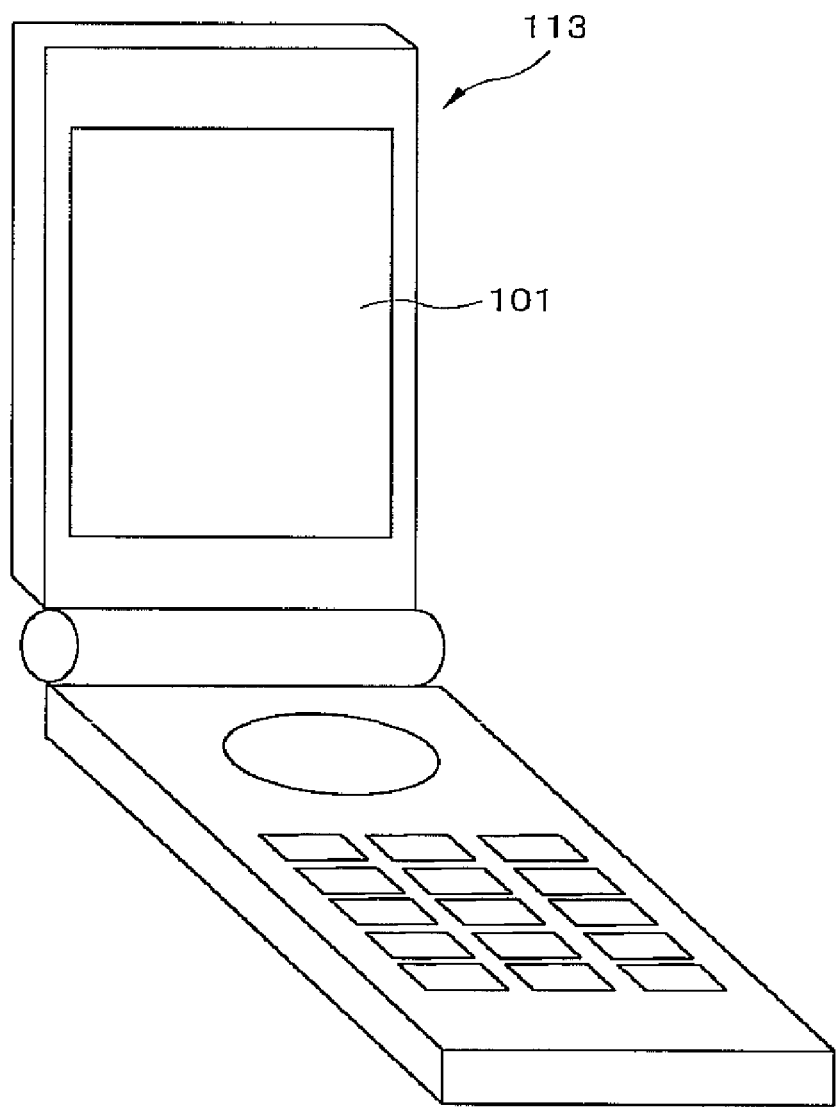
FIG. 27 is a perspective view showing a mobile phone in which the display device according to the present embodiment is mounted.

Described next are the embodiments of the display device according to the present invention. The eighteenth embodiment of the present invention is described first. FIG. 25 is a block diagram showing the display device according to the present embodiment. FIG. 26A is a perspective view of the display device, and FIG. 26B is perspective view showing a single pixel of the display device. FIG. 27 is a perspective view showing a mobile phone in which the display device according to the present embodiment is mounted. In the liquid crystal display device 101 according to the present embodiment, the light source device 1 according to the first embodiment described above is provided as a backlight, and a transmissive liquid crystal panel 102 is disposed on the light-emitting side of the light source device 1, as shown in FIGS. 25 and 26A.

Image data is input together with a synchronization signal from the exterior to the liquid crystal display device 101, and a controller IC (integrated circuit) 103 is provided that generates an LED control signal for driving the LEDs of the light source device 1 on the basis of the image data and generates a drive pulse and digital picture data for each color, i.e., red, blue, and green. The LED control signal is input to the light sources 8 to 10 of the light source device 1 and controls the light emission of the light sources 8 to 10. The drive pulse is input to the liquid crystal panel 102 and scans the liquid crystal panel 102. The liquid crystal display device 101 is provided with a DAC (Digital to Analog Converter) 104 for converting digital picture signals to analog picture signals output from the controller IC 103, and outputting the signals to the liquid crystal panel 102. The controller IC 103 is provided with a controller 105 that generates picture data for each color from the image data, a pulse generator 106 for generating drive pulses, and a high-speed frame memory 107 for storing a single frame of picture data.

The liquid crystal panel 102 is disposed on the light-emitting side of the row of fibers 3 of the light source device 1, as shown in FIG. 26A. A plurality of pixels 110 are arrayed in the form of a matrix on the liquid crystal panel 102, and a transmissive area is formed on each pixel 110. A transparent resin layer 111 is disposed between the row of fibers 3 and the liquid crystal panel 102, and a plurality of self-forming light-guide paths 112 are formed in the transparent resin layer 111 in the form of a matrix so as to correspond to the transmissive areas of the pixels 110 of the liquid crystal panel 102. The shape of the self-forming light-guide paths 112 is a shape in which the pyramidal frustum-shaped side surface bulges outward, the side facing the liquid crystal panel 102 is a relatively small upper surface, and the side facing the row of fibers 3 is a relatively large lower surface, as shown in FIG. 26B.

The liquid crystal display device 101 is mounted in a mobile phone 113, for example, as shown in FIG. 27. In the mobile phone 113, the liquid crystal display device 101 constituting the display unit is thin and lightweight. Therefore, the thickness of the mobile phone 113 overall can be reduced and the phone can be made more lightweight. Also, since the configuration of the optical connections portions is simplified and costs are reduced in the liquid crystal display device 101, there is also an effect of reducing the cost of the mobile phone 113 overall. Power consumption is furthermore low in the liquid crystal display device 101 because light is not leaked in undesired directions and the light efficiency is high. Such effects in the present embodiment, i.e., a thinner and more lightweight configuration, lower costs, and lower power consumption are particularly effective in mobile terminals.

Electronic equipment in which the liquid crystal display device 101 is mounted is not limited to a mobile phone, and application can also be made to televisions, monitors for desktop personal computers, notebook personal computers, PDAs (Personal Digital Assistances), digital cameras, digital video cameras, and other equipment.

In the present embodiment, an example was shown in which the light source device 1 according to the first embodiment described above was mounted as a backlight in the liquid crystal display device 101, but the present invention is not limited to this configuration, and the light source device according to any of the second to seventeenth embodiments described above may be mounted in the liquid crystal display device.

Figure 28:
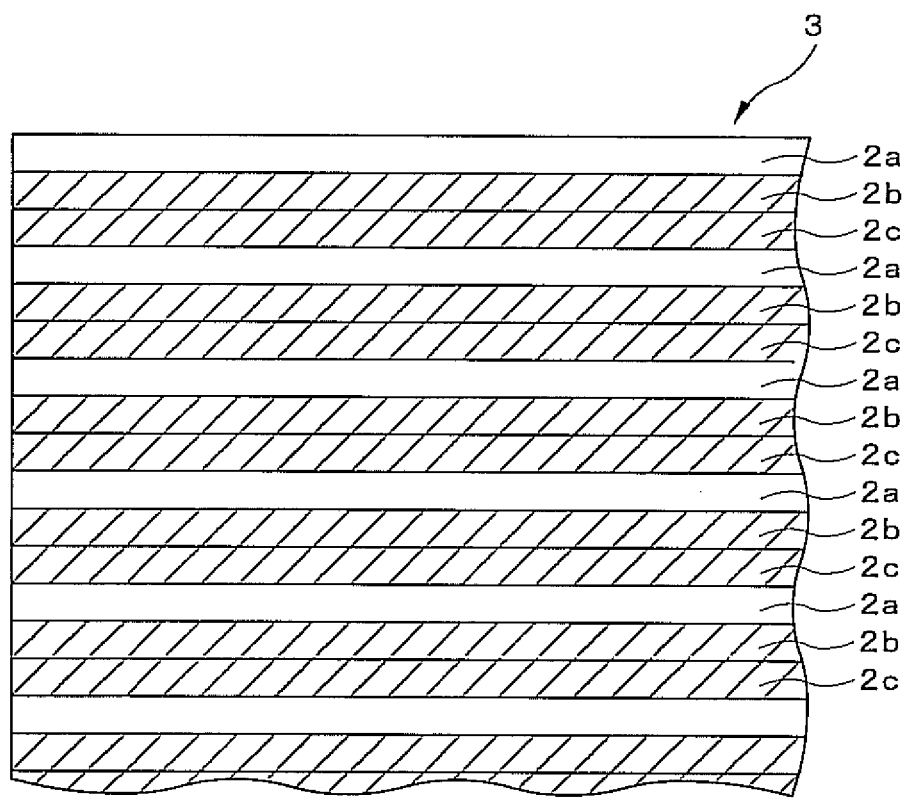
FIG. 28 is a plan view showing the operation of the liquid crystal display device according to the eighteenth embodiment of the present invention.
Figure 29A:
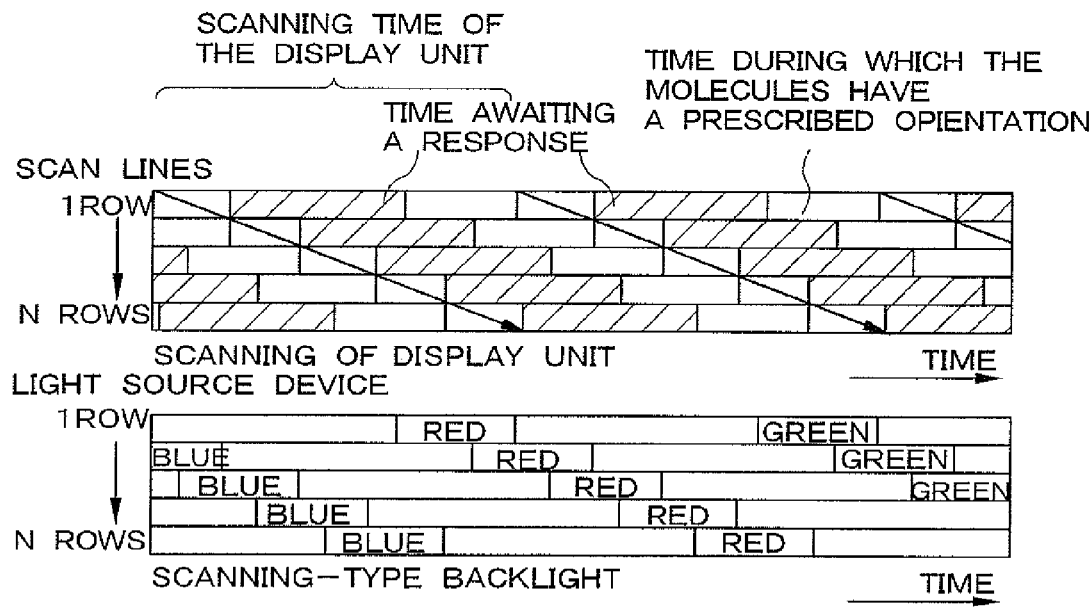
Figure 29B:
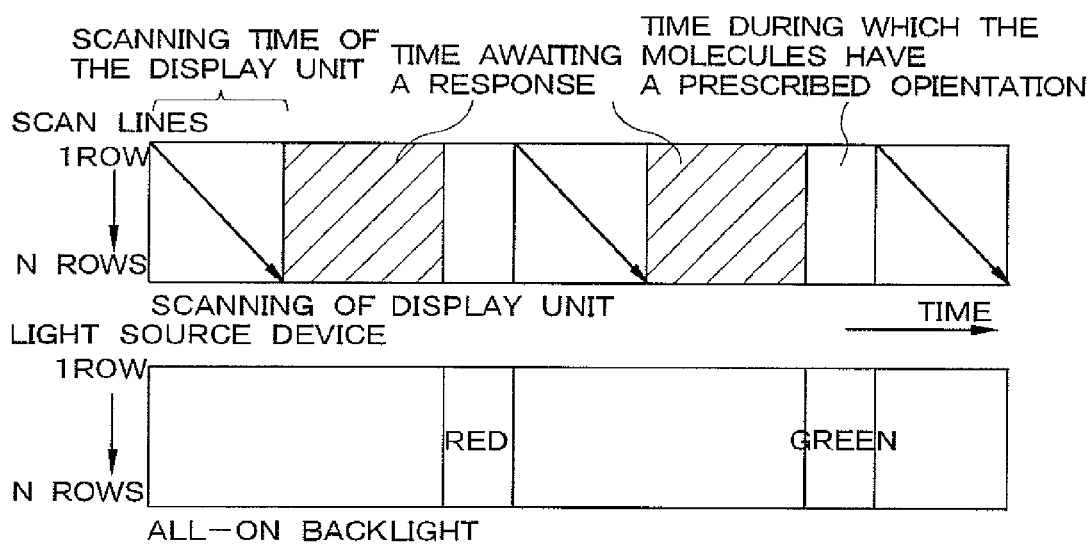

The operation of the thus-configured liquid crystal display device according to the present embodiment, i.e., the method for driving the light source device according to the present embodiment, is described below. FIG. 28 is a plan view showing the operation of the liquid crystal display device according to the present embodiment. FIGS. 29A and 29B are timing charts showing the operation of a liquid crystal panel and light source device in a liquid crystal display device, with time plotted on the horizontal axis, and rows of pixels plotted on the vertical axis. FIG. 29A shows the operation of a conventional liquid crystal display device, and FIG. 29B shows the operation of the liquid crystal display device of the present embodiment.

Image data and a synchronization signal are input from the exterior of the liquid crystal display device 101 to the controller 105 of the controller IC 103, as shown in FIG. 25. The controller 105 generates an LED control signal for driving the light sources 8 to 10 of the light source device 1 on the basis of the image data and the synchronization signal, and outputs the control signal to the light sources 8 to 10. The controller 105 also generates as a digital signal the picture data for each of the colors red, blue, and green on the basis of the image data and the synchronization signal, and outputs the digital signal to the DAC 104. The DAC 104 converts the picture data from digital to analog to generate an analog picture signal, and outputs the signal to the liquid crystal panel 102. The controller 105 sends information to the pulse generator 106, and the pulse generator 106 generates drive pulses on the basis of the information, and outputs the pulses to the liquid crystal panel 102.

The light sources 8 to 10 of the light source device 1 light up based on the LED control signal. Also, the scan lines of the liquid crystal panel 102 are scanned by the liquid crystal panel 102, and picture data is written to the data lines (not shown) of the liquid crystal panel 102. The liquid crystal molecules of each pixel thereby assume a prescribed orientation, a picture is added when light emitted from the light source device 1 passes through the liquid crystal panel 102, and the picture is displayed toward the front of the liquid crystal display device 101.

In this case, the controller 105 causes the light sources 8 to 10 to emit light with mutually offset timing. For example, light source 8 is lighted in a certain time period, and light sources 9 and 10 are switched off. In the row of fibers 3 of the light source device 1, only the optical fibers 2 connected to the light source 8 emit light. In other words, the optical fibers 2 emit light in a ratio of one of every three fibers. In this case, the controller 105 causes the liquid crystal molecules of the pixel row that corresponds to the optical fibers 2 connected to the light source 8 to assume a prescribed orientation. In the next time period, only the light source 9 is lighted, and the light sources 8 and 10 are switched off. Only the optical fibers 2 connected to the light source 9 thereby emit light. In this case, the controller 105 causes the liquid crystal molecules of the pixel row that corresponds to the optical fibers 2 connected to the light source 9 to assume a prescribed orientation. Similarly, in the subsequent time period, only the light source 10 is lighted, and [the liquid crystal molecules] of the pixel row corresponding to the light source 10 are caused to assume a prescribed orientation.

The following effects can be obtained by lighting the light sources 8 to 10 with offset timing in this manner. In the row of fibers 3 of the light source device 1, only the optical fibers 2a emit light with the timing in which only the light source 8 is lighted, and the optical fibers 2b and 2c do not emit light when the optical fibers optically connected to the light sources 8 to 10 are assigned to the optical fibers 2a to 2c, respectively, as shown in FIG. 28. The pixels of the liquid crystal display device can be temporarily darkened by sequentially switching the light source that is lighted. This method for driving is referred to as black writing, black resetting, or shuttering. A liquid crystal display device, which is a hold-type display device, can thereby be made to approximate an impulse-type display device, and the video quality can be improved.

The effect of improving video quality is described in detail next. The liquid crystal display device is a shutter-type display device that makes use of the shutter function of the liquid crystal display panel to display information by switching the light-source light on and off, and is referred to as a "hold-type" display. Conversely, a CRT (Cathode-Ray Tube) is a display device that displays information by using the residual image of a fluorescent body, and is an "impulse-type" in which the fluorescent body is illuminated at high brightness for only a short time, and the brightness thereafter rapidly decreases in accordance with the afterglow time of the fluorescent body. When characters that move on the screen are displayed on a CRT, the observer, by following the moving characters with their eyes, can view only the characters that are lighted at high brightness. On the other hand, when moving characters are followed by the eye in a liquid crystal display device, the image written in the immediately preceding scan remains displayed (remains held). Therefore, the characters are visible not only in the viewing position, but also in the pixels through which the viewing position has passed immediately prior thereto. For this reason, as viewed by the observer, the characters appear as a ghost on the downstream side in the moving direction of the viewing position, and the characters cannot be clearly perceived. In response to this situation, in the present embodiment, a time in which each pixel is darkened is inserted in a shutter-like manner, and the time that the image is held is shortened. The video quality can thereby be improved.

The effects described below can be obtained when this shutter-type method for driving is adopted in the present embodiment to improve the video quality. The liquid crystal molecules require a fixed response until the prescribed orientation is stably assumed after voltage has been applied. In a conventional liquid crystal display device that uses an all-on backlight as the backlight, data is written to the liquid crystal panel in a line-sequential manner, as shown in FIG. 29A, and the light source device is switched on and off for the entire screen. Therefore, after the final scanning line (the $n^{th}$ scanning line shown in FIG. 29A) has been scanned, the light source device is lighted after waiting until a response is produced by the liquid crystal molecules of the pixels corresponding to the final scanned scanning line. For this reason, in the pixels corresponding to the other scan lines (the first to (N−1)$^{th}$ scanning line shown in FIG. 29A), a greater waiting time than is necessary is produced. As a result, the lighting time of the light source device is shortened, and a corresponding amount of intense light emission is required. Since the time assigned to the scanning of the liquid crystal display panel is shortened, high-speed scanning is required.

In contrast, in the present embodiment, the light source device can be made to emit light for each pixel because a scanning-type backlight is used, as shown in FIG. 29B. For this reason, beginning with pixel rows which have been scanned and in which the response of the liquid crystal molecules has been completed, the pixel rows are made to emit light in a sequential manner, and subsequent scanning can be immediately carried out after the light emission time is completed. Wasteful waiting time is thereby eliminated, the lighting time of the light source device can be set to a long period of time, and the light-emission intensity of the light source device can be kept low by a corresponding amount. Since the time for scanning the scan lines can be extended, the scanning can be performed at a low speed. For this reason, the load placed on the drive circuits of the liquid crystal display device is reduced. In the present embodiment, the value of N shown in FIG. 29B is 3. A plurality of blocks consisting of three pixel rows is arrayed to constitute the liquid crystal display panel 102.

The value of N is determined by the number of light sources disposed in the light source device. If the light source 38 (see FIG. 13) according to the sixth embodiment described above is used, the value of N is 12, and a single block is formed for each of the 12 optical fibers. In this case, if a single row of pixels is made to correspond to a single optical fiber, 12 pixel rows will be contained in a single block, and if M number of pixel rows is made to correspond to a single optical fiber, (12×M) rows of pixels will be contained in a single block. Therefore, if the value of M is 1/12 the number of rows of pixels in the entire screen, an entire screen can consist of a single block.

In the present embodiment, the controller 105 temporally separates the light emission of red, green, and blue light in the light sources 8 to 10, divides the inputted image data into the picture data of each color, and displays the picture corresponding to each color on the liquid crystal panel 102 in synchronization with the actuation of light sources, as shown in FIG. 29B. In other words, in the present embodiment, color-field sequential (color-time division) display is carried out whereby the picture of each color is sequentially displayed. The interior of the pixels is not required to be divided into three parts as in a color-filter liquid crystal display device, and a high-resolution or high-aperture ratio liquid crystal display device can be obtained.

The effects of the present embodiment are described next. In the liquid crystal display device according to the present embodiment, the configuration of the light source device is simple, thin, and lightweight because the light source device according to the embodiments described above is used as a backlight. For this reason, the configuration of the entire liquid crystal display device can be simplified and made thinner and more lightweight.

In the present embodiment, wasted response waiting time can be reduced when a shutter-type or color-field sequential driving method is applied because the on/off state of the light source device can be controlled for each row of pixels. Since the on time of the light source device can be extended, the light emission intensity of the light source device can be kept low and the cost of the light source device can be reduced. Also, since the scanning time can be extended, the scanning rate can be reduced and the cost of the drive circuit can be reduced. Also, leeway is produced in the driving time and the degree of freedom in time distribution is therefore increased and design is simplified.

An improvement example in terms of performance is described below based on the facility of design. This example is the case of fabricating a color-field sequential liquid crystal display in which a thin-film transistor provided with an active amorphous silicon layer as a pixel switch. In an amorphous TFT (Thin Film Transistor) with an inverted staggered structure, a chromium electrode having a seat resistance of 2 Ω/◆ is used as a gate wire electrode, and an aluminum electrode having a seat resistance of 0.06 Ω/◆ is used as the source wire electrode. The subframe frequency per color is 360 Hz, the write ratio in the writing time for the pixels and the storage capacitor is 80%, and the scanning time of the gate wires in a single subframe is less than 1.1 ms. Also, the ratio of the storage capacitance with respect to pixel capacitance is 65%.

In these conditions, when an all-on backlight is used and a practicably manufacturable color-field sequential liquid crystal display device has a diagonal of 10 inches, the pixel count specification is XGA (1024×768 pixels and 768 scan lines), and the aperture ratio is 66%, as shown in FIG. 29A. When the same low-resistance material as the source wire electrode is used as the gate wire electrode, and a practicably manufacturable display device has a 30-inch diagonal, the pixel count specification is WXGA (1280×768 pixels and 768 scan lines), and the aperture ratio is 68%.

When a scanning-type backlight is used, the scanning time of the gate wires of a subframe can be set to a maximum of 2.78 ms, as shown in FIG. 29B. When the scanning time is set to 2.5 ms, for example, and a practicably manufacturable color-field sequential liquid crystal display device has a 13-inch diagonal, the pixel count specification is XGA (1024×768 pixels and 768 scan lines), and the aperture ratio is 67%. When the same low-resistance material as the source wire electrode is used as the gate wire electrode, and a practicably manufacturable display device has 32-inch diagonal in a monitor application, the pixel count specification is WSXGA (alternatively SXGA+, 1400×1024 pixels and 1024 scan lines), and the aperture ratio is 66%. Also, in a television application, when the diagonal is 36 inches, the pixel count specification is WXGA (1280×768 pixels and 1024 scan lines), and the aperture ratio is 70%.

Thus, in the present embodiment, the screen size is 20% or greater than a conventional screen, and the number of scan lines can be increased. This is because the light source device and the liquid crystal display panel are scanned in synchronization with each other in the manner described above.

In the display device according to the present embodiment, the light emission of the light source device can be independently controlled for each scan line. Therefore, the brightness of a portion of the area in the display area can be kept lower than in other areas, and the color tone can be modified. A portion of the picture display can thereby be carried out by the light source device. For example, when a picture having some areas that are dark and other areas that are bright is displayed, the picture can be displayed without reducing the gradation in the dark areas if the light-emission intensity of the dark areas is kept lower than the light-emission intensity of the bright areas. The dark areas can thereby be prevented from being made completely black. Also, areas in which particular emphasis is desired can be made brighter than other areas.

Figure 30:
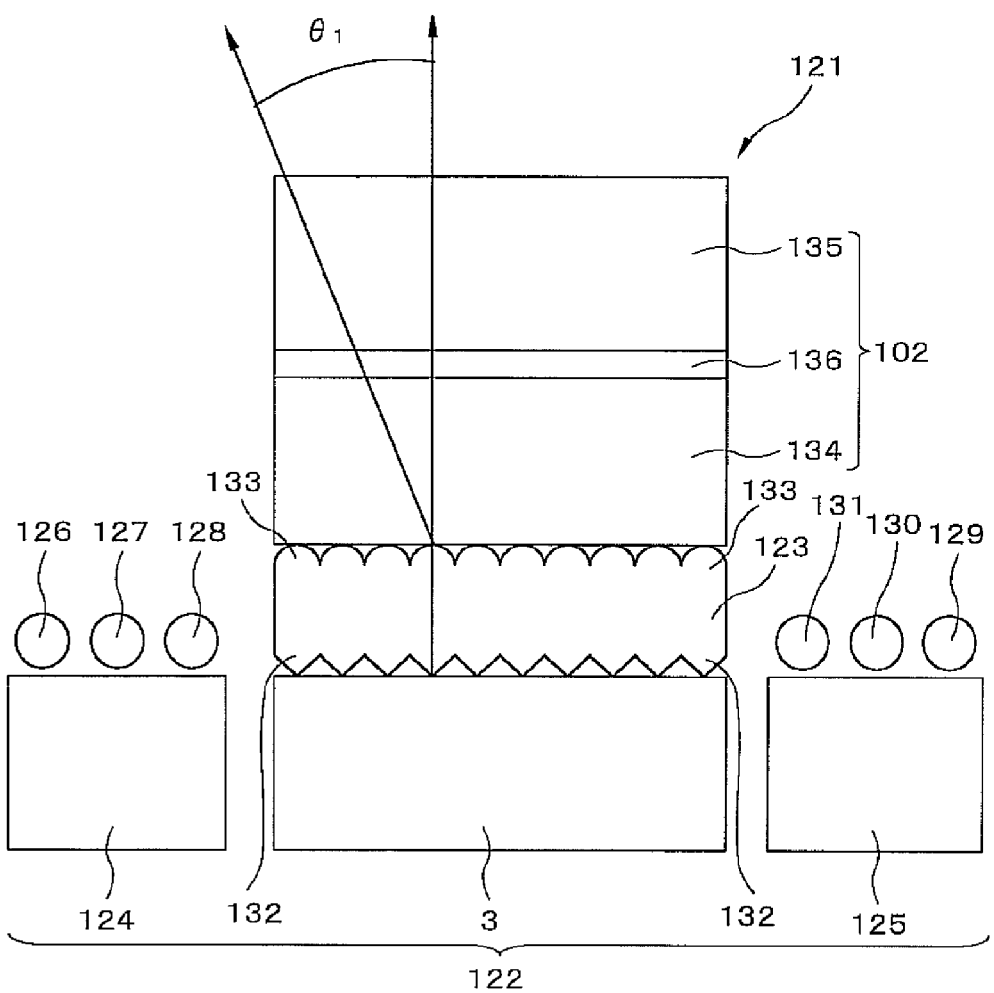
FIG. 30 is an optical model diagram showing the liquid crystal display device according to the nineteenth embodiment of the present invention.
Figure 31:
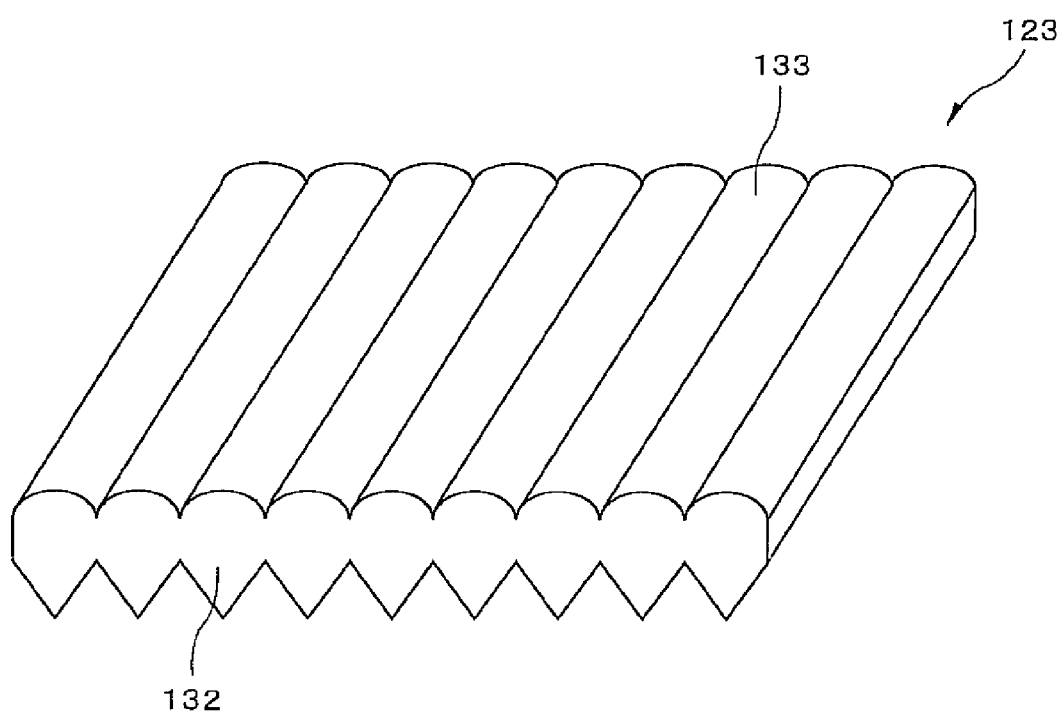
FIG. 31 is a cross-sectional view showing the double-sided prism sheet shown in FIG. 30.

The nineteenth embodiment of the present invention is described next. FIG. 30 is an optical model diagram showing the liquid crystal display device according to the present embodiment. FIG. 31 is a cross-sectional view showing the double-sided prism sheet shown in FIG. 30. The liquid crystal display device according to the present embodiment is a scan-backlight three-dimensional display device. In a liquid crystal display device 121 according to the present embodiment, a light source device 122 is provided as a backlight, as shown in FIG. 30. Also, a double-sided prism sheet 123 is disposed between the light source device 122 and a liquid crystal display panel 102.

In the liquid crystal panel 102, light-direction controllers 124 and 125 are disposed on the two sides of the row of fibers 3, three main fibers 126 to 128 are optically connected to the light-direction controller 124, and three other main fibers 129 to 131 are optically connected to the light-direction controller 125. In the row of fibers 3, three sequentially disposed optical fibers comprise a single block, one end of a first optical fiber belonging to each block is connected to the main fiber 126, and the other end is connected to the main fiber 129. One end of a second optical fiber is connected to the main fiber 127, and the other end is connected to the main fiber 130. One end of a third optical fiber is connected to the main fiber 128, and the other end is connected to the main fiber 131. The shape of these optical fibers is the same as the optical fibers 55 shown in FIG. 16, for example.

The double-sided prism sheet 123 is a plate-like member composed of a transparent material, as shown in FIG. 31. A row of prisms 132 comprising a plurality of prisms extending in the array direction (see FIG. 3) of the optical fibers 2 is formed on the surface of the double-sided prism sheet 123 that faces the row of fibers 3. The shape of the cross-section that is orthogonal to lengthwise direction of the prisms is triangular. Also, a lenticular lens 133 is formed on the surface of the double-sided prism sheet 123 that faces the liquid crystal panel 102. The prisms constituting the row of prisms 132 and the cylindrical lenses constituting the lenticular lens 133 are in a one-to-one relationship, the cylindrical lenses extend in the direction in which the prisms extend, and the apexes of the cylindrical lenses are superimposed on the ridge lines of the prisms as viewed from the vertical direction on the surface of the liquid crystal panel 102. In the liquid crystal panel 102, two transparent electrodes 134 and 135, arranged in parallel fashion separately from each other, are disposed in the liquid crystal panel 102, and a liquid crystal layer 136 is disposed between the transparent electrode 134 and transparent electrode 135. The configuration other than that described above in the present embodiment is the same as in the eighteenth embodiment described above.

Described next is the operation of the thus-configured liquid crystal display device according to the present embodiment, i.e., the method for driving the liquid crystal display device according to the present embodiment. In the present embodiment, light is alternately made to enter the row of fibers 3 from the light-direction controllers 124 and 125. When the light from the light-direction controller 124 enters, an image for the left eye is displayed on the liquid crystal panel 102, and when light from the light-direction controller 125 enters, an image for the right eye is displayed on the liquid crystal panel 102.

Light that has entered the optical fibers of the row of fibers 3 from the light-direction controller 124 is emitted from the notches of the optical fibers, and the emission direction in this case is upward, i.e., a direction inclined to the side away from the light-direction controller 124 in relation to the direction facing the double-sided prism sheet 123. The light enters the row of prisms 132 of the double-sided prism sheet 123, and only the light that satisfies complete reflection conditions passes through the interior of the double-sided prism sheet 123 and exits from the double-sided prism sheet 123. In this case, the emitted light is emitted at a considerable inclination from the upward direction to the side away from the light-direction controller 124 due to the effect of the lenticular lens 133. The light passes through the liquid crystal layer 136 of the liquid crystal panel 102 to add an image for the left eye, and proceeds toward the left eye of the viewer.

Also, light that has entered the optical fibers of the row of fibers 3 from the light-direction controller 125 is emitted from the notches of the optical fibers, and the emission direction in this case is a direction inclined to the side away from the light-direction controller 125. The light enters the row of prisms 132 of the double-sided prism sheet 123, and the light that satisfies complete reflection conditions passes through the interior of the double-sided prism sheet 123 and exits from the double-sided prism sheet 123. In this case, the emitted light is emitted at a considerable inclination from the upward direction to the side away from the light-direction controller 125 due to the effect of the lenticular lens 133. The light passes through the liquid crystal layer 136 of the liquid crystal panel 102 to add an image for the right eye, and proceeds toward the right eye of the viewer. The viewer can thereby perceive a three-dimensional image.

The thickness of the double-sided prism sheet 123 is 0.4 mm, the thickness of the transparent electrodes 134 and 135 is 0.5 mm each, and a 20° angle $\theta_1$ is formed by the travel direction of the light emitted from the double-sided prism sheet 123 and the direction perpendicular to the liquid crystal display panel.

When a left-eye image and right-eye image are displayed, color-field sequential (color-time division) display is carried out by making three optical fibers belonging to each block to emit light in a time-divided fashion, and displaying the image of each color to the liquid crystal panel 102 in a time-divided fashion by the same method as the eighteenth method described above. In the present embodiment, since color-field sequential display and field sequential three-dimensional display are carried out simultaneously, the image-switching frequency is preferably 360 Hz or higher.

Figure 32:
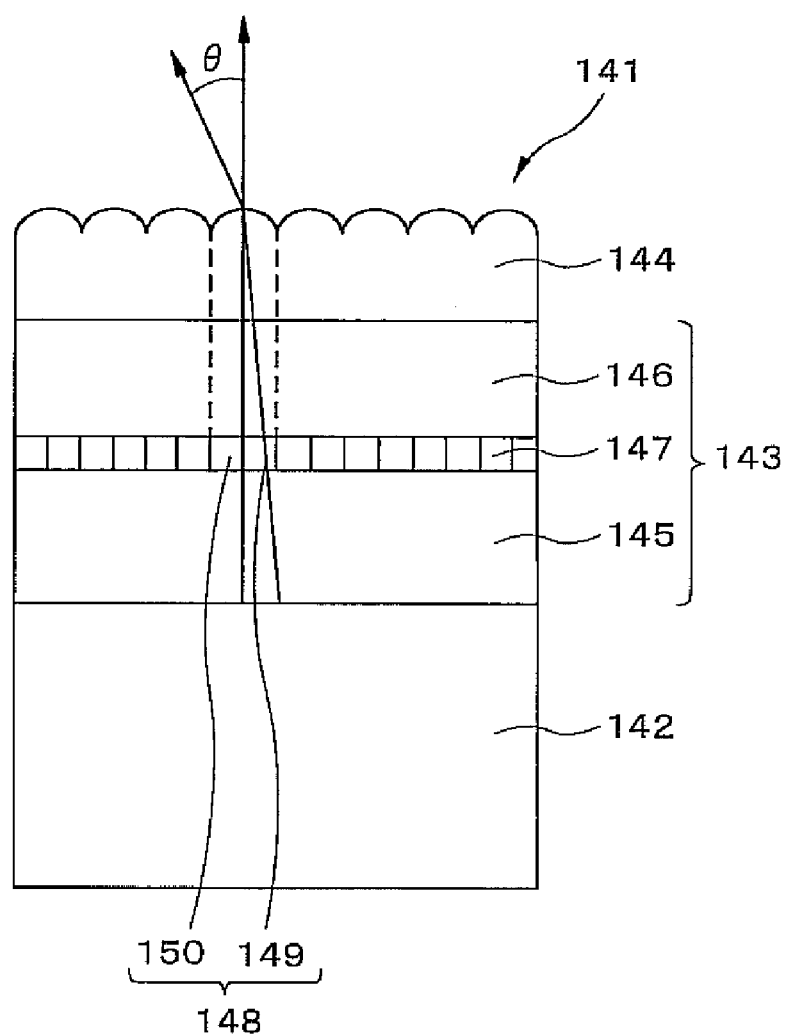
FIG. 32 is a cross-sectional view showing a conventional liquid crystal display device.

A three-dimensional display device in which a conventional lenticular lens is used is described next for comparison. FIG. 32 is a cross-sectional view showing a conventional liquid crystal display device. Disposed in the following order in a conventional liquid crystal display device 141 are a light source device 142 that emits planar light, a liquid crystal display panel 143, and a lenticular lens 144, as shown in FIG. 32. In the liquid crystal display panel 143, two transparent substrates 145 and 146 are arranged in parallel fashion separately from each other, and a liquid crystal layer 147 is disposed between the two transparent substrates. Also, a right-eye subpixel 149 and a left-eye subpixel 150 form a pair and are disposed in each of the pixels 148 of the liquid crystal display panel 143. Each cylindrical lens of the lenticular lens 144 corresponds to each pixel row.

In the conventional liquid crystal display device 141, an image for the right eye is displayed by the right-eye subpixel 149 and an image for the left eye is displayed by the left-eye subpixel 150. Light is then emitted from the light source device 142. A portion of the light emitted from the light source device 142 thereby passes through the right-eye subpixel 149, is refracted by the cylindrical lens corresponding to the pixel row to which the right-eye subpixel 149 belongs, and travels toward the right eye of the viewer. Also, another portion of the light emitted from the light source device 142 passes through the left-eye subpixel 150, is refracted by the cylindrical lens corresponding to the pixel row to which the left-eye subpixel 150 belongs, and travels toward the left eye of the viewer. The viewer can thereby perceive a three-dimensional image. The thickness of the transparent substrates 145 and 146 is set to 0.5 mm each, and the angle $\theta_2$ between the travel direction of the light emitted from the lenticular lens 144 and the direction perpendicular to the liquid crystal display panel is set to 12°.

In a conventional liquid crystal display panel, each pixel must be divided into two subpixels, i.e., a right-eye subpixel and a left-eye subpixel, in order to display a three-dimensional image. The right-eye subpixel and left-eye subpixel must be further divided into three subpixels for each of the colors RGB in order to display a three-dimensional color image. As a result, a single pixel is divided into six subpixels, and the aperture ratio is reduced. Since a signal wire must be laid out for each sub pixel in the liquid crystal display panel, the number of signal wires is increased, the amount that the signal wires must be laid out is increased, the signal wires must be made narrower, and the delay time in the signal wires is increased. Assembly is furthermore made difficult because the positions of the pixels must correspond to the positions of the cylindrical lenses.

In contrast, in accordance with the present embodiment, three-dimensional display and color display are performed in a time-divided fashion, and each pixel is therefore not required to be divided into six subpixels. For this reason, the resolution and aperture ratio of the liquid crystal display panel can be increased. In other words, the surface area efficiency is increased by a magnitude of six in comparison with spatially dividing the pixels, and a three-dimensional display that provides a very realistic sensation can be achieved. Since the number of signal wires is ⅙ that of a conventional liquid crystal display device 141, the amount that the signal wires must be laid out is reduced, the signal wires can be made thicker, and the delay time in the signal wires is reduced. Since the amount that the signal wires must be laid out is reduced, the frame portion in the display panel can be reduced. There is no particular limitation between the position of the pixels and the positions of the cylindrical lenses, and the positions may be freely designed within a range that does not cause optical or subjective flaws. Furthermore, the number of pixels does not vary even when a switch is made between two-dimensional and three-dimensional display.

Described next are embodiments of the method for manufacturing the light source device according to the present invention. The twentieth embodiment of the present invention is described first. The present embodiment is an embodiment of the method for manufacturing the light source device according to the first embodiment described above.

The optical fibers 2 and the main fibers 5 to 7 shown in FIG. 3 are fabricated first. The methods for fabricating the optical fibers 2 and the main fibers 5 to 7 are the same. First, plastic optical fibers (POF) or quartz optical fibers are prepared, and notches are formed in the optical fibers. There are a variety of methods for forming notches. The notches can, for example, be formed by the methods described in (1) to (5) below.

(1) The optical fibers are directly cut by using a cutting machine. (2) The optical fibers are arrayed in a single row, and a mask is superimposed on the optical fibers. Slits are formed in the areas in which the notches are to be formed. The optical fibers are polished using a polishing agent applied from above the mask. (3) The optical fibers are arrayed in a single row, and a photoresist, a dry film resist, or another photosensitive resist is formed on the optical fibers. The photosensitive resist is patterned so that apertures are formed in the areas in which notches are to be formed, and the resist is thereafter etched as a mask. (4) A die is fabricated and the optical fibers are molded by pressure, extrusion, or another method. (5) Notches are formed by laser machining.

When notches with the same shape are formed across the entire length of the optical fibers, as shown in FIG. 4, it is advantageous to use the etching method of (3), or the cutting method of (1), wherein the cutter blade is set at a fixed angle. The pressure molding method of (4) in which a die is used and the laser machining method of (5) are advantageous when notches with a particularly complex shape are formed. The mask polishing method of (2) is advantageous when the machining precision is somewhat low and the object is to form the optical fibers at a reduced cost. The cutting method of (1) is used in the present embodiment. The optical fibers 2 and the main fibers 5 to 7 are fabricated in this manner.

Next, the optical fibers 2 in which notches have been formed are arrayed in a single row as shown in FIG. 3, a transparent resin is filled between the optical fibers 2, and the optical fibers 2 are bonded together. A material having the same index of refraction as the cladding 12 of the optical fibers 2 is used as the transparent material, and a resin material is used in order to obtain good workability in later steps. A row of fibers 3 is fabricated in this manner.

A light-direction controller 4 is fabricated separately from the row of fibers 3. Various materials can be used for the light-direction controller 4, and a lightweight, easily machined resin material is used in the present embodiment. A die is prepared and a molded resin article having a shape such as that shown in FIG. 5 is formed by extrusion molding. Mirrors 14 to 16 are formed by forming a reflective film on a portion of the surface of the molded resin article. The light-direction controller 4 is fabricated in this manner.

The row of fibers 3, the light-direction controller 4, and the main fibers 5 to 7 are subsequently arranged in the manner shown in FIG. 3. A photocurable resin is then filled between the constituent elements. The constituent elements are optically connected by applying a self-forming light-guide path technique. The basic principles of the self-forming light-guide path technique are described below. FIGS. 33A to 33E are cross-sectional views showing the basic principles of the self-forming light-guide path technique. FIG. 34 is a cross-sectional view showing the method for forming an optical path having an interposed mirror by using the self-forming light-guide path technique.

Figure 33A:
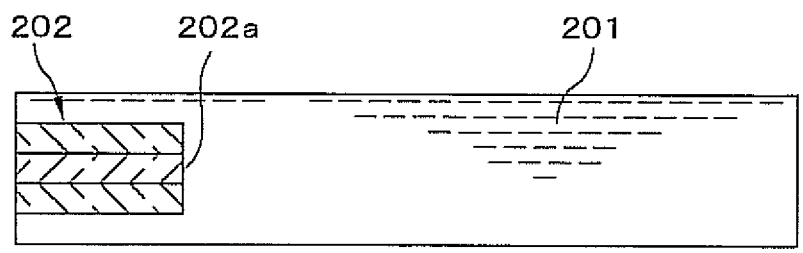
FIGS. 33A to 33E are cross-sectional views showing the basic principles of the self-forming light-guide path technique.
Figure 33B:
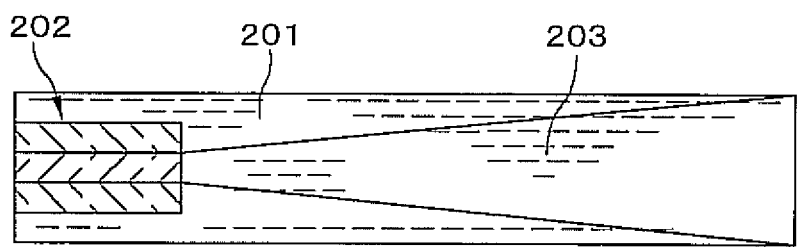
Figure 33C:
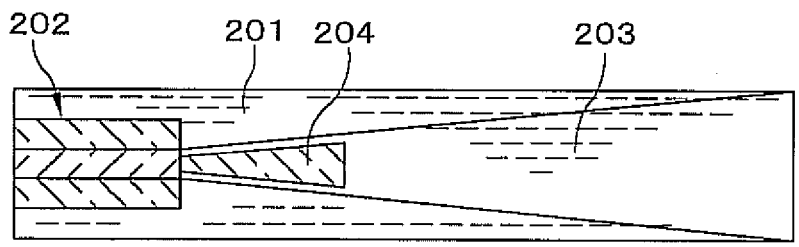
Figure 34:
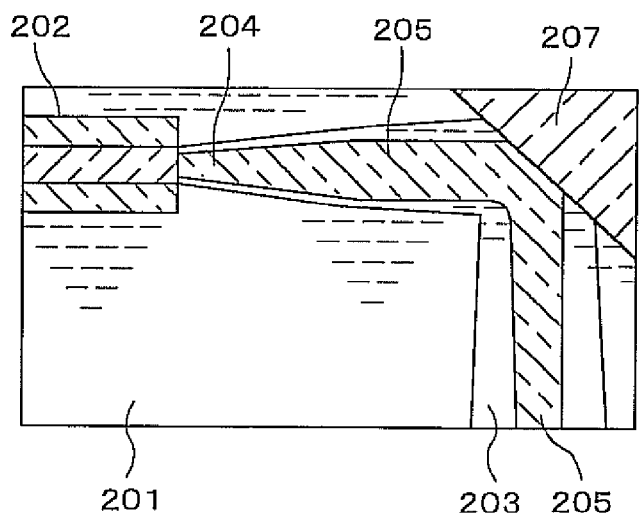
FIG. 34 is a cross-sectional view showing the method for forming an optical path having an interposed mirror by using the self-forming light-guide path technique.

First, one end portion 202a of an optical fiber 202 is disposed inside an uncured photocurable resin 201, as shown in FIG. 33A. Next, light is introduced from the other end portion (not shown) of the optical fiber 202 to the interior of the optical fiber 202, as shown in FIG. 33B, and a beam 203 is emitted from the one end portion 202a. The beam 203 is a Gaussian beam in which the intensity is greatest on the optical axis of the beam and is symmetrically distributed about the axis. At this time, the area in which the most intense light is irradiated in the photocurable resin 201, i.e., the area that corresponds to the vicinity of the optical axis of the beam 203, is cured by a photopolymerization reaction, as shown in FIG. 33C. The refractive index of the resin increases when the photocurable resin 201 has cured. A tapered portion 204 is formed by this process.

Figure 33D:
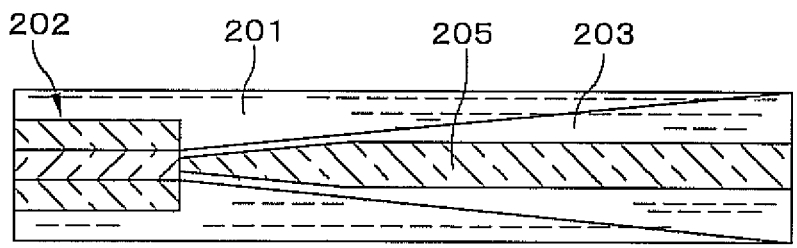

The beam 203 is gradually sealed on the optical axis by the difference in the refractive indices between the cured and uncured portions as the curing of the photocurable resin 201 progresses, as shown in FIG. 33D. A rectilinear portion 205 having a higher index of refraction than the surrounding area is formed when the light is completely sealed. At this time, a reaction initiator contained in the uncured photocurable resin 201 becomes unevenly distributed in the cured portion, i.e., the rectilinear portion 205. For this reason, the composition in the photocurable resin 201 becomes different than the rectilinear portion 205 and the other portions.

Figure 33E:
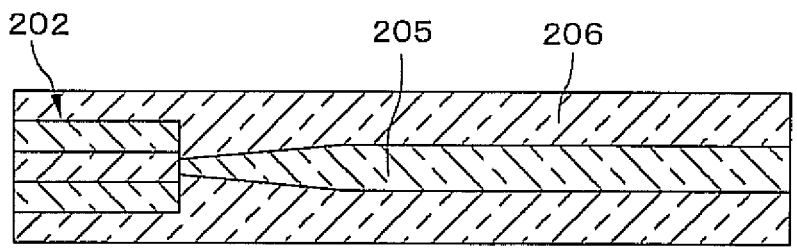

The portions other than the rectilinear portion 205 of the photocurable resin 201 are cured by heating or another method, as shown in FIG. 33E, to form a cured resin 206. In this case, since the compositions of the rectilinear portion 205 and the cured resin 206 are mutually different, the indices of refraction are also mutually different. A light-guide path is thereby formed in which the rectilinear portion 205 forms a core that has a relatively high index of refraction, and the cured resin 206 forms a cladding that has a relatively low index of refraction.

In this manner, a light-guide path in which light is propagated through a desired area can be formed using self-alignment by introducing light emitted from the optical fiber into a photocurable resin. For this reason, such a light-guide path is referred to as a self-forming light-guide path. Since light-guide paths are optically connected, this is also referred to as "optical solder," in reference to solder that electrically connects electrodes.

In lieu of heating and curing the portions other than the rectilinear portion 205 of the photocurable resin 201 in the step shown in FIG. 33E described above, it is also possible to remove the portions other than the rectilinear portion 205 in the photocurable resin 201, fill the missing portions with another resin having a low index of refraction, and cure the resin to form a cladding. It is also possible to use a two-component photocurable resin, as described below.

The self-forming light-guide path technique can also be used to control the travel direction of the light by applying the technique to the optical system containing the mirrors. In other words, the optical fiber 202 is arranged in the manner shown in FIG. 34, and a mirror 207 is disposed in the path of progression of the beam 203 that is emitted from the optical fiber 202. The reflective surface of the mirror 207 is set so as to form a 45° angle, for example, with respect to the optical axis of the beam 203. The periphery of the optical system comprising the optical fiber 202 and mirror 207 is then covered with an uncured photocurable resin 201.

In this state, the beam 203 is emitted from the optical fiber 202. The beam 203 thereby travels through the uncured photocurable resin 201 directly toward the mirror 207 and is reflected by the reflective surface of the mirror 207. The traveling direction of the beam is changed 90°, and the beam proceeds through the photocurable resin 201. The beam 203 is a Gaussian beam in which the intensity is greatest on the optical axis of the beam and is symmetrically distributed about the axis. When the photocurable resin 201 begins photocuring in the vicinity of the optical axis of the beam 203, a tapered portion 204 is formed, light is sealed inside, and the rectilinear portion 205 is eventually formed. The rectilinear portion 205 is vertically folded at the reflective surface of the mirror 207. In the curved area, a photocured portion is produced by superposing evanescent light and leaked light before and after the formation of the curved area, and the diameter slightly widens. However, since the widening is very minimal, vertically entered light changes direction, for example, along the self-forming light-guide path that has been formed. As described above, a self-forming light-guide path is fabricated by curing the portions other than the rectilinear portion 205 in the uncured photocurable resin 201 to form a resin that has a lower index of refraction than the rectilinear portion 205.

Figure 35:
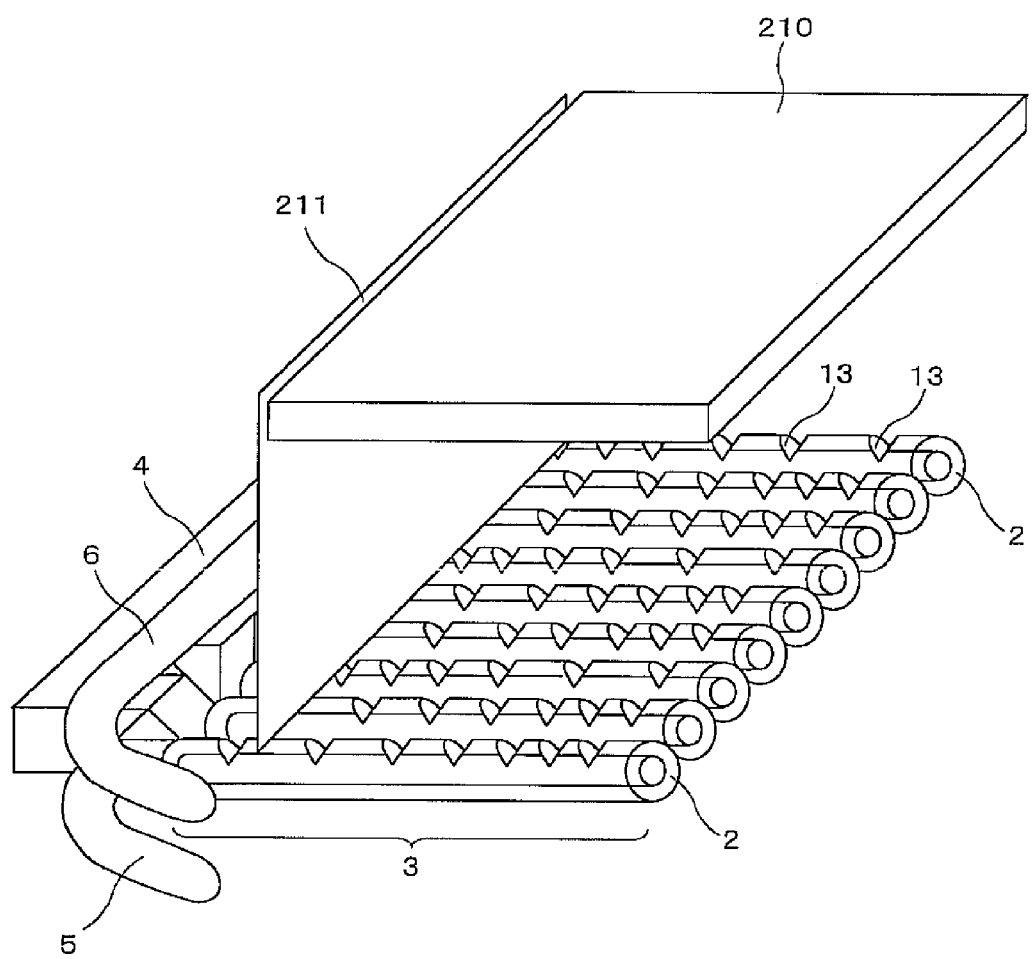
FIG. 35 is a perspective view showing the method for manufacturing the light source device according to the twentieth embodiment of the present invention.
Figure 36:
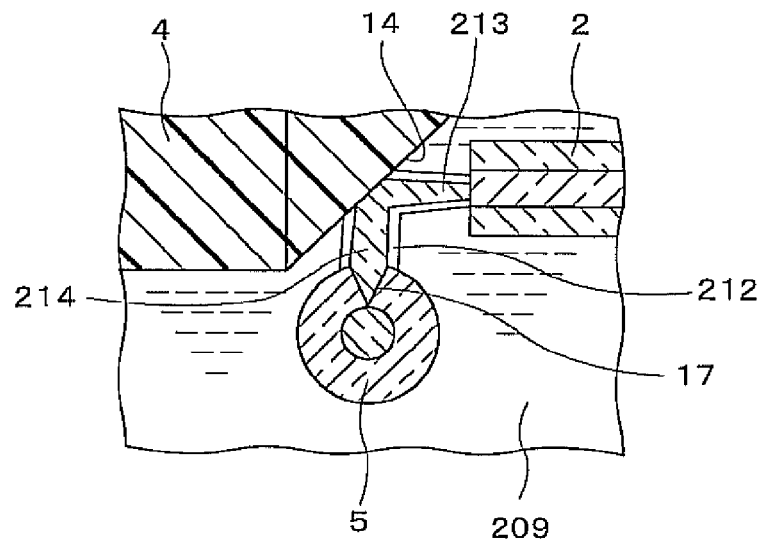
FIG. 36 is a cutaway view showing the method for manufacturing the light source device according to the present embodiment.

In the present embodiment, the self-forming light-guide path technique described above is applied to provide a mechanical and optical connection between the light-direction controller 4 and the optical fibers 2 shown in FIG. 3, to provide a mechanical and optical connection between the light-direction controller 4 and the main fiber 5, and to provide a mechanical and optical connection between the light-direction controller 4 and the main fiber 6. FIG. 35 is a perspective view showing the method for manufacturing the light source device according to the present embodiment. FIG. 36 is a cutaway view showing the method for manufacturing the light source device according to the present embodiment.

First, the row of fibers 3, the light-direction controller 4, and the main fibers 5 and 6 are disposed so as to be in a prescribed positional relationship, as shown in FIG. 35. The surrounding atmosphere is then filled with dry nitrogen for the following two reasons. First, if oxygen is present when the photocurable resin is being cured, the curing is often inhibited, particularly in relation to a photo-radical polymerizable resin. Second, if moisture is present during when the photocurable resin is being cured, the curing process is affected, particularly in relation to a cationic photopolymerization resin. Dry nitrogen must therefore be used in order to eliminate moisture and oxygen from the atmosphere to the extent possible.

Next, a two-component photocurable resin fluid mixture 209 (see FIG. 36) is applied to the end portions of the optical fibers 2 of the row of fibers 3 that face the light-direction controller 4, and to the surfaces of the light-direction controller 4 and the main fibers 5 and 6. The photocurable resin fluid mixture 209 is thereby filled between the optical fibers 2 and the light-direction controller 4, between the light-direction controller 4 and the main fiber 5, and between the light-direction controller 4 and the main fiber 6. At this point, the photocurable resin fluid mixture 209 is also filled into the notches 17 formed in the main fibers 5 and 6. The viscosity of the photocurable resin fluid mixture 209 is preferably sufficiently high so that the fluid does not flow in large quantities into areas other than the desired areas, and sufficiently low so that the fluid follows the shape of the constituent components (optical fibers 2, light-direction controller 4, and main fibers 5 and 6). However, the permissible range of the viscosity can be increased by accurately controlling the amount of applied fluid.

The photocurable resin fluid mixture 209 is composed of two types of resins. The two resins are, specifically, a photo-radical polymerizable resin A and a cationic polymerizable resin B. The mixture ratio of the resin A and resin B is, for example, a volume ratio of 7:3. In this manner, copolymerization is less likely to occur by the mixing of two types of resins that have different polymerization processes. An aromatic carbonyl compound, for example, is used as a radical photopolymerization initiator that is added to resin A and that produces radicals by illumination with light. A material is used that has photosensitivity in the blue light range having a wavelength of about 500 nm, for example. On the other hand, an aromatic diazonium salt, for example, is used as a cationic photopolymerization initiator that is added to resin B and that produces a Lewis acid by illumination with light. A material is used that substantially does not have photosensitivity in the blue light range having a wavelength of about 500 nm, for example.

A parallel planar light source 210 is subsequently placed above the row of fibers 3, i.e., on the side on which the notches 13 are formed, opposite the portion that excludes the end portions of the row of fibers 3 on the side facing the light-direction controller 4. The parallel planar light source 210 emits a substantially parallel blue light in a fixed region in a plane. A light-blocking shield plate 211 is disposed on the side facing the light-direction controller 4 as viewed from the parallel planar light source 210, and the dispersed light and leaked light emitted from the parallel planar light source 210 are not allowed to directly irradiate the photocurable resin fluid mixture 209. Undesirable curing of the photocurable resin fluid mixture 209 can thereby be reduced.

In this state, blue light is emitted from the parallel planar light source 210. The emitted blue light enters the core 11 of the optical fibers 2 from the notches 13 of the optical fibers 2, is internally propagated through the core 11, and is emitted from the end portion of the optical fibers 2 on the side facing the light-direction controller 4. The notches 13 essentially act as light-emitting portions with respect to the light propagated through the core 11 of the optical fibers 2, but since the optical path is reversible, the notches act as light-input portions that allow light that is emitted from the exterior of the optical fibers 2 to be introduced to the interior of the optical fibers 2. The blue light emitted from the optical fibers 2 propagates through the interior of the photocurable resin fluid mixture 209 toward the light-direction controller 4.

A beam 212 of light emitted from the optical fiber 2 disposed facing the mirror 14 of the light-direction controller 4 propagates through the interior of the photocurable resin fluid mixture 209 and arrives at the mirror 14. The light is reflected by the mirror 14, is again propagated through the interior of the photocurable resin fluid mixture 209, and is input at the notch 17 of the main fiber 5, as shown in FIG. 36. The light is introduced from the notch 17 to the interior of the main fiber 5. A self-forming light-guide path 213 that provides a substantially rectilinear connection is thereby formed between the optical fiber 2 and the mirror 14, and a self-forming light-guide path 214 that provides a substantially rectilinear connection is formed between the mirror 14 and the main fiber 5. As a result, a self-forming light-guide path is formed between the optical fiber 2 and the main fiber 5 by way of the mirror 14. In a similar manner, a self-forming light-guide path is formed between the main fiber 6 and the optical fiber 2 disposed in a position facing the mirror 15 of the light-direction controller 4, by way of the mirror 15. A self-forming light-guide path is also formed inside the notches 17 because the interior of the notches 17 formed in the main fibers 5 and 6 is filled with the photocurable resin fluid mixture 209.

In this case, since resin A is a photo-radical polymerizable resin, and an aromatic carbonyl compound having photosensitivity in the blue light region is used as the radical photopolymerization initiator (sensitizing agent), only resin A is cured by selective polymerization, and resin B is kept outside the light-guide path when the area in the vicinity of the optical axis of the beam 212 is cured in the photocurable resin fluid mixture 209. The concentration of the resin A in the light-guide path is thereby made relatively high, and the concentration of the resin A in the uncured portions outside of the light-guide path is made relatively low.

After a self-forming light-guide path that connects the optical fibers 2 and the main fibers 5 and 6 is formed, UV light is allowed to irradiate the entire photocurable resin fluid mixture 209. The uncured portions in the photocurable resin fluid mixture 209 are thereby cured. Both resins A and B are cured in the UV irradiation step. As a result, the resin compositions are mutually different in the self-forming light-guide path cured by blue light and in the peripheral portions of the path cured by UV light, and the indices of refraction are therefore mutually different. The 7:3 mixture ratio described above, for example, is determined so that the refractive index of the photocurable resin fabricated in the UV light irradiation step is sufficiently low to satisfy total reflection conditions with respect to the refractive index of the self-forming light-guide path formed by blue light.

In FIG. 34 described above, the self-forming light-guide path transitions from a tapered portion 204 to a rectilinear portion 205 before arriving at the mirror 207, but because the distance between the optical fiber 2 and the light-direction controller 4 is short in the present embodiment, the self-forming light-guide path has a tapered portion at the position where the beam 212 arrives at the mirror 14, and has a rectilinear shape in the position just prior to entering the main fibers 5 and 6, as shown in FIG. 36.

Next, mechanical and optical connections are formed between the main fiber 7 and the end portion of the optical fibers 2 in the row of fibers 3 on the side opposite the light-direction controller 4, as shown in FIG. 3. The light sources 8 to 10 are optically connected to the end portions of the main fibers 5 to 7. The light source device 1 according to the first embodiment described above is thereby manufactured.

The operation and effects of the present embodiment are described below. In accordance with the present embodiment, the constituent elements can be optically connected with good precision and in a reliable manner by applying the self-forming light-guide path technique to provide an optical connection between the constituent elements, i.e., the optical fibers, the light-direction controller, and the main fibers. For this reason, the loss of light associated with connections between constituent elements is low, and a light source device with a very high light efficiency can be manufactured.

In the present embodiment, a photocurable resin fluid mixture composed of two types of resin is used, a self-forming light-guide path is formed by blue light, and the peripheral uncured photocurable resin is then cured by UV light. Therefore, a package in which a core and cladding are formed and in which the constituent elements are bonded to each other can be brought about in a simple manner as a series of steps. The manufacturing cost of the light source device can therefore be reduced.

In the present embodiment, since the constituent elements are optically connected by self-formation, the positioning precision between the constituent elements is not required to be very high. The reason for this is that the self-forming light-guide path 214 and the notches 17 of the main fiber 5 are integrally formed, as shown in FIG. 36, and the diameter of the self-forming light-guide path 214 is greater than the width of the notches 17. Therefore, light does not leak to the exterior and can be reliably introduced into the self-forming light-guide path 214 when the light propagated inside the main fiber 5 is introduced to the self-forming light-guide path 214 by way of the notches 17, even if the optical axis of the self-forming light-guide path 214 is somewhat offset from the center of the notches 17. Therefore, in the present embodiment, the positioning between the constituent elements is simple when the light source device is assembled, and the manufacturing costs can be reduced.

Furthermore, in the present embodiment, a self-forming light-guide path can ordinarily be formed by irradiation with light that lasts for less than one minute, e.g., 30 seconds, depending on the intensity of the light used to fabricate the self-forming light-guide path, the diameter of the core of the optical fibers and main fibers, and the photosensitivity and the curing characteristics of the photocurable resin. The treatment for curing the uncured resin by using UV light can be achieved in about two minutes. In this manner, the required time to fabricate a self-forming light-guide path is short, the throughput is very high, and the manufacturing costs can be reduced as a result.

In the present embodiment, two-types of photopolymerization initiators having different sensitivity in the blue light region were used, but the wavelength region in which the sensitivity is different is not particularly limited to blue, and there is not problem in using a wavelength region that is easy to handle during use. Various photopolymerization initiators can be used. Examples of materials that can be used as radical photopolymerization initiators are those that make use of molecular cleavage, hydrogen abstraction, exciplex formation, and other types of reactions. Various materials can be used as a monomer, linear polymer, or unsaturated oligomer, which are used in conjunction with the photopolymerization initiator. No limitation is imposed by the exemplified aromatic diazonium salt, and aromatic iodonium salt, aromatic sulfonium salt, and other substances may be used as the cationic photopolymerization initiator. Also, in the present embodiment, two types of resins that involve different polymerization steps, i.e., radical photopolymerization and cationic photopolymerization, were used to prevent copolymerization, but a photoaddition reaction such as the addition of a thiol group to a double bond, for example, can be used as another polymerization process. This reaction system is advantageous in that the system is only minimally affected by oxygen, and curing is simple to accomplish even in the presence of air. Copolymerization can be prevented by using a plurality of resins that have different polymerization processes, and the cladding can be easily formed in the periphery of the self-forming light-guide path after the path has been formed.

Figure 37:
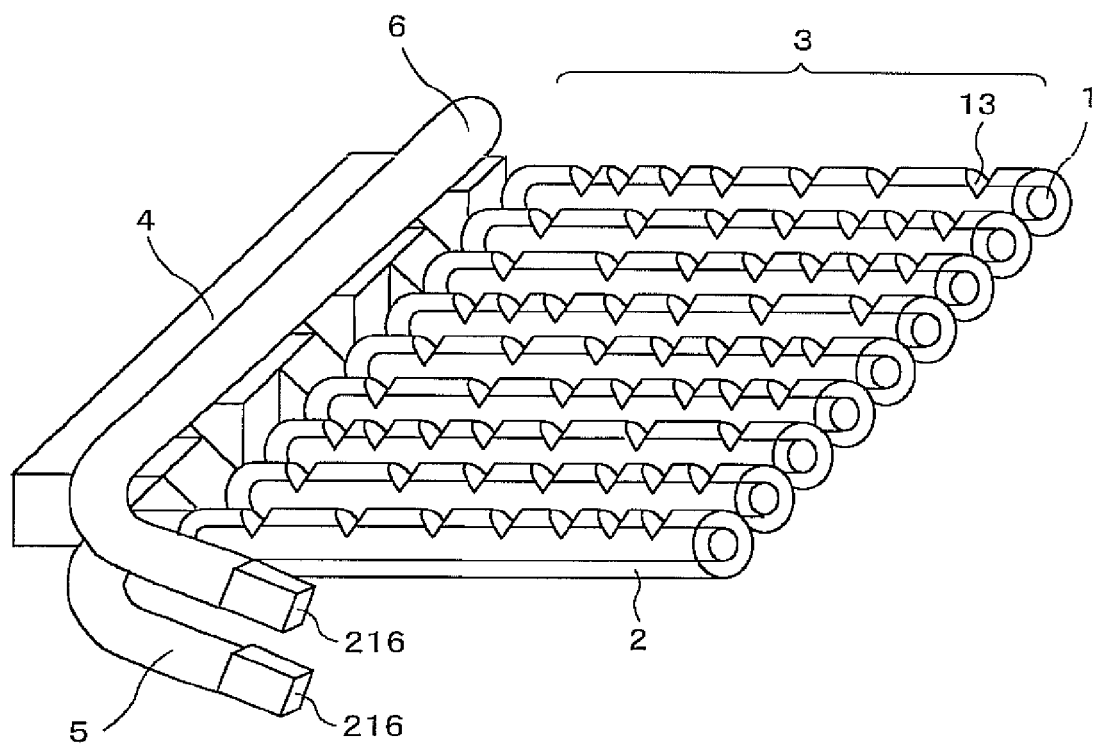
FIG. 37 is a perspective view showing the method for manufacturing the light source device according to the twenty-first embodiment of the present invention.
Figure 38:
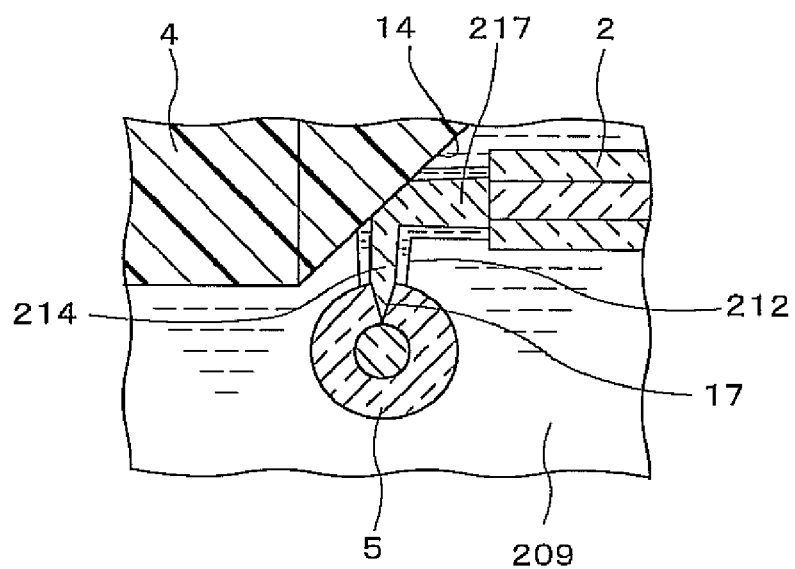
FIG. 38 is a cutaway view showing the method for manufacturing the light source device according to the present embodiment.

The twenty-first embodiment of the present invention is described next. FIG. 37 is a perspective view showing the method for manufacturing the light source device according to the present embodiment. FIG. 38 is a cutaway view showing the method for manufacturing the light source device according to the present embodiment. The present embodiment is different from the twentieth embodiment described above in that a parallel planar light source 210 and a light-blocking shield plate 211 (see FIG. 35) are not used, and a light source 216 is connected to each of the end portions of the main fibers 5 and 6, as shown in FIG. 37. The light source 216 is an LED that emits a blue laser light having a wavelength of 488 nm, for example.

The traveling direction of the light for fabricating the self-forming light-guide path in the present embodiment is thereby reversed in comparison with the twentieth embodiment described above. In other words, in the twentieth embodiment described above, blue light emitted from the parallel planar light source 210 travels through the optical fibers 2 to the light-direction controller 4, and then to the main fiber 5 or 6, but in the present embodiment, the blue light emitted from the light source 216 travels through the main fiber 5 or 6 to the light-direction controller 4, and then to the optical fibers 2. As a result, the light-guide path formed between the main fiber 5 and optical fibers 2 is narrow on the side of the main fiber 5 and becomes thicker in approach to the optical fibers 2, as shown in FIG. 38. After a self-forming light-guide path 217 is formed by the blue light, UV light is allowed to irradiate the entire photocurable resin fluid mixture 209 to cure the uncured portions. The configuration and operation other than those described above in the present embodiment are the same as those in the twentieth embodiment described above.

In accordance with the present embodiment, a parallel planar light source 210 and a light-blocking shield plate 211 (see FIG. 35) do not need to be prepared because a self-forming light-guide path is formed by propagating light in the same direction as when a parallel planar light source is used, which is different from the twentieth embodiment described above. In the present embodiment, special equipment does not need to be prepared other than the light source 216 for the photocurable resin and the UV light source for curing the entire photocurable resin fluid mixture 209. The costs of manufacturing a light source device can therefore be further reduced.

In the present embodiment, a photocurable resin fluid mixture 209 is filled between the optical fibers 2 and main fiber 7 (see FIG. 3), and a self-forming light-guide path may be formed between the optical fibers 2 and main fiber 7 by connecting the light source 216 to the end portion of the main fiber 7 as well. Since the entire set of main fibers 5 to 7 is thereby connected to the row of fibers 3 by way of a self-forming light-guide path, the light efficiency of the light source device 1 can be further increased, the manufacture of the light source device 1 can be further facilitated, and the manufacturing costs of the device can be reduced. The effects other than those described above in the present embodiment are the same as those in the twentieth embodiment described above.

Figure 39:
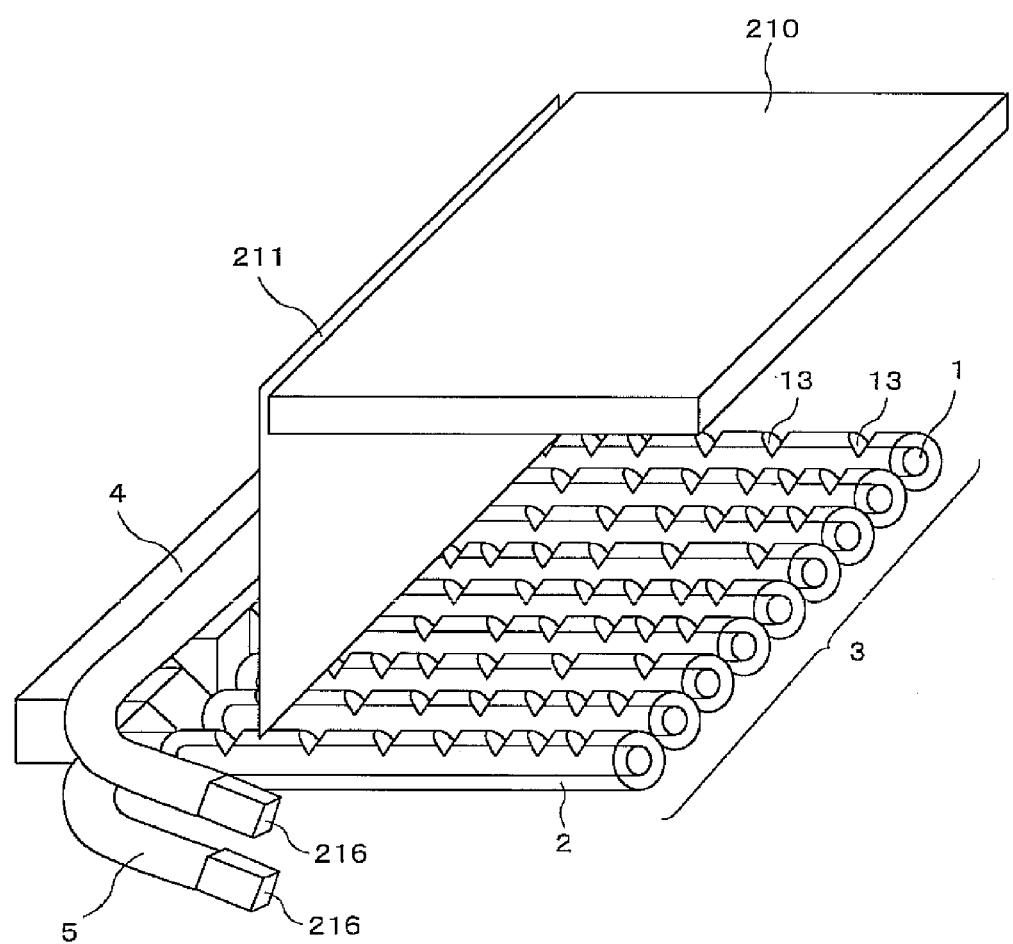
FIG. 39 is a perspective view showing the method for manufacturing the light source device according to the twenty-second embodiment of the present invention.
Figure 40:
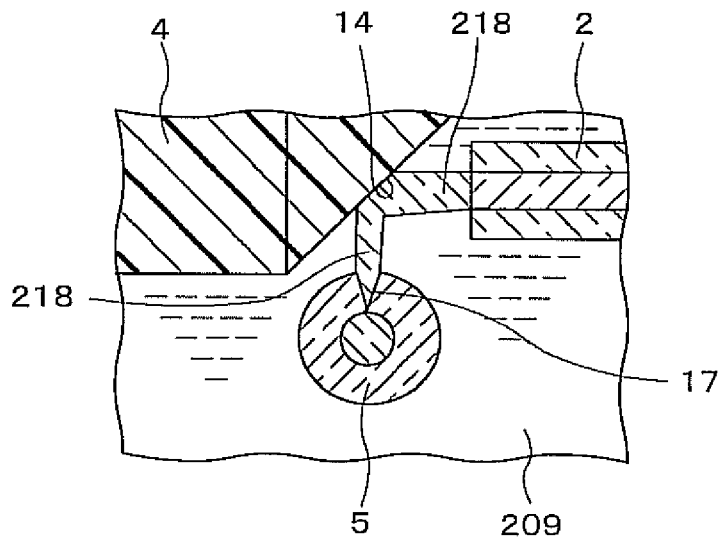
FIG. 40 is a cutaway view showing the method for manufacturing the light source device according to the present embodiment.

The twenty-second embodiment of the present invention is described next. FIG. 39 is a perspective view showing the method for manufacturing the light source device according to the present embodiment. FIG. 40 is a cutaway view showing the method for manufacturing the light source device according to the present embodiment. The present embodiment is a combination of the twentieth and twenty-first embodiments, as shown in FIG. 39. In other words, in the present embodiment, blue light is emitted from the parallel planar light source 210 and is propagated through the optical fibers 2 to the light-direction controller 4, and then to the main fiber 5 or 6; the light source 216 is connected to the main fibers 5 and 6; and the blue light emitted from the light source 216 is propagated through the main fiber 5 or 6 to the light-direction controller 4, and then to optical fibers 2, as shown in FIG. 39. The configuration other than that described above in the present embodiment is the same as in the twentieth embodiment described above.

As described above, in the present embodiment, blue light is emitted from the two sides of the optical path composed of the optical fibers 2, light-direction controller 4, and main fibers 5 or 6. In the self-forming light-guide path 218 formed in the photocurable resin fluid mixture 209, the diameter of the two end portions, i.e., the portions that make contact with the optical fibers 2 and main fibers 5 or 6, is substantially equal to the diameter of each of the optical fibers 2 and the diameter of the main fiber 5 or 6, and continuously increases in progression to the center portion of the self-forming light-guide path, as shown in FIG. 40. As a result, the entire area between the optical fibers 2 and the main fiber 5 and 6 can be smoothly connected by the self-forming light-guide path 218. The loss of light in the self-forming light-guide path 218 and in the connecting portions at the two ends is thereby reduced and the light efficiency is further improved.

In the twenty-first embodiment described above, a small amount of light is lost in the connecting portions between the optical fiber 2 and the self-forming light-guide path 217 because the diameter of the self-forming light-guide path 217 is greater than the diameter of the optical fibers 2, as shown in FIG. 38. In contrast, there is substantially no loss of light in the connection portions in accordance with the present embodiment. In the present embodiment, however, manufacturing costs are increased in comparison with the twenty-first embodiment described above because a parallel planar light source 210 and a light-blocking shield plate 211 must be prepared in addition to the light source 216. For this reason, the present embodiment or the twenty-first embodiment described above may be adopted as the method for manufacturing a light source device, and a decision between the two can be made by calculating the cost and the performance required in the light source device. The effects other than those described above in the present embodiment are the same as those in the twentieth embodiment described above.

Figure 41A:
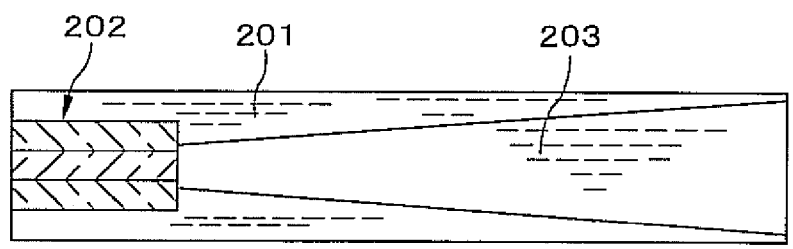
FIGS. 41A to 41C are cross-sectional views showing the principles and order of steps of the method for fabricating a self-forming light-guide path in which the resin is prevented from curing through the use of oxygen.
Figure 41B:
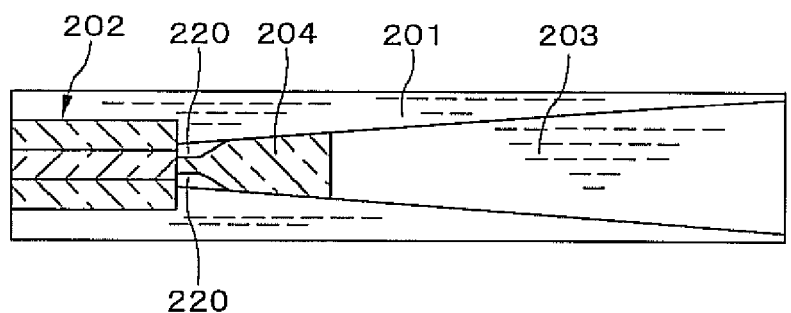
Figure 41C:
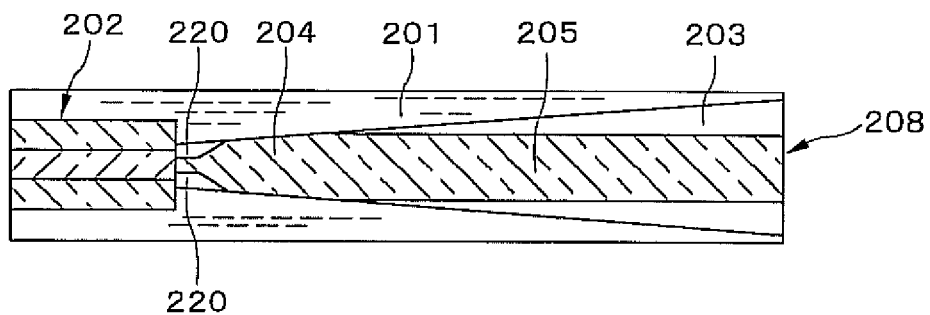

The twenty-third embodiment of the present invention is described next. As described above, the presence of oxygen in the photocurable resin fluid mixture obstructs the curing of the radical photopolymerization resin A. The following manufacturing method is carried out in the present embodiment to make use of this characteristic. A description will first be given of the basic principles of the manufacturing method of the self-forming light-guide path carried out in the present embodiment, i.e., the method for manufacturing the self-forming light-guide path in which the resin is prevented from curing through the use of oxygen. FIGS. 41A to 41C are cross-sectional views showing the principles and order of steps of the method for fabricating a self-forming light-guide path in which the resin is prevented from curing through the use of oxygen.

First, oxygen is deposited in a prescribed amount on the surface of the optical fiber 202, dry nitrogen is used as the ambient atmosphere, and uncured photocurable resin 201 is placed about the periphery of the optical fiber 202, as shown in FIG. 41A. A two-component mixed resin fluid is used as the photocurable resin 201 in the same manner as the photocurable resin fluid mixture 209 described above. A beam 203 is then emitted from the one end portion 202a of the optical fiber 202.

The portion in the vicinity of the optical axis of the beam 203 in the photocurable resin 201 begins to cure, as shown in FIG. 41B. At this point, the oxygen deposited on the optical fiber 202 prevents the photocurable resin 201 from curing in the vicinity of the optical fiber 202. As a result, an uncured portion 220 caused by oxygen obstruction is produced in the areas in contact with the optical fiber 202, and the diameter is reduced in the portion irradiated by the beam 203 in the photocurable resin 201. In other words, the tapered portion 204 takes on a constricted shape in the portion in contact with the optical fiber 202.

The uncured portion 220 produced by the oxygen obstruction is left behind even after the curing of the photocurable resin 201 progresses and the rectilinear portion 205 is formed at the distal end of the tapered portion 204, as shown in FIG. 41C. A self-forming light-guide path 208 is thereby formed in which the diameter of the portion in contact with the optical fiber 202 is less than the diameter of the core of the optical fiber 202.

Figure 42A:
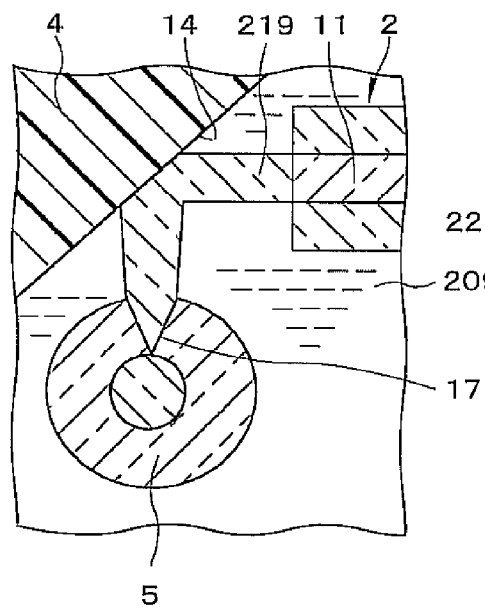
FIG. 42A is a cross-sectional view showing the self-forming light-guide path fabricated in the twenty-second embodiment described above.

Next, described next is the case in which the method of fabricating a self-forming light-guide path by using the oxygen obstruction described above is applied to the present embodiment. FIG. 42A is a cross-sectional view showing the self-forming light-guide path fabricated in the twenty-second embodiment described above, and FIG. 42B is a cross-sectional view showing the self-forming light-guide path fabricated in the present embodiment. First, the row of fibers 3, the light-direction controller 4, and the main fibers 5 and 6 are placed at prescribed positions, as shown in FIG. 39. Oxygen is then deposited in a prescribed amount on the surface of the row of fibers 3, the light-direction controller 4, and the main fibers 5 and 6, after which dry nitrogen is used to create the ambient atmosphere. The photocurable resin fluid mixture 209 is then filled between the constituent elements.

Blue light is subsequently emitted by the parallel planar light source 210 and introduced to the optical fibers 2 by way of the notches 13. Blue light is emitted by the light source 216 and introduced to the main fibers 5 and 6. A self-forming light-guide path 221 (see FIG. 42B) that optically connects the optical fibers 2 and the main fiber 5 with each other, and a self-forming light-guide path that optically connects the optical fibers 2 and the main fiber 5 with each other, are thereby formed in the photocurable resin fluid mixture 209 in the same manner as in the twenty-second embodiment described above. UV light is thereafter allowed to irradiate the entire the photocurable resin fluid mixture 209 to cure the uncured portions of the photocurable resin fluid mixture 209.

The operation of the present embodiment is described next with comparison made to the twenty-second embodiment described above. In the twenty-second embodiment described above, the diameter of the self-forming light-guide path 219 formed between the optical fibers 2 and the main fiber 5 is substantially equal to the diameter of the core 11 of the optical fibers 2 in the portions that are in contact with the optical fibers 2, as shown in FIG. 42A, and continuously increases in progression from the portion in contact with the optical fibers 2 to the light-direction controller 4. Also, the diameter is substantially equal to the width of the notches 17 in the portion in contact with the main fiber 5, and continuously increases in progression from the portion in contact with the main fiber 5 to the light-direction controller 4.

Figure 42B:
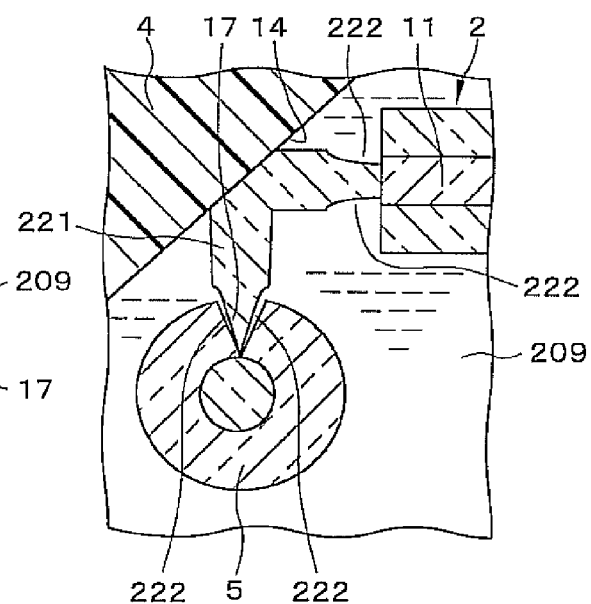
FIG. 42B is a cross-sectional view showing the self-forming light-guide path fabricated in the present embodiment.

In contrast, in the present twenty-third embodiment, the uncured portion 220 created by the inhibiting effect of oxygen is formed at the two ends of the self-forming light-guide path 221 between the optical fiber 2 and the main fiber 5, as shown in FIG. 42B. For this reason, the diameter of the self-forming light-guide path 221 is less than the core 11 of the optical fiber 2 in the portion in contact with the optical fiber 2, rapidly increases is progression away from the optical fiber 2, and continuously increases in progression toward the light-direction controller 4. Also, the diameter is less than the width of the notches 17 in the portion in contact with the main fiber 5, increases rapidly in progression away from the light source device 17, and continuously increases in progression toward the light-direction controller 4.

The effects of the present embodiment are described next. In the twenty-second embodiment described above, there is no problem as long as the optical axis and the diameter at the end portion of the side in contact with the optical fiber 2 of the self-forming light-guide path 218 match the optical axis and the diameter of the core 11 of the optical fiber 2. However, in actual practice, since the self-forming light-guide path 218 is formed by allowing blue light to enter from the two sides of the path, the diameter of the end portion of the self-forming light-guide path 218 is made slightly greater than the diameter of the core 11 of the optical fiber 2 by the blue light emitted from the notches 17 of the main fibers, and the optical axis of the path is sometimes slightly offset with respect to the optical axis of the core 11 of the optical fiber 2. In this case, a portion of the light conducted through the self-forming light-guide path 218 can no longer enter the core 11 of the optical fiber 2, and the light efficiency is reduced. In order to solve this problem, the position may be sufficiently adjusted so that offsetting does not occur between the optical axis of the main fibers 5 and 6 and the optical axis of the core 11 of the optical fiber 2, but such positional adjustment is very difficult and leads to considerably higher costs.

In contrast, in accordance with the present embodiment, the diameter of the end portion of the side in contact with the optical fiber 2 in the light-blocking shield plate 211 is less than the diameter of the core 11 of the optical fiber 2. Therefore, the end portion does not become separated from the core 11 of the optical fiber 2 even when the diameter of the end portion increases somewhat or the optical axis of the end portion becomes offset. For this reason, the light efficiency is not reduced. Also, since high positioning precision between the main fiber and the optical fiber is not required, the cost of manufacturing a light source device can be greatly reduced. The effects other than those described above in the present embodiment are the same as those in the twenty-second embodiment described above.

Figure 43A:
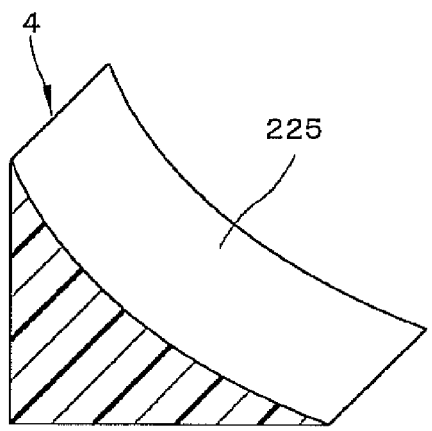
FIG. 43A is a perspective view showing the mirror portion of the light-direction controller in the present embodiment.
Figure 43B:
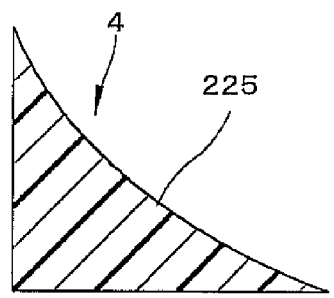
FIG. 43B is a cross-sectional view thereof.

The twenty-fourth embodiment of the present invention is described next. FIG. 43A is a perspective view showing the mirror portion of the light-direction controller in the present embodiment, and FIG. 43B is a cross-sectional view thereof. In the present embodiment, a mirror 225 with a concave surface is used as the mirrors 14 and 15 of the light-direction controller 4, as shown in FIGS. 43A and 43B. The light emitted from the notches 17 of main fibers 5 and 6 is focused by the mirror 225. The light can therefore be efficiently introduced to the core of the optical fibers 2. Also, since the light emitted from the optical fibers 2 is focused by the mirror 225, the light can be efficiently introduced to the main fibers 5 and 6. A self-forming light-guide path that is thin at the two ends can thereby be formed and the light efficiency improved even if the inhibiting effect of oxygen is not used.

The concave mirror 225 can be fabricated by the extrusion molding method in the same manner as in the twentieth embodiment described above. A concave surface can also be formed, for example, by applying pressure from the exterior of the relatively soft material. An example of this method is a method in which a silicon substrate is cut at an angle of 45° and pressure is applied to the cut surface.

In the twentieth to twenty-fourth embodiments described above, in addition to photo-curing properties, anaerobic curing properties may also be imparted to the resin that is added to the photocurable resin fluid mixture. It is also possible to use a material referred to as a UV-curable anaerobic adhesive that cures in UV light and in an anaerobic state, for example. However, the material must have the desired index of refraction after photo-curing and must be sufficiently transparent in the wavelength regions in which the cured core portions are used. Since the configuration of the constituent elements in the light source device is very complex due to the endowed anaerobic properties, the portions that do not come in contact with light are ordinarily in an anaerobic state because oxygen is blocked by the constituent elements or by the resin material itself, and these portions are cured by the anaerobic-curing properties, even under conditions in which the light for curing does not adequately reach these portions. The effect produced by anaerobic curing substantially does not occur in the stage for fabricating the self-forming light-guide path, and the cladding portion can be sufficiently cured after the photo-curing stage because the curing rate of anaerobic curing is lower than the curing rate of UV-light curing. Even if the anaerobic-curing rate is 30 minutes or more, for example, a satisfactory throughput can still be obtained when the light source device is manufactured. Other components, e.g., heat and light, are therefore not required during curing as long as the oxygen in the target portions is blocked from the resin endowed with anaerobic-curing properties. For this reason, the resin is left in the dry nitrogen atmosphere. When the areas that are to be made anaerobic are blocked from outside air by the resin material itself, there is an advantage in that the resin does not need to be placed in a dry nitrogen atmosphere, and the reaction proceeds without the aid of special equipment.

Described next are the embodiments of the method for manufacturing the display device according to the present invention, i.e., the twenty-fifth embodiment of the present invention. The present embodiment is a method for manufacturing the display device according to the eighteenth embodiment described above. First, the light source device 1 according to the first embodiment described above is fabricated by using any of the above-described twentieth to twenty-fourth embodiments. A photocurable resin fluid mixture 209 is applied to the upper surface of the light source device 1, and the liquid crystal panel 102 is superimposed on the coating. A plurality of pixels 110 are arrayed in the form of a matrix in the liquid crystal panel 102, and a transparent area is disposed on each pixel 110.

In this state, blue light, for example, is directed from above the liquid crystal panel 102. The blue light passes through the transmissive area on each pixel 110 of the liquid crystal panel 102 and irradiates the portion positioned directly below the transmissive area in the photocurable resin fluid mixture 209. A pyramidal frustum-shaped self-forming light-guide path 112 whose side surface bulges outward is thereby formed in the photocurable resin fluid mixture 209. The entire photocurable resin fluid mixture 209 is thereafter cured by heating, for example. As a result, the uncured portions other than the self-forming light-guide path 112 in the photocurable resin fluid mixture 209 are cured to form a transparent resin layer 111. At this point, the index of refraction of the transparent resin layer 111 is less than the index of refraction of the self-forming light-guide path 112.

In the present embodiment, light emitted from the light source device 1 can thus be prevented from leaking to areas other than the transmissive areas of the liquid crystal panel 102. This is achieved by forming a plurality of self-forming light-guide paths 112 so as to achieve correspondence with the transmissive area of the each pixel 110 of the liquid crystal panel 102 between the light source device 1 and the liquid crystal panel 102. A liquid crystal display device 101 in which light is efficiently transmitted from the light source device 1 to the liquid crystal panel 102 can thereby be manufactured.

In the present embodiment, the light sources 8 to 10 may be lighted when light is directed from above the liquid crystal panel 102. Light is thereby directed from the upward side, i.e., the side of the liquid crystal panel 102, onto the layer composed of the photocurable resin fluid mixture 209, and is directed from the downward side, i.e., the side of the light source device 1, to form a self-forming light-guide path from the two directions above and below. As a result, the leaking of light can be reduced even in the case of an insufficient alignment between the transmissive area of the liquid crystal panel 102 and the notches 13 (see FIG. 3) of the light source device 1.

The twenty-sixth embodiment of the present invention is described next. The present embodiment is a more specific embodiment of the display device and the method for manufacturing the display device according to the present invention. FIGS. 44A to 44D and 45A to 45D are cross-sectional views showing the method and order of steps for fabricating the liquid crystal panel of the liquid crystal display device according to the present embodiment.

Figure 44A:
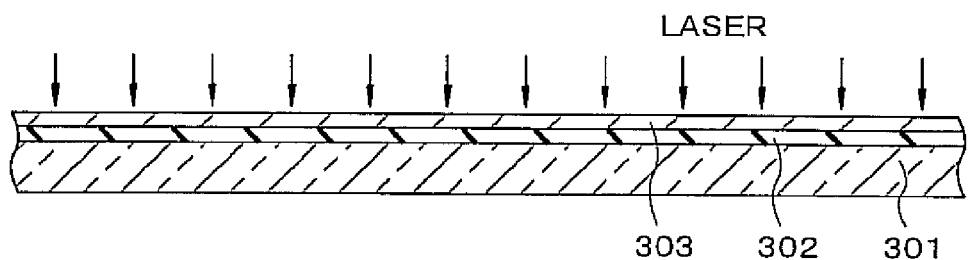
FIGS. 44A to 44D are cross-sectional views showing the method and order of steps for fabricating the liquid crystal panel of the liquid crystal display device according to the twenty-sixth embodiment of the present invention.
Figure 44B:
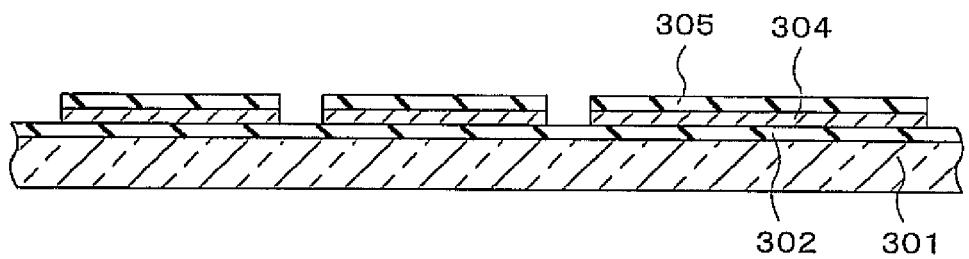

The method of fabricating the liquid crystal panel 102 is described below. The method for fabricating a TFT array substrate is described first. A silicon oxide film 302 is formed on a glass substrate 301, and an amorphous silicon film 303 is grown on the silicon oxide film, as shown in FIG. 44A. Next, annealing is performed by irradiating an excimer laser on the amorphous silicon film 303 to form a polysilicon film 304 (see FIG. 44B). A silicon oxide film 305 is subsequently grown to a thickness of 10 nm on the polysilicon film 304, as shown in FIG. 44B. The silicon oxide film 305 and polysilicon film 304 are then patterned and selectively removed.

Figure 44C:
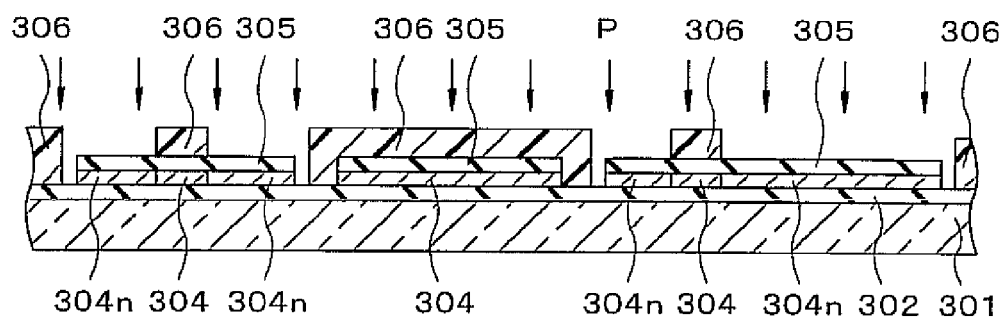

A photoresist film 306 is applied and patterned, and the areas of the polysilicon film 304 that will become the n-type region are exposed, as shown in FIG. 44C. The polysilicon film 304 is then selectively doped with phosphorus (P) ions by using the patterned photoresist film 306 as a mask. A source and drain regions 304n of the n-channel transistor are thereby formed in the polysilicon film 304. The photoresist film 306 is thereafter removed.

Figure 44D:
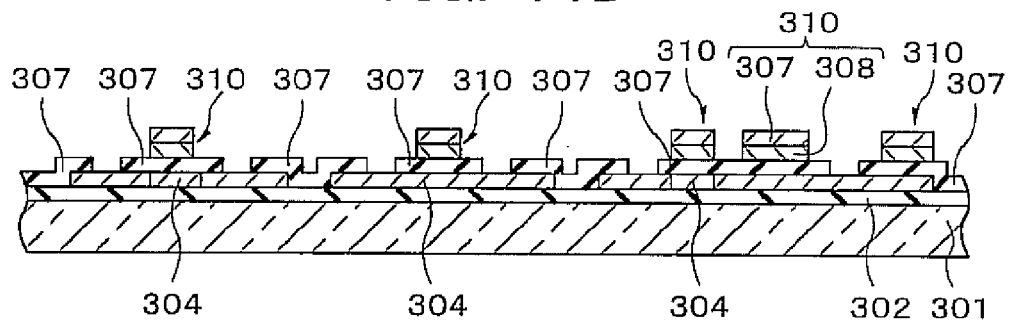

Next, a silicon oxide film is grown to a thickness of 90 nm to form the silicon oxide film 305 and a gate insulation film 307, as shown in FIG. 44D. Contact holes are then formed in the gate insulation film 307. An amorphous silicon film 308 and a tungsten silicide (WSi) film 309 are subsequently formed in the stated order on the gate insulation film 307. The tungsten silicide film 309 and amorphous silicon film 308 are patterned to form gate electrodes 310. At this point, the gate electrodes 310 may be formed and phosphorus ions may be injected again by using the gate electrodes 310 as a mask so that the outer periphery of the gate electrodes 310, as viewed from a direction perpendicular to the surface of the glass substrate 301, constitutes the inner side of the outer periphery of the areas covered by the photoresist film 306 in the step shown in FIG. 44C. An LDD (Lightly Doped Drain) region may be formed on the source and drain regions 304n and between the channel areas positioned between these regions.

Figure 45A:
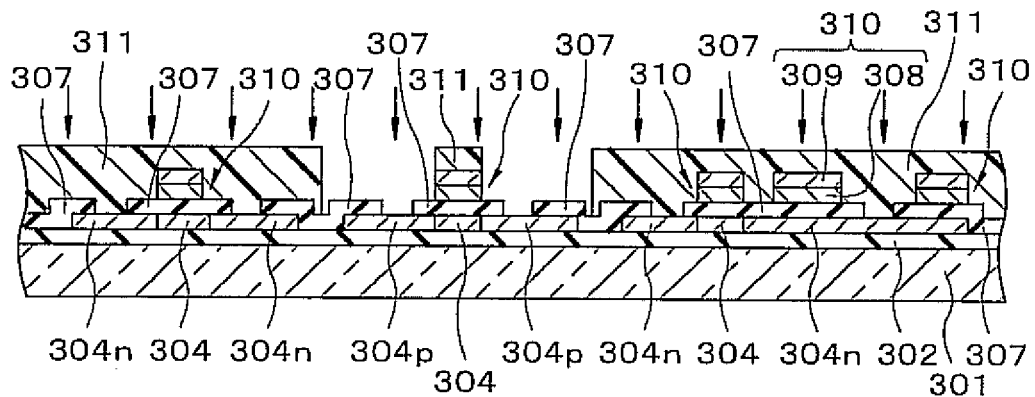
FIGS. 45A to 45D are cross-sectional views showing the method and order of steps for fabricating the liquid crystal panel of the liquid crystal display device according to the present embodiment, and shows the steps following FIG. 44D.

A photoresist film 311 is applied and then patterned to expose the areas of the polysilicon film 304 that will become the p-type regions, as shown in FIG. 45A. The polysilicon film 304 is then selectively doped with boron (B) ions by using the patterned photoresist film 311 as a mask. Source and drain regions 304p of the p-channel transistors are thereby formed in the polysilicon film 304. The photoresist film 311 is thereafter removed.

Figure 45B:
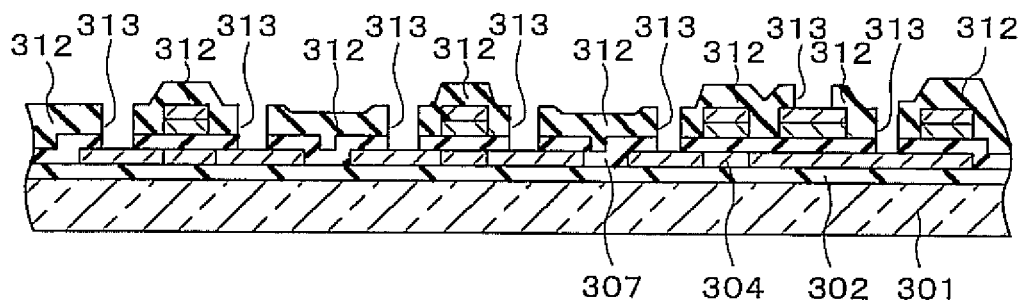
Figure 45C:
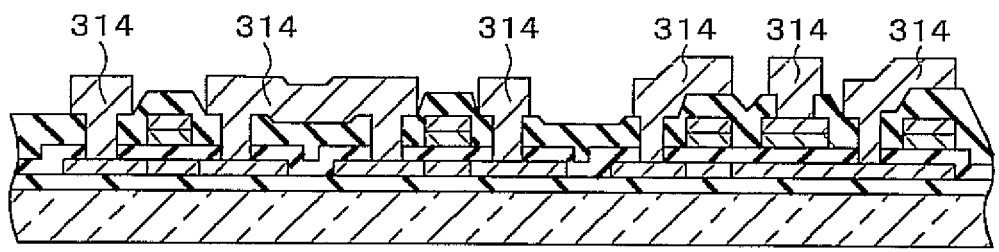

A silicon oxide film and a silicon nitride film are subsequently continuously grown to form an interlayer insulation film 312, as shown in FIG. 45B. Contact holes 313 are formed in the interlayer insulation film 312 so as to be in communication with the contact holes formed in the gate insulation film 307. An aluminum film and a titanium film are then formed by sputtering to form a conductive film 314, as shown in FIG. 45C. The conductive film 314 is then patterned to thereby form source electrodes and drain electrodes, as well as data lines, gate electrodes, and other elements connected to the drain electrodes.

Figure 45D:
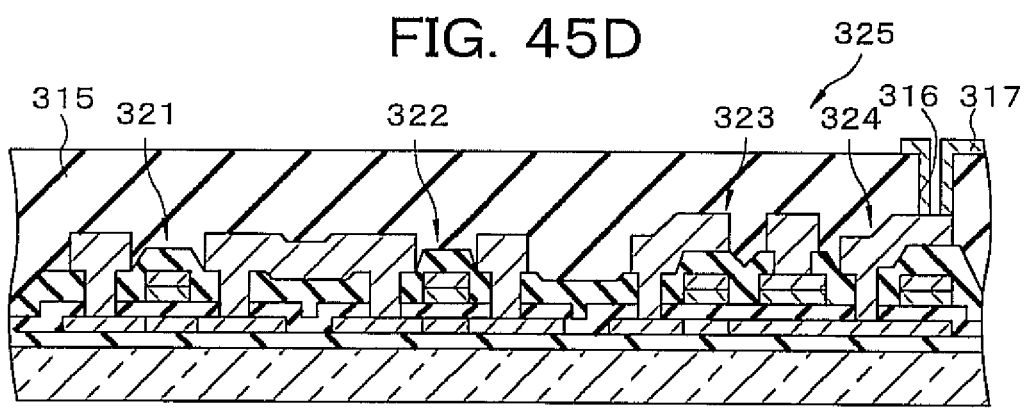

A silicon nitride film is then formed to obtain a flattened film 315, as shown in FIG. 45D. Contact holes 316 are formed in the flattened film 315 so as to reach the source electrodes of the pixel switch TFT. An ITO (indium tin oxide) film is subsequently formed on the flattened film 315 and patterned to form pixel electrodes 317. The pixel electrodes 317 are transparent electrodes connected to the source electrodes of the pixel switch TFTs by way of the holes 316. An orientation film (not shown) is then printed on the entire surface, and the film is rubbed.

A TFT array substrate 325 is thereby fabricated having a planar-structured TFT, i.e., an n-channel transistor 321 of the scanning circuit, a p-channel transistor 322 of the scanning circuit, a pixel switch n-channel transistor 323, and holding capacitance 325. A scanning electrode drive circuit, a signal electrode drive circuit, and a portion of an electrode electric potential controller shared with a portion of a synchronization circuit (none of which are shown) are formed on the TFT array substrate 325.

In the present embodiment, an excimer laser is allowed to irradiate the amorphous silicon film 303 to perform annealing and to form the polysilicon film 304 in the step shown in FIG. 44A, but the grain size may be improved by using laser irradiation after the polysilicon film has been formed. A continuous-wave (CW) laser may be used besides an excimer laser. Rather than a laser, it is also possible to convert the amorphous silicon film into a polysilicon film by high-speed annealing using a catalyst. The conversion to polysilicon can also be carried out by induction heating or another heat treatment. An amorphous TFT array can furthermore be formed by omitting the step for converting the amorphous silicon film to a polysilicon film. In the present embodiment, the gate electrodes are formed using tungsten silicide, but the gate electrodes may be formed using another dielectric material such as chromium.

The method for fabricating an opposing substrate (not shown) is described next. First, an ITO film is formed on the entire surface of the glass substrate and patterned to form an opposing electrode. A chromium layer is then formed and patterned to form a light-blocking layer. The light-blocking layer may be formed prior to forming the opposing electrode. Next, a column with a height of 3.5 μm, for example, is formed. The column functions as a spacer for maintaining a cell gap and guarantees the shock resistance of the liquid crystal panel. The height of the column can be suitably selected in accordance with the design of the liquid crystal panel. Next, an orientation film is printed on the entire surface and the film is rubbed. At this point, the rubbing direction is set to a direction orthogonal to the rubbing direction of the orientation film of the TFT array substrate when the opposing substrate is laminated to the TFT array substrate in a later step. An opposing substrate is fabricated in this manner.

A UV-curing sealant is then applied to the exterior of the pixel area of the opposing substrate. The opposing substrate and the TFT array substrate 325 described above are laminated via the sealant so that the orientation films of the two substrates face each other, and the rubbing directions are mutually orthogonal. The TFT array substrate and opposing substrate are bonded together by irradiation with UV light to cure the sealant. A nematic liquid crystal is injected between the two substrates to form a liquid crystal layer. In the liquid crystal layer, the orientation direction between the two substrates corresponds to a 90° TN mode. The liquid crystal panel 102 is fabricated in this manner.

In the present embodiment, the light-blocking film was made of chromium, but the present invention is not limited to chromium, and it is apparent that a light-blocking material other than chromium may be used as the material of the light-blocking film. Examples of materials that may be used include WSi (tungsten silicide), aluminum, and silver alloys. In the present embodiment, the light-blocking film was disposed on the opposing substrate side, but the light-blocking film may be disposed on the side of the TFT array substrate. There are three types of structures for forming a light-blocking chromium patterning layer on the TFT array substrate. The first structure is one in which a light-blocking chromium patterning layer is formed on a glass substrate. The structure can be manufactured in the same manner as in the above-described steps after the light-blocking patterning layer is formed. The second structure is one in which the TFT array substrate is manufactured in the same structure as described above, and the light-blocking chromium patterning layer is formed last. The third structure is one in which the light-blocking chromium patterning layer is formed midway through the fabrication of the structure described above. When a patterning layer is formed on the side of the TFT array substrate using light-blocking chromium, a light-blocking chromium patterning layer does not need to be formed on the opposing substrate. In this case, the opposing substrate can be fabricated by forming an ITO film across the entire surface and by patterning the film.

The light source device according to the first embodiment described above may be mounted as a backlight, for example, on a liquid crystal panel 102 fabricated in this manner. The light source device is composed of an LED light source, a light-direction controller, and a row of fibers comprising optical fibers, as described above in the twentieth embodiment, for example. The optical fiber sheet may be an optical fiber ribbon cord that is formed in accordance with JIS C 6839, for example. Notches are formed in the cord by cutting while changing the density in the lengthwise direction to fabricate the row of fibers.

Figure 46:
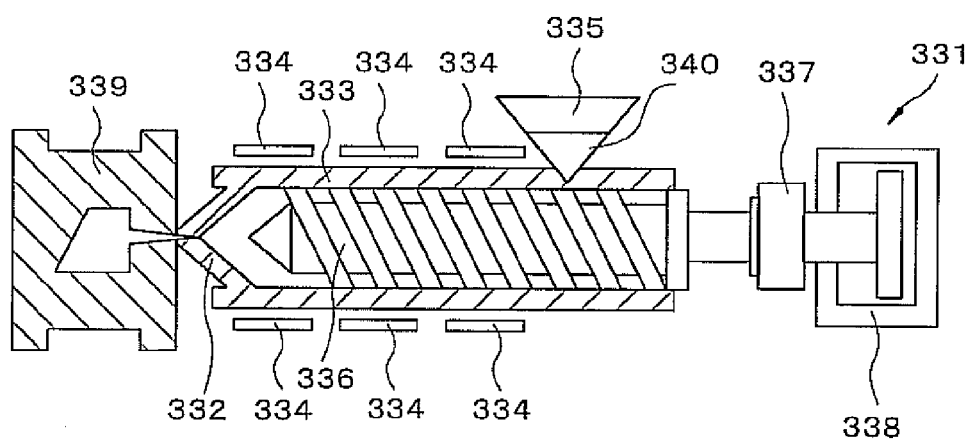
FIG. 46 is a cross-sectional view showing the injection molding machine for molding the base of the light-direction controller in the present embodiment.

The method for fabricating a light-direction controller is described next. First, a base is fabricated by injection molding. The case of injection molding the base of the light-direction controller 4 is described in detail next. FIG. 46 is a cross-sectional view showing the injection molding machine for molding the base of the light-direction controller in the present embodiment.

A cylindrical cylinder 333 in which a conical nozzle 332 is located at the distal end thereof is placed in an injection molding machine 331, as shown in FIG. 46, and heaters 334 for heating the cylinder 333 are placed around the cylinder 333. A funnel-shaped hopper 335 for feeding injection material 340 into the cylinder 333 is mounted above the cylinder 333. A screw 336 is inserted inside the cylinder 333 from the end that is opposite from the nozzle 332. A hydraulic motor 337 for rotating the screw 336 is connected to the rear end portion of the screw 336, and a hydraulic cylinder 338 for pressing the screw 336 toward the nozzle 332 together with the rotation of the hydraulic motor 337 is placed behind the hydraulic motor 337. A die 339 is connected to the nozzle 332 of the cylinder 333, and injection material 340 ejected from the nozzle is injected inside the die 339.

In the present embodiment, a paintable plastic is used as the injection material 340, and Derlin 100P NC010 (trade name) may be used, for example. This plastic is an acetal resin manufactured by DuPont. The melting temperature of the resin material is 215° C.

The temperature in the cylinder 333 is set, for example, to 230° C. in the rear portion, 225 to 220° C. in the center portion, and 215° C. in the forward portion, i.e., the portion on the nozzle 332 side of the machine, and 190° C. in the nozzle 332. The temperature of the die 339 is kept at 90° C. The injection material in the cylinder 333 is kept in a molten state during injection molding, and the screw 336 is rotated at a rotational speed of 150 rotations per minute or less while moving forward at a velocity of 10 cm per second or less in order to reduce the friction of the filler. Also, the pressure in the cylinder 333 is kept at 100 MPa. In this manner, the injection material 340 is injected from the nozzle 332 of the cylinder 333 into the die 339.

Next, the molded article is removed from the die 339 and left standing to dry for three hours in an environment having a temperature of 80° C. and a humidity of 0.1% or less, thereby fabricating the base of the light-direction controller. The injection material is not limited to plastic, and a variety of materials can be used. The molding conditions depend on the material used and the molding shape. In other words, the conditions will vary considerably depending on whether the entire base of the light-direction controller is integrally molded or whether, for example, each of the mirrors is molded separately or another technique is adopted in which a plurality of components are separately formed. Depending on the design of the mold, batch molding or separate molding may be selected in accordance with the molding precision and other factors. When separate molding is selected, the number of separate components may also be freely selected.

Next, a paint material with high reflectivity is spray painted onto the surface of the base of the injection-molded light-direction controller to form mirrors, and a light-direction controller is fabricated in this manner. The method of forming the mirrors is not limited to spray painting, and deposition, for example, or another method may be used to form a metal material or another coating with greater reflectivity.

In the present embodiment, reflective LEDs are used as the light source connected to the main fibers. Examples of reflective LEDs include TOLATR001A (red), TOLATG001A (green), and TOLATB001A (blue) (all trade names) manufactured by Tabuchi Electric. The reflective LED is housed in a box-shaped package having a length of about 6 mm, a width of about 6 mm, and height of about 3 mm. The package is very compact, and mounting and handling are simple due its box shape. Electrodes can be connected to the side surface or the surface opposite from the light-emitting surface, so flexibility in mounting on a substrate or the like is excellent, and the LEDs can be densely mounted. As described above, the reflective LEDs can emit substantially all emitted light in the desired direction, and the light efficiency is therefore high. In particular, since the above-described products are box-shaped packages, the problems usually encountered in the mounting of conventional dome-shaped LEDs can be obviated. Specific problems include peeling between the epoxy resin and the metal leads when the LEDs are passed through a high-temperature reflow oven, degradation due to moisture penetration, and other problems.

Figure 47:
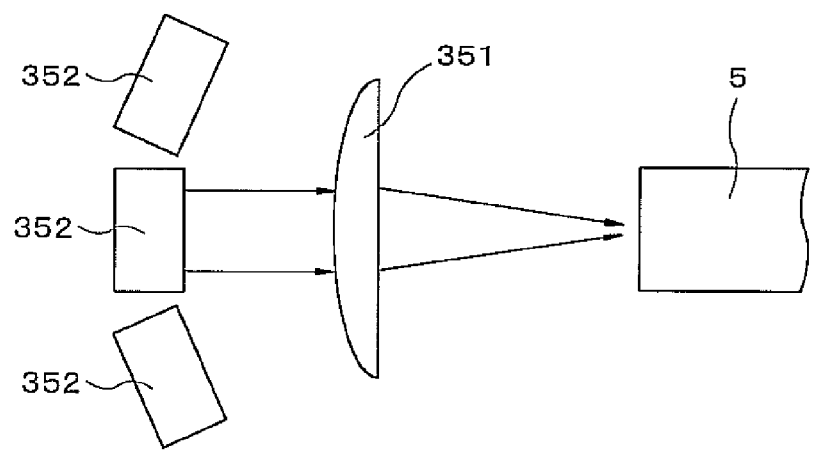
FIG. 47 is a diagram showing an area adjacent to the light source of the light source device according to the present embodiment.

Connections between the reflective LEDs and the main fibers are formed by a self-forming light-guide path. FIG. 47 is a diagram showing an area adjacent to the light source of the light source device according to the present embodiment. A lens 351 is disposed on the end portion side of a single main fiber 5, and three-color reflective LEDs 352 are disposed on the side opposite from the main fiber 5 when viewed from the lens 351, as shown in FIG. 47. The light emitted from the three-colors reflective LEDs 352 is focused by the lens 351 and made to enter the core of the main fiber 5. A photocurable resin fluid mixture (not shown) is filled between the main fiber 5, the lens 351, and the three reflective LEDs 352, and a self-forming light-guide path (not shown) is fabricated by light emitted from the main fiber 5 and the centrally positioned reflective LED 352. A self-forming light-guide path may be fabricated by using reflective LEDs other than the centrally positioned reflective LED. In this case, the light can be made to enter the core more efficiently by shifting the lens 351 away from the center axis of the main fiber 5.

The method for manufacturing a display device other than that described above in the present embodiment is the same as the twenty-fifth embodiment described above. In particular, the method for manufacturing a light source device is the same as in the twentieth embodiment described above. Also, the configuration and operation of the display device other than that described above in the present embodiment are the same as in the eighteenth embodiment described above. In particular, the operation and configuration of the light source device are the same as the first embodiment described above. An excellent color-field sequential display device can be obtained by such a configuration.

Using an LED chip with a plurality of colors in a single package, e.g., a chip referred to as a 3-in-1 chip in which three colors of LEDs are housed in a single package, allows the chip to be connected to the optical fibers by a self-forming light-guide path without interposing a lens or another focusing element. In the present embodiment, since the amount of lost light is low in the optical path from the light source to the optical fibers, an excellent color-field sequential display device can be obtained even when a 3-in-1 chip that does not have a very high light efficiency is used.

Figure 48:
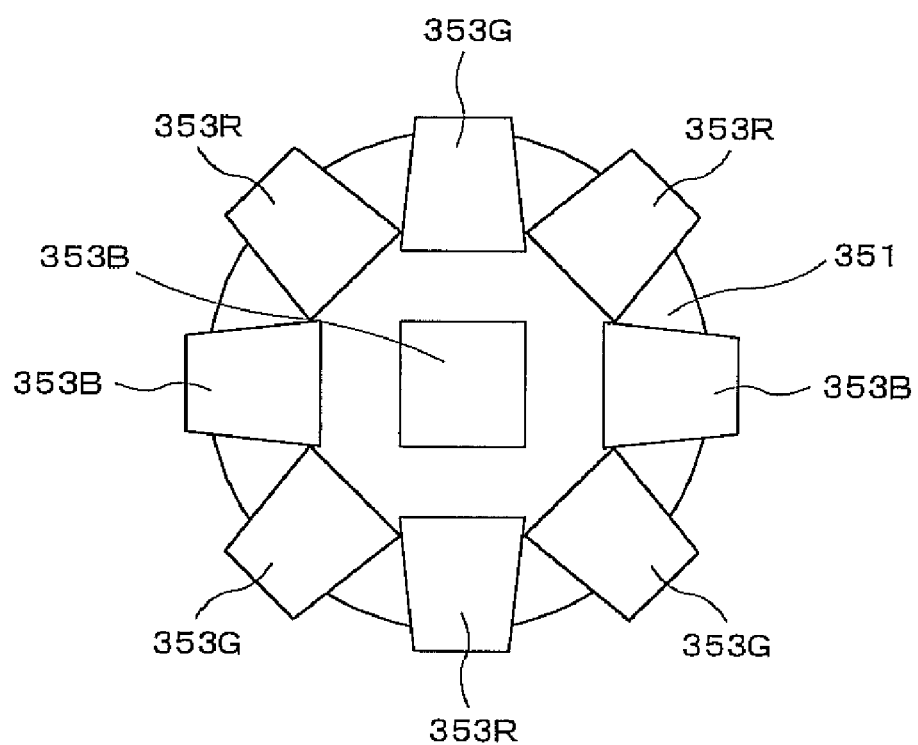
FIG. 48 is a diagram showing an area adjacent to the light source of the light source device according to a modified example of the twenty-sixth embodiment.

A modified example of the twenty-sixth embodiment is described next. FIG. 48 is a diagram showing an area adjacent to the light source of the light source device according to a modified example. In the twenty-sixth embodiment described above, three reflective LEDs are connected to a single main fiber, as shown in FIG. 47. However, due to the large size of the liquid crystal panel and other factors, four or more reflective LEDs must be connected by way of a single main fiber when a large light intensity is required to display an image on the liquid crystal display device.

In view of this situation, in the present modified example, a single lens 351 is connected to a single main fiber (not shown), and nine reflective LEDs are connected to the lens 351, as shown in FIG. 48. Three of the nine reflective LEDs are blue LEDs 353B, another three are green LEDs 353G, and the remaining three are red LEDs 353R. A single blue LED 353B is disposed on the optical axis of the lens 351, and the other eight reflective LEDs are disposed in eight symmetrical positions in relation to the optical axis of the lens 351. In other words, the other two blue LEDs 353B are disposed to the two sides of the blue LED 353 disposed on the optical axis of the lens 351. The three green LEDs 353G are disposed so that the perpendiculars dropped from each green LED 353G to the optical axis of the lens 351 intersect each other at angles of 90°, 135°, and 135°. The same applies to the three red LEDs 353R. Light emitted from the nine reflective LEDs is focused by the lens 351 and made to enter the main fiber.

Light emitted from LEDs of each color is thereby simultaneously made to enter from a number of angles when each color is selected and lighted. For this reason, the effect produced by light entering the main fiber from the inclined direction with respect to the center axis of the main fiber is averaged in the process of propagating through the main fiber and the optical fibers, and the leaked light emitted from the notches of the optical fibers can be prevented from becoming unbalanced. On the other hand, when a self-forming light-guide path is formed between the main fiber and the reflective LEDs, the blue LEDs 353B disposed on the optical axis of the lens 351 are lighted. In this manner, the method for disposing a plurality of LEDS is limitless, and the structure may be determined in accordance with the design.

Figure 49:
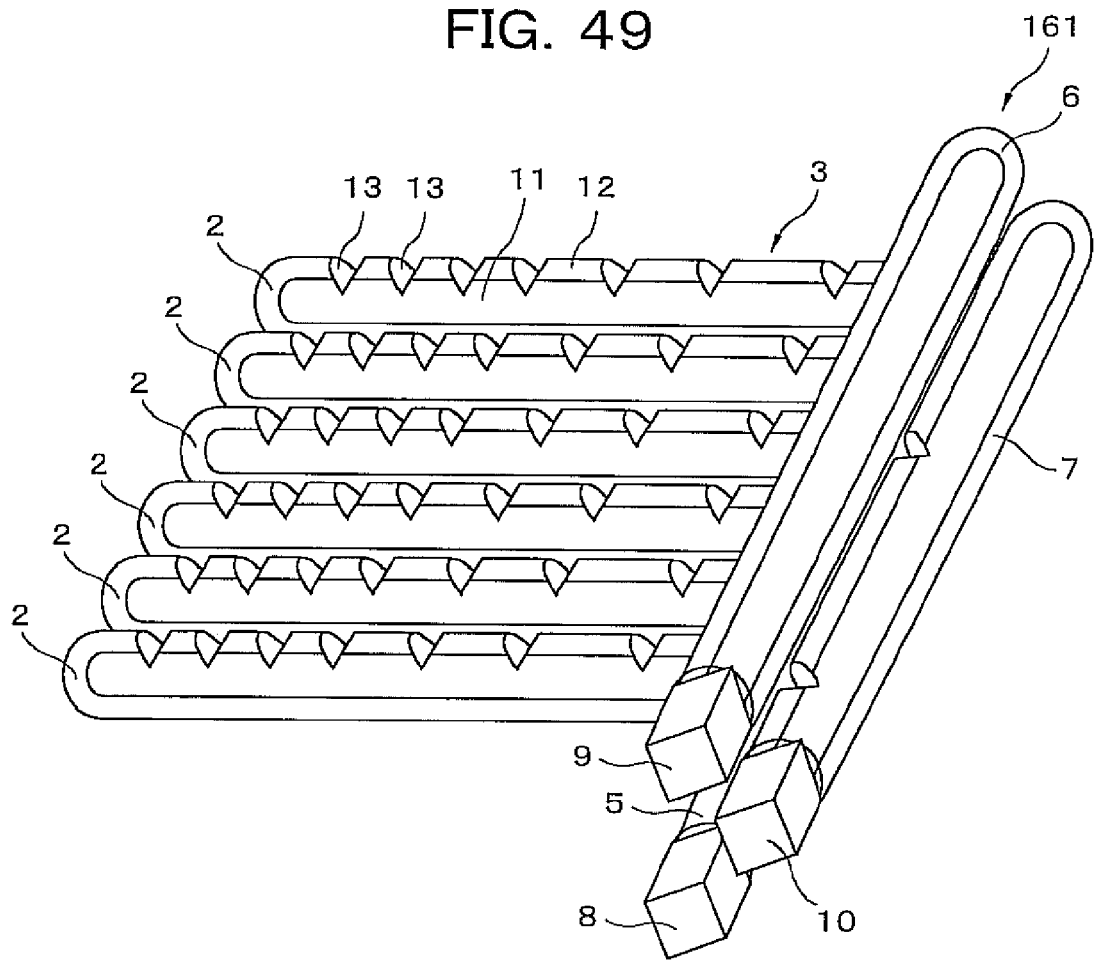
FIG. 49 is a perspective view showing the light source device according to the twenty-seventh embodiment of the present invention.
Figure 50:
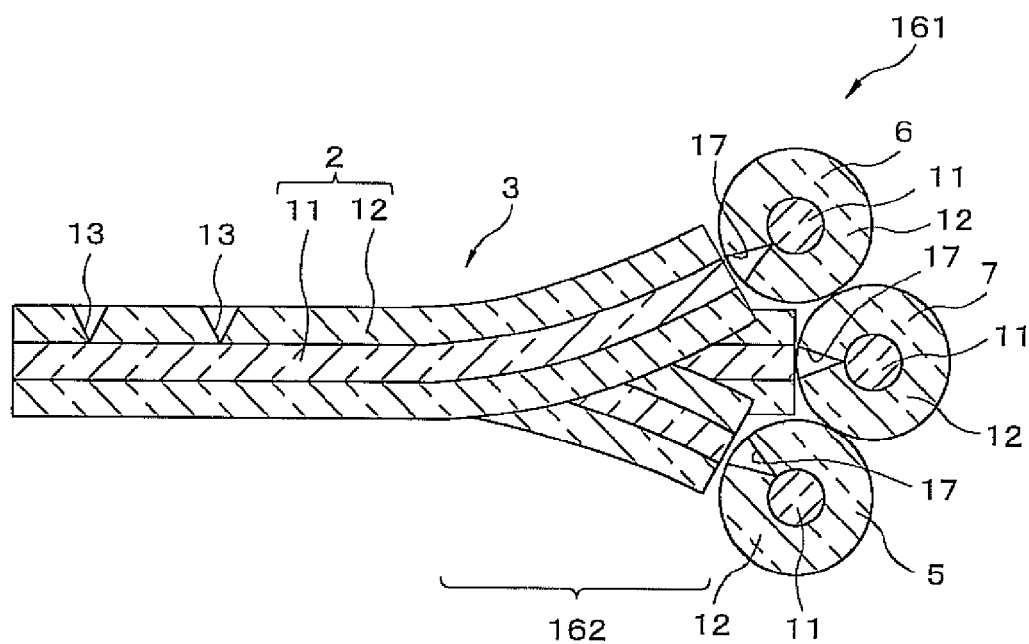
FIG. 50 is a side view showing the light source device according to the present embodiment.

The twenty-seventh embodiment of the present invention is described next. FIG. 49 is a perspective view showing the light source device according to the present embodiment. FIG. 50 is a side view showing the light source device according to the present embodiment. In the light source device 161 according to the present embodiment, a curved portion 162 is provided to one end of the row of fibers 3, and the optical fibers 2 constituting the row of fibers 3 are curved in the curved portion 162, as shown in FIGS. 49 and 50. The end portions of the optical fibers 2 near the curved portion 162 are optically connected to the notches 17 of one of the three main fibers 5 to 7 by way of a self-forming light-guide path. In other words, one end of a first optical fiber 2 of the optical fibers 2 constituting the row of fibers 3 is curved downward and connected to the notch 17 of the main fiber 5. One end of a second optical fiber 2 positioned adjacent to the first optical fiber 2 is curved upward and connected to the notch 17 of the main fiber 6. One end of a third optical fiber 2 positioned adjacent to the second optical fiber 2 is not curved and is connected to the notch 17 of the main fiber 7. The configuration other than that described above in the present embodiment is the same as the first embodiment described above.

Figure 51A:
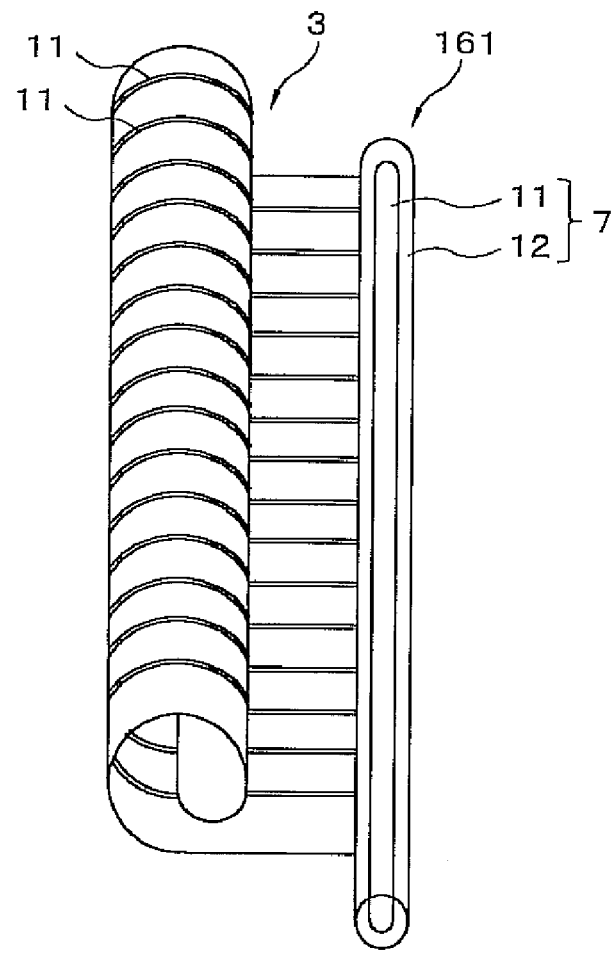
FIGS. 51A and 51B are perspective views showing the operation of the present embodiment.
Figure 51B:
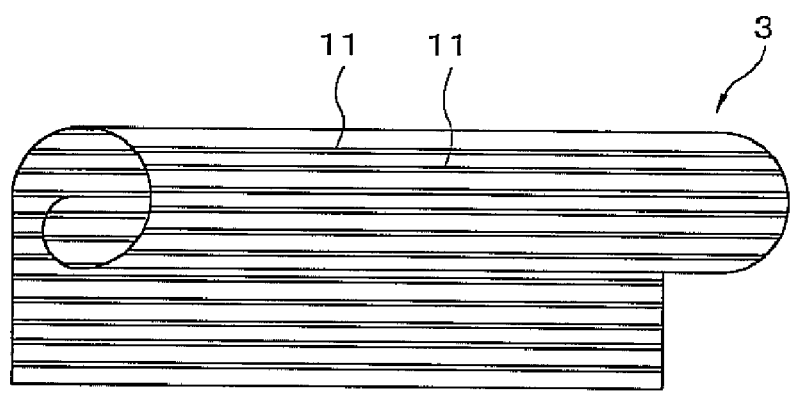

The operation and effects of the present embodiment are described next. FIGS. 51A and 51B are perspective views showing the operation of the present embodiment. In FIG. 51A, the main fibers 5 and 6, and light sources 8 to 10 have been omitted to simplify the diagram. In FIG. 51B, main fibers 5 to 7, and light sources 8 to 10 have been omitted. The light source device 161 according to the present embodiment is composed of only a light source and optical fibers, and the light source device 161 itself can therefore be rolled. The light source device 161 can be rolled in the direction that the optical fibers of the row of fibers 3 extend, as shown in FIG. 51A. In this case, the main fiber is wound up into the rolled row of fibers 3. As long as the cores 11 are made softer than the cladding 12 in the optical fibers 2, the row of fibers 3 can be more easily flexed. The light source device 161 can be rolled in the direction that the main fiber extends, as shown in FIG. 51B. The light source device can thereby be rolled like a scroll and stored away to reduce storage space. Also, a flexible display device can be configured when combined with a flexible display panel. The configuration and operation other than that described above in the present embodiment are the same as in the first embodiment described above.

Figure 52:
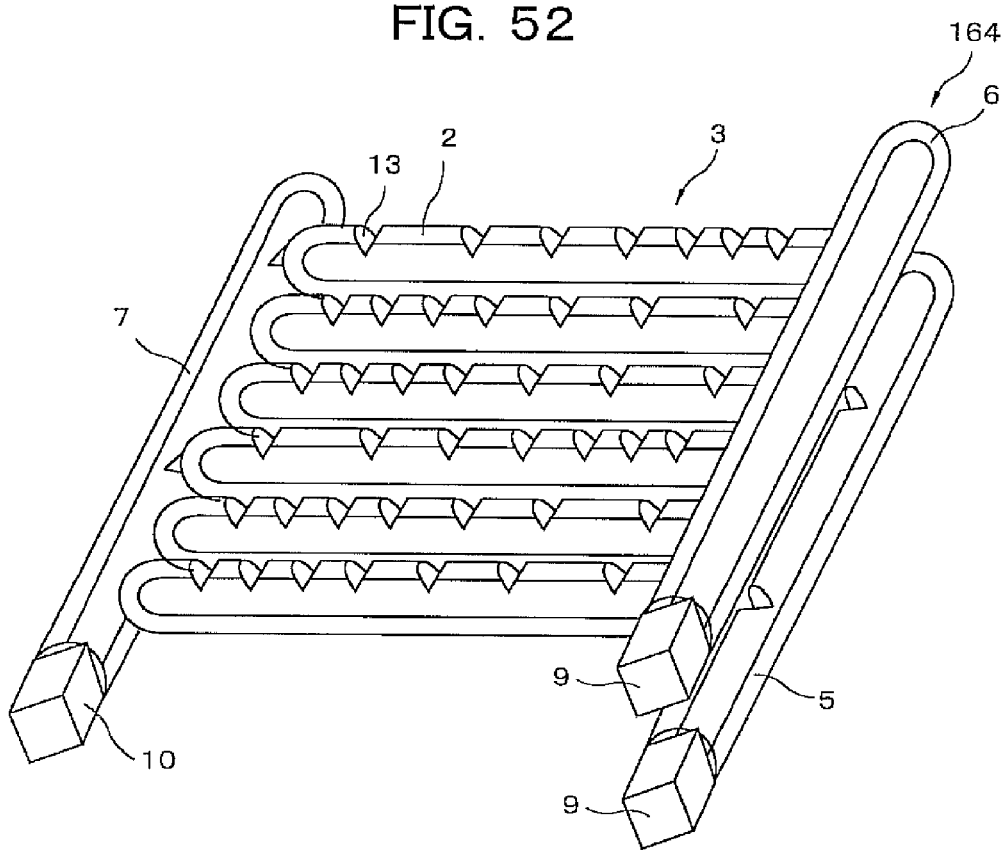
FIG. 52 is a perspective view showing the light source device of the twenty-eighth embodiment of the present invention.
Figure 53:
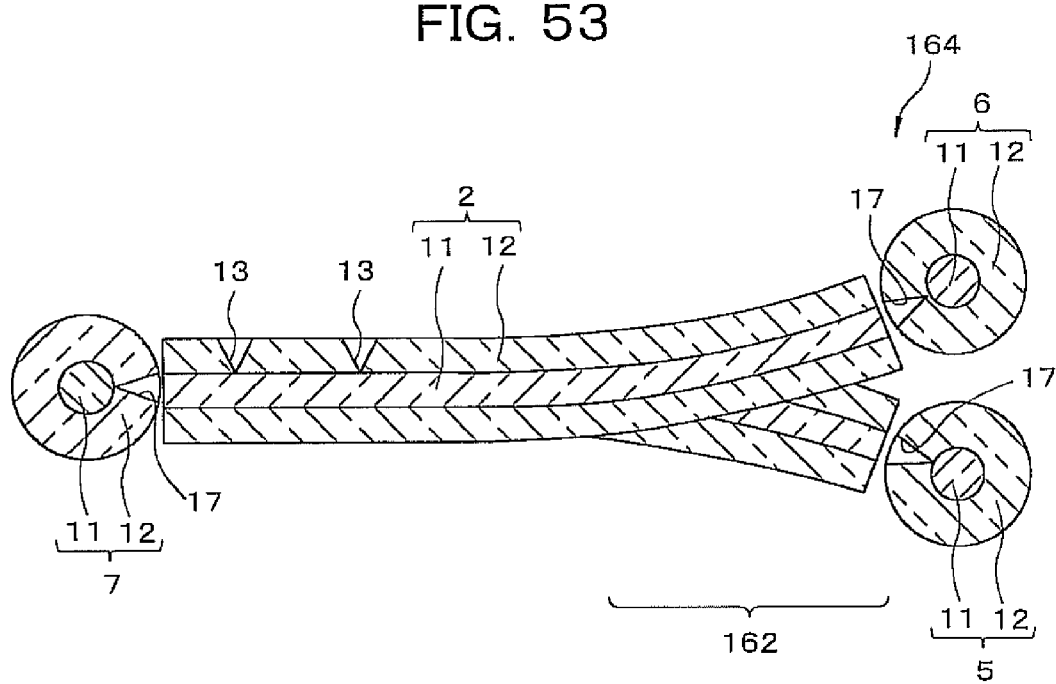
FIG. 53 is a side view showing the light source device according to the present embodiment.

The twenty-eight embodiment of the present invention is described next. FIG. 52 is a perspective view showing the light source device of the present embodiment. FIG. 53 is a side view showing the light source device according to the present embodiment. In the light source device 164 of the present embodiment, only the main fibers 5 and 6 are connected to the end portions of the row of fibers 3 near the curved portion 162 as compared with the light source device 161 of the twenty-seventh embodiment described above, and the main fiber 7 is connected to the other end of the row of fibers 3 2, as shown in FIGS. 52 and 53. The configuration other than that described above in the present embodiment is the same as the twenty-seventh embodiment described above.

In the present embodiment, the thickness of the entire light source device can be reduced by separately disposing the main fibers at the two ends of the row of fibers 3. The operation and effects other than those described above in the present embodiment are the same as those in the twenty-seventh embodiment described above.

What is claimed is:

1. A method for driving a display device, comprising:
   a step for lighting a first light source and turning off other light sources to illuminate a first row of pixels of a liquid crystal panel and setting in a prescribed direction the orientation of liquid crystal molecules in said first row of pixels; and
   a step for lighting a second light source and turning off other light sources to illuminate a second row of pixels of a liquid crystal panel and setting in a prescribed direction the orientation of liquid crystal molecules in said second row of pixels.

2. The method for driving a display device according to claim 1, wherein
   said first light source emits light of a first color, and said first row of pixels is a row of pixels for displaying an image that corresponds to said first color; and
   said second light source emits light of a second color that is different than said first color, and said second row of pixels is a row of pixels for displaying an image that corresponds to said second color.

3. A method for driving a display device, comprising:
   a first image display step for allowing light to enter one end of optical fibers, emitting in a first direction said light from light-emitting portions arrayed along a lengthwise direction of the optical fibers, and displaying a first image on a liquid crystal panel illuminated by the light; and
   a second image display step for allowing light to enter the other end of said optical fibers, emitting in a second direction said light from said light-emitting portions, and displaying a second image on said liquid crystal panel.

4. The method for driving a display device according claim 3, wherein
   said first image is an image for the right eye; and
   said second image is an image for the left eye.

5. The method for driving a display device according to claim 3, wherein each of said first image display step and said second image display steps comprises:
   a step for lighting a first light source and turning off other light sources to illuminate a first row of pixels of a liquid crystal panel and setting in a prescribed direction the orientation of liquid crystal molecules in said first row of pixels; and
   a step for lighting a second light source and turning off other light sources to illuminate a second row of pixels of a liquid crystal panel and setting in a prescribed direction the orientation of liquid crystal molecules in said second row of pixels.

6. The method for driving a display device according claim 5, wherein
   said first light source emits light of a first color;
   said first row of pixels is a row of pixels for displaying an image that corresponds to said first color;
   said second light source emits light of a second color that is different than said first color; and
   said second row of pixels is a row of pixels for displaying an image that corresponds to said second color.

\* \* \* \* \*